(12) United States Patent
Nakatani et al.

(10) Patent No.: US 6,898,930 B2
(45) Date of Patent: May 31, 2005

(54) EXHAUST GAS PURIFICATION DEVICE

(75) Inventors: Koichiro Nakatani, Susono (JP); Shinya Hirota, Susono (JP); Shunsuke Toshioka, Numazu (JP); Kazuhiro Itoh, Mishima (JP); Takamitsu Asanuma, Susono (JP); Koichi Kimura, Susono (JP); Akira Mikami, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 89 days.

(21) Appl. No.: 10/333,414

(22) PCT Filed: Aug. 8, 2002

(86) PCT No.: PCT/JP02/08142

§ 371 (c)(1),
(2), (4) Date: Jan. 21, 2003

(87) PCT Pub. No.: WO03/014539

PCT Pub. Date: Feb. 20, 2003

(65) Prior Publication Data

US 2003/0167755 A1 Sep. 11, 2003

(30) Foreign Application Priority Data

| Aug. 8, 2001 | (JP) | 2001-241116 |
| Dec. 27, 2001 | (JP) | 2001-397474 |
| Jan. 24, 2002 | (JP) | 2002-015924 |
| Jan. 25, 2002 | (JP) | 2002-017375 |
| Mar. 12, 2002 | (JP) | 2002-067286 |

(51) Int. Cl.$^7$ ............................................... F01N 3/02

(52) U.S. Cl. .............................. 60/311; 60/274; 60/301

(58) Field of Search .................... 60/274, 297, 295, 60/288, 301, 311; 55/DIG. 30

(56) References Cited

U.S. PATENT DOCUMENTS

| 4,283,210 A | | 8/1981 | Mochida et al. |
| 4,695,301 A | | 9/1987 | Okajima et al. |
| 4,718,926 A | | 1/1988 | Nakamoto et al. |
| 4,732,593 A | * | 3/1988 | Kondo et al. ............ 55/523 |

(Continued)

FOREIGN PATENT DOCUMENTS

| DE | 40 02 649 A1 | 8/1991 |
| JP | U 58-132520 | 9/1983 |
| JP | Y2 62-10422 | 3/1987 |
| JP | A 8-508199 | 9/1996 |
| JP | B2 2605559 | 2/1997 |
| JP | A 10-57730 | 3/1998 |
| JP | 10-099648 | * 4/1998 |
| JP | 2000-303878 | 10/2000 |
| JP | 2001-207836 | * 8/2001 |
| JP | B2 3228232 | 9/2001 |
| WO | WO 94/22556 | 10/1994 |
| WO | WO 01/12320 | 2/2001 |

Primary Examiner—Thomas Denion
Assistant Examiner—Diem Tran
(74) Attorney, Agent, or Firm—Oliff & Berridge, PLC

(57) ABSTRACT

There is provided an exhaust gas purification device (22) comprising a substrate used for purifying components contained in an exhaust gas discharged from an engine. The substrate has partitions (54) which define passages (50,51) and are formed of porous material having fine pores each having a predetermined average size. The end portions of the adjacent partitions (54) defining each of part of the passages (50,51) of the substrate are partially connected to each other such that the end portions (52,53) are tapered toward the outside of the substrate. The tapered end portions partially close the end opening of the corresponding passage and form a small hole (55,56) defined by the tips thereof. The size of each small hole (55,56) is smaller than the cross sectional area of the corresponding passage (50) and larger than the sizes of the fine pores of the partitions (54).

36 Claims, 32 Drawing Sheets

U.S. PATENT DOCUMENTS

| | | |
|---|---|---|
| 5,473,890 A | 12/1995 | Takeshima et al. |
| 5,492,679 A * | 2/1996 | Ament et al. ............... 422/180 |
| 5,863,311 A * | 1/1999 | Nagai et al. .................. 55/483 |
| 5,961,931 A * | 10/1999 | Ban et al. ................... 422/171 |
| 6,013,118 A * | 1/2000 | Matsunuma et al. ....... 55/282.3 |
| 6,233,927 B1 | 5/2001 | Hirota et al. |
| 6,490,857 B2 * | 12/2002 | Sasaki ......................... 60/297 |
| 2001/0002538 A1 | 6/2001 | Katsuta et al. |

* cited by examiner

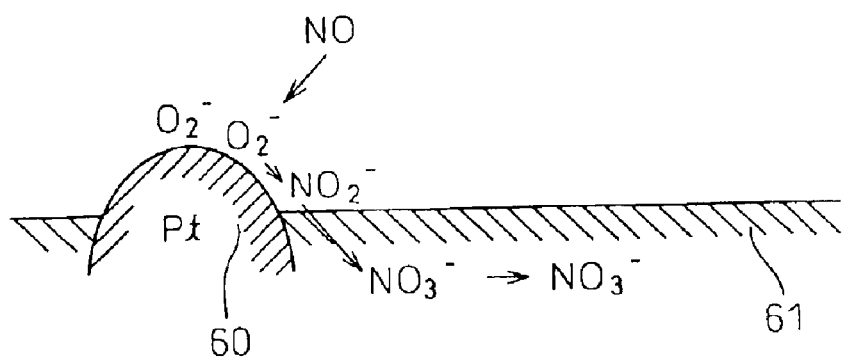
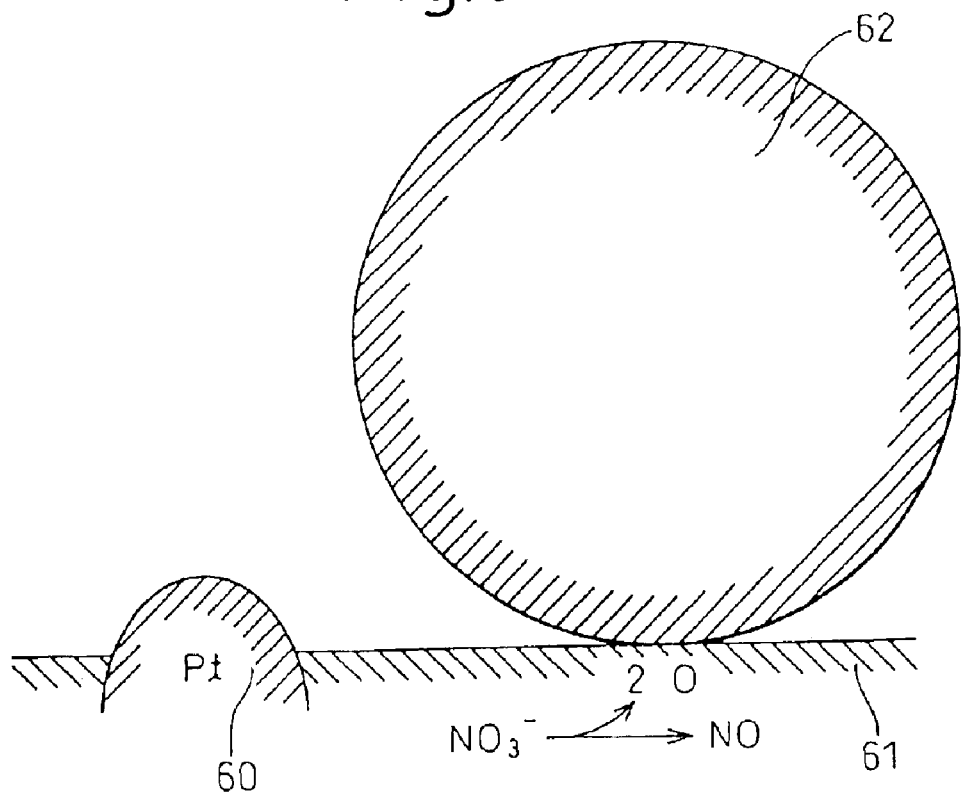

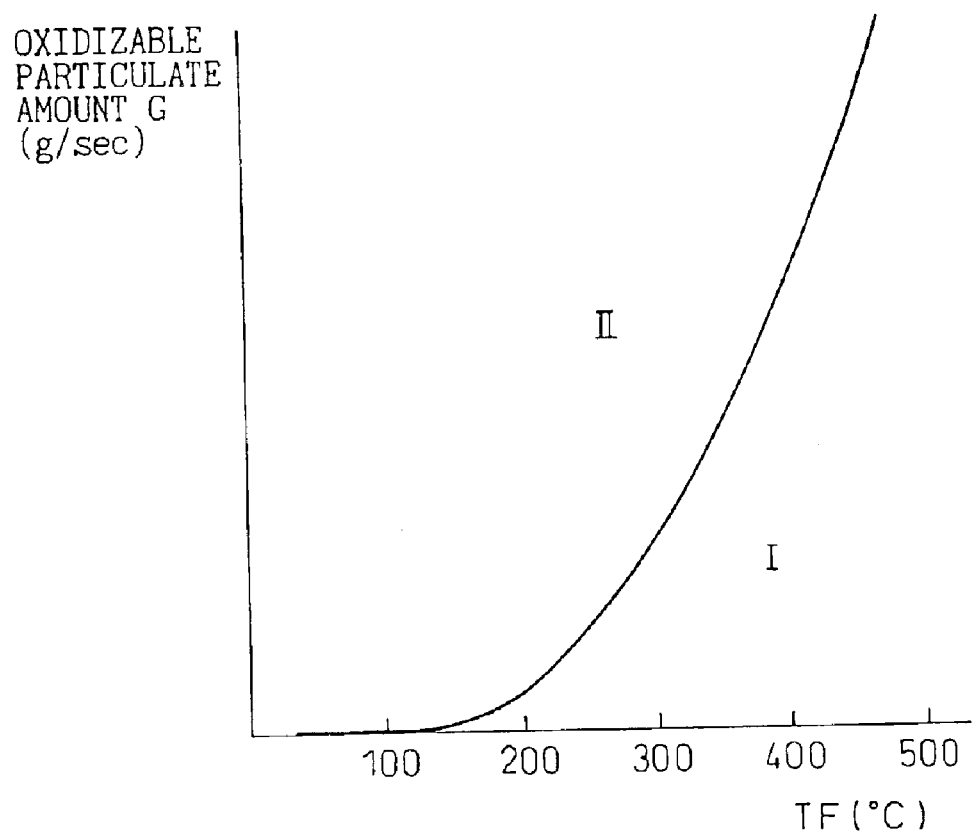

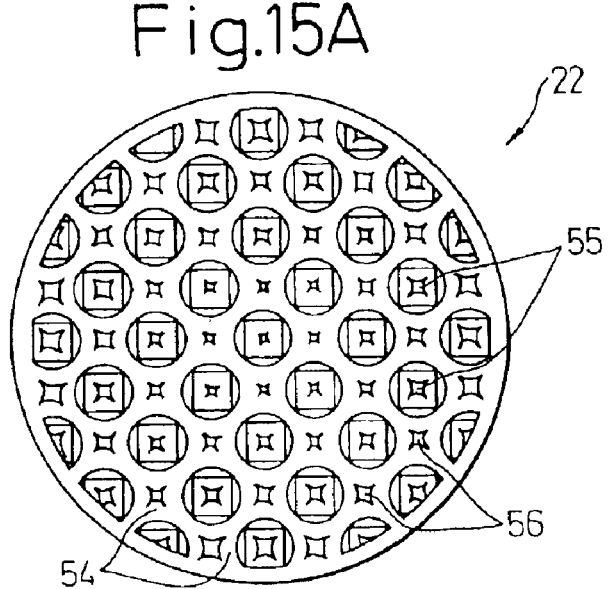
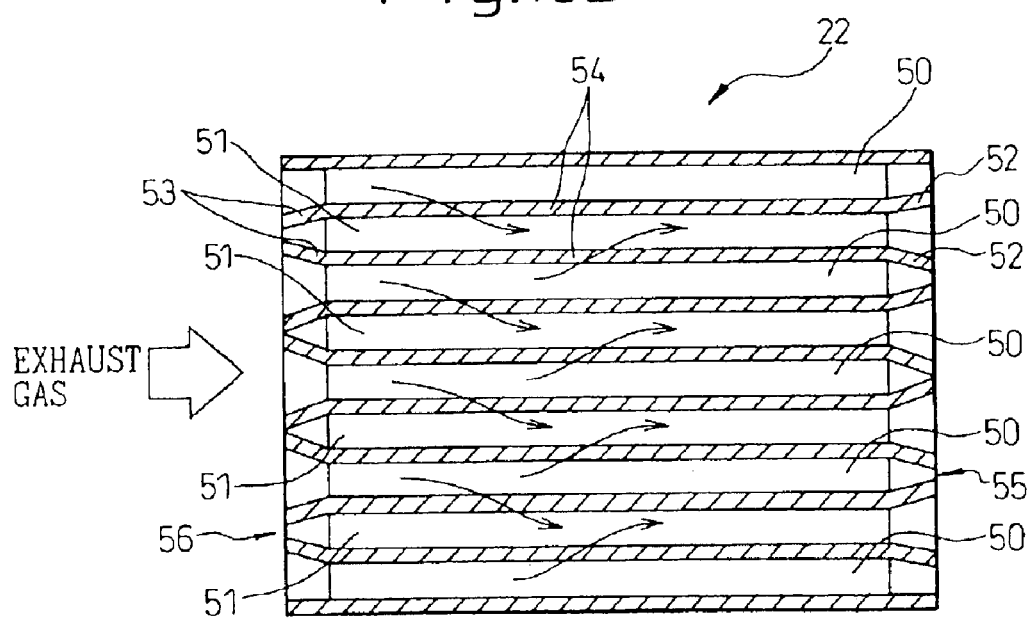

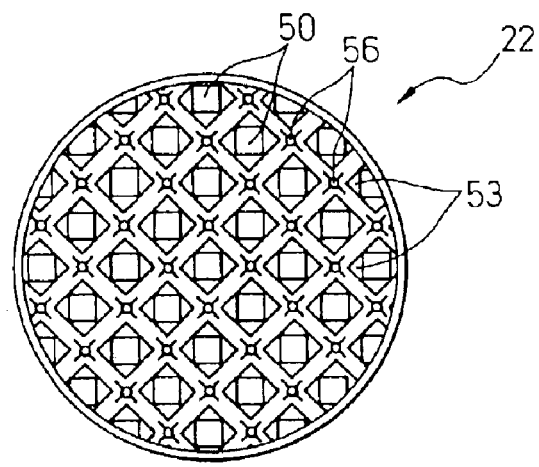
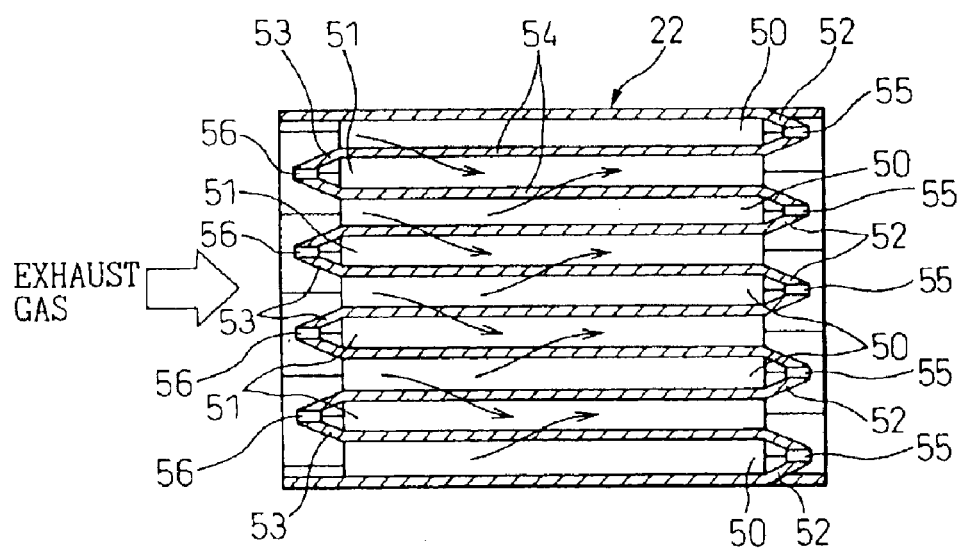

EXHAUST GAS PURIFICATION DEVICE

TECHNICAL FIELD

The invention relates to an exhaust gas purification device.

BACKGROUND ART

A particulate filter for collecting particulates contained in exhaust gas discharged from an engine is known. The filter has a honeycomb structure formed of porous material. Further, the filter has a plurality of passages, some of them being closed at their upstream end by plugs, and remaining of them being closed at their downstream end by plugs. In this filter, the exhaust gas passes through partitions defining the passages, and thereafter flows out of the filter.

In this type of the filter, as the exhaust gas flows out of the filter after passing through the partitions, the filter has a high particulate collection ratio. However, the passages of the filter are closed by the plugs, and therefore, the productivity of the filter is low and the cost for producing the filter is high.

Further, as shown in FIG. 3A, as the exhaust gas hits against the plugs, the exhaust gas does not flow smoothly into the passages of the filter. In addition, when the exhaust gas flows near the upstream plugs, the exhaust gas flows with turbulence, and thus the exhaust gas does not flow smoothly into the passages of the filter. Further, as shown in FIG. 3B, when the exhaust gas flows near the downstream plugs, the exhaust gas flows with turbulence, and thus the exhaust gas does not flow smoothly out of the filter. For these reasons, the filter has a large pressure loss.

The purpose of the invention is to provide an exhaust gas purification device having a particulate filter having a small pressure loss.

DISCLOSURE OF INVENTION

In the first invention, there is provided an exhaust gas purification device comprising a substrate used for purifying components contained in an exhaust gas discharged from an engine, the substrate having partitions which define passages and are formed of porous material having fine pores each having a predetermined average size, the end portions of the adjacent partitions defining each of part of the passages of the substrate being partially connected to each other such that the end portions are tapered toward the outside of the substrate, the tapered end portions partially closing the end opening of the corresponding passage and forming a small hole defined by the tips thereof, and the size of each small hole being smaller than the cross sectional area of the corresponding passage and larger than the sizes of the fine pores of the partitions.

In the second invention, according to the first invention, the end portions of the adjacent partitions defining each of part of the passages of the substrate are partially connected to each other at their upstream ends such that the end portions are tapered toward the outside of the substrate, and the end portions of the adjacent partitions defining each of remaining passages of the substrate are partially connected to each other at their downstream ends such that the end portions are tapered toward the outside of the substrate.

In the third invention, according to the second invention, the tapered end portions and the remaining partitions carry oxidation material for oxidizing the particulates, and the amount of the oxidation material carried by each upstream tapered end portion per unit volume is larger than that carried by each downstream tapered end portion per unit volume.

In the fourth invention, according to the first invention, the end portions of the adjacent partitions defining each of part of the passages of the substrate are partially connected to each other at their upstream ends such that the end portions are tapered toward the outside of the substrate, and the end portions of the adjacent partitions defining each of remaining passages of the substrate are connected to each other at their downstream ends such that the end portions are tapered toward the outside of the substrate and the downstream end opening of the passage is completely closed.

In the fifth invention, according to the first invention, the end portions of the adjacent partitions defining each of part of the passages of the substrate are partially connected to each other at their downstream ends such that the end portions are tapered toward the outside of the substrate, and the end portions of the adjacent partitions defining each of remaining passages of the substrate are connected to each other at their upstream ends such that the end portions are tapered toward the outside of the substrate and the upstream end opening of the passage is completely closed.

In the sixth invention, according to the first invention, the substrate is used as a particulate filter arranged in an exhaust gas passage of an engine for collecting particulates contained in an exhaust gas discharged from an engine.

In the seventh invention, according to the sixth invention, the tapered end portions carry oxidation material for oxidizing the particulates.

In the eighth invention, according to the seventh invention, the amount of the oxidation material carried by each tapered end portion at its upstream surface per unit are is larger than that at its downstream surface per unit area.

In the ninth invention, according to the seventh invention, a process for increasing the temperature of the filter is performed.

In the tenth invention, according to the seventh invention, the filter carries a NOx carrying agent to take in and carry the NOx therein when excessive oxygen exists therearound, and to discharge the carried NOx therefrom when the concentration of the oxygen decreases.

In the eleventh invention, according to the seventh invention, the filter carries a precious metal catalyst.

In the twelfth invention, according to the eleventh invention, the oxidation material is an active oxygen production agent to take in and carry the oxygen when excessive oxygen exists therearound, and to discharge the carried oxygen therefrom in the form of active oxygen when the concentration of the oxygen decreases, and the active oxygen production agent discharges the active oxygen therefrom when the particulates adhere to the filter to oxidize the particulate adhering to the filter by the active oxygen.

In the thirteenth invention, according to the twelfth invention, the active oxygen production agent comprises one of an alkali metal, an alkali earth metal, a rare earth and a transition metal.

In the fourteenth invention, according to the twelfth invention, the active oxygen production agent comprises one of an alkali metal and an alkali earth metal having an ionization tendency higher than that of calcium.

In the fifteenth invention, according to the twelfth invention, the air fuel ratio of at least part of the exhaust gas flowing into the filter is temporarily made rich to oxidize the particulates adhering to the filter.

In the sixteenth invention, according to the sixth invention, an oxidation means for oxidizing components contained in the exhaust gas is arranged in the exhaust gas passage of the engine upstream of the filter.

In the seventeenth invention, according to the sixteenth invention, the oxidation means is an oxidation catalyst.

In the eighteenth invention, according to the sixteenth invention, the oxidation means is a NOx catalyst to carry the NOx when the lean exhaust gas flows thereinto and to reduce the carried NOx when the rich exhaust gas flows thereinto.

In the nineteenth invention, according to the sixth invention, the size of each small hole of the filter at the low temperature region of the filter is larger than that at the high temperature region of the filter.

In the twentieth invention, according to the nineteenth invention, the low temperature region is the peripheral region of the filter, and the high temperature region is the central region of the filter.

In the twenty-first invention, according to the nineteenth invention, the cross sectional area of each passage of the filter at the low temperature region of the filter is larger than that at the high temperature region of the filter.

In the twenty-second invention, according to the sixth invention, the cross sectional area of each passage of the filter at the low temperature region of the filter is larger than that at the high temperature region of the filter.

In the twenty-third invention, according to the twenty-second invention, the low temperature region is the peripheral region of the filter, and the high temperature region is the central region of the filter.

In the twenty-fourth invention, according to the twenty-second invention, the size of each small hole of the filter at the low temperature region of the filter is larger than that at the high temperature region of the filter.

In the twenty-fifth invention, according to the sixth invention, an exhaust gas purification means for purifying components contained in the exhaust gas is arranged in the exhaust gas passage of the engine downstream of the filter.

In the twenty-sixth invention, according to the twenty-fifth invention, the exhaust gas purification means is a NOx catalyst to carry the NOx when the lean exhaust gas flows thereinto, and to reduce the carried NOx when at least the generally stoichiometric exhaust gas flows thereinto.

In the twenty-seventh invention, according to the twenty-fifth invention, the exhaust gas purification means is an additional particulate filter which can oxidize the particulates contained in the exhaust gas.

In the twenty-eighth invention, according to the twenty-fifth invention, the filter is arranged at least near the exhaust manifold.

In the twenty-ninth invention, according to the twenty-fifth invention, the device further comprises a bypass passage which extends from the engine exhaust gas passage between the filter and the exhaust gas purification means to the exhaust gas passage of the engine downstream of the exhaust gas purification means to bypass the exhaust gas purification means, and a switch valve for switching the flow of the exhaust gas into the exhaust gas purification means and into the bypass passage, the filter carries a SOx carrying agent to carry the SOx when the lean exhaust gas flows thereinto, and to release the carried SOx when at least the generally stoichiometric exhaust gas flows thereinto and the temperature of the SOx carrying agent has a temperature higher than a SOx release temperature, the switch valve is positioned such that the exhaust gas flows into the exhaust gas purification means when the SOx is not released from the SOx carrying agent, and is positioned such that the exhaust gas flows into the bypass passage when the SOx is released from the SOx carrying agent.

In the thirtieth-invention, according to the twenty ninth invention, a catalyst for oxidizing the components contained in the exhaust gas is arranged in the bypass passage.

In the thirty-first invention, according to the first invention, the substrate is arranged in an exhaust gas passage of an engine, the substrate carrying a hydrocarbon collection agent for collecting unburned hydrocarbon contained in an exhaust gas discharged from an engine, and a hydrocarbon purification catalyst for purifying unburned hydrocarbon, the hydrocarbon collection agent collects unburned hydrocarbon when the agent has a temperature lower than a hydrocarbon release temperature, and releases the collected unburned hydrocarbon therefrom when the agent has a temperature higher than the hydrocarbon release temperature, the hydrocarbon purification catalyst purifies unburned hydrocarbon when the catalyst has a temperature higher than a hydrocarbon purification temperature, the hydrocarbon release temperature is set such that the unburned hydrocarbon is released from the hydrocarbon collection agent when the hydrocarbon purification catalyst has a temperature lower than the hydrocarbon purification temperature.

In the thirty-second invention, there is provided a method for producing a substrate used for purifying components contained in an exhaust gas discharged from an engine, the substrate having a plurality of exhaust gas passages defined by partitions formed of porous material, the end portions of the partitions defining each of part of the exhaust gas passages being partially connected to each other at one end of the exhaust gas passage such that the end portions are tapered toward the outside of the substrate and define a small hole by the tips thereof, the end portions of the partitions defining each of the remaining exhaust gas passages being partially connected to each other at the other end of the exhaust gas passage such that the end portions are tapered toward the outside of the substrate and define a small hole by the tips thereof, wherein the method comprises a step of gathering and connecting the end portions of the partitions defining each exhaust gas passage to be closed at its end opening, and a step of forming a small hole defined by the tips of the end portions defining each exhaust gas passage to be closed at its end opening, each small hole having a size smaller than the area of the end opening of the corresponding exhaust gas passage and larger than the average sizes of the fine pores of the partitions.

In the thirty-third invention, according to the thirty-second invention, the gathering and connecting step and the small hole forming step are simultaneously performed.

In the thirty-fourth invention, according to the thirty-third invention, the gathering and connecting step and the small hole forming step are simultaneously performed by pressing a device having a plurality of projections and pins arranged between the projections onto the end face of the substrate.

In the thirty-fifth invention, according to the thirty-second invention, first, the gathering and connecting step is performed, and then the small hole forming step is performed.

In the thirty-sixth invention, according to the thirty-fifth invention, in the small hole forming step, the tips of the end portions connected to each other are shaved to form the small hole.

BRIEF DESCRIPTION OF DRAWINGS

FIGS. 6A and 6B show an action of the oxidization of the particulates;

FIGS. 8 shows a relationship between the amount of the particulates purified by the oxidation and the temperature of the filter;

FIGS. 15A and 15B show the filter of the fifth embodiment;

FIGS. 24A and 24B show the filter produced by the second filter production method;

BEST MODE FOR CARRYING OUT THE INVENTION

Figure 1A:
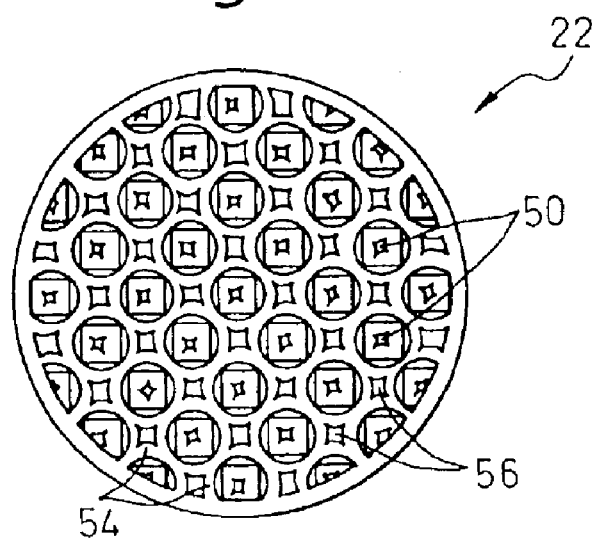
FIGS. 1A and 1B show a particulate filter of the invention.
Figure 1B:
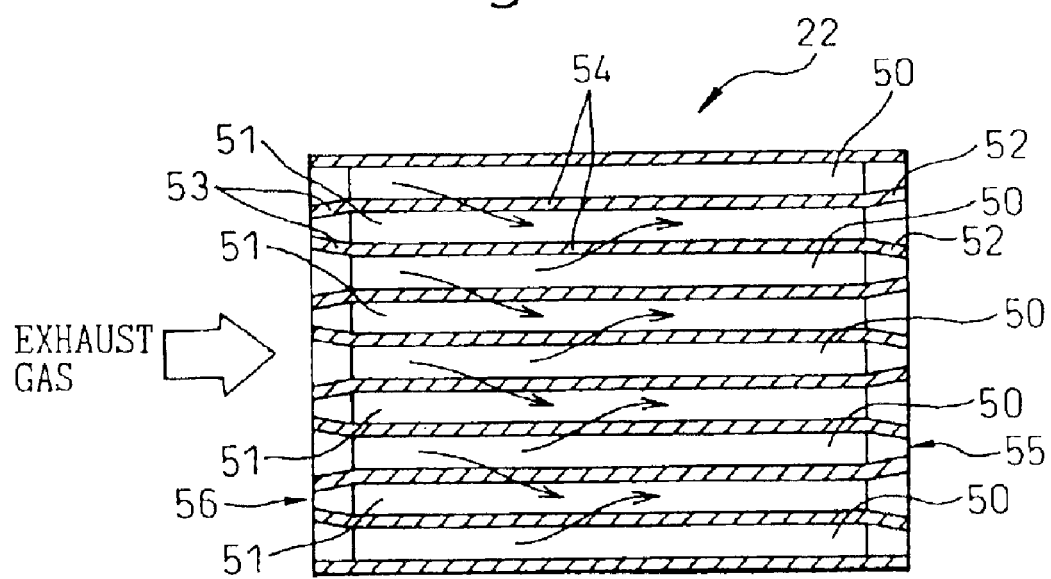

The invention will be explained by referring to the drawings. FIGS. 1A and 1B show an end view and a longitudinal cross sectional view of the filter, respectively. As shown in FIGS. 1A and 1B, the filter 22 has a honeycomb structure, and a plurality of exhaust gas passages 50, 51 extending parallel to each other.

The exhaust gas passages of the filter 22 comprise exhaust gas inflow passages 50. At the downstream end region, each inflow passage 50 has a cross sectional area which is made smaller than that of its remaining region by a corresponding tapered wall portion 52. Further, the exhaust gas passages of the filter 22 comprise exhaust gas outflow passages 51. At the upstream end region, each outflow passage 51 has a cross sectional area which is made larger than that of its remaining region by a corresponding tapered wall portion 53.

Each downstream tapered wall portion 52 is formed by gathering and connecting the downstream end portions of partitions 54 defining the corresponding exhaust gas inflow passage 50 to each other. On the other hand, each upstream tapered wall portion 53 is formed by gathering and connecting the upstream end portions of partitions 54 defining the corresponding exhaust gas outflow passage 51 to each other.

Each inflow passage 50 has a small hole 55 at the tip of the corresponding downstream tapered wall portion 52. Each small hole 55 has a cross sectional area smaller than that of the corresponding inflow passage 50. On the other hand, each outflow passage 51 has a small hole 56 at the tip of the corresponding upstream tapered wall portion 53. Each small hole 56 has a cross sectional area smaller than that of the corresponding outflow passage 51. In other words, the downstream end openings of some of the exhaust gas passages 50 are partially closed by the downstream tapered wall portions 52 to define the small holes 55 therein. On the other hand, the upstream end openings of remaining exhaust gas passages 51 are partially closed by the upstream tapered wall portions 53 to define the small holes 56 therein.

According to the present invention, the exhaust gas passages 50, 51 of the filter 22 are alternatively positioned and the thin partitions 54 are positioned between the passages 50,51. In other words, the inflow passage 50 is enclosed by four outflow passages 51, and the outflow passage 51 is enclosed by four inflow passages 50. Therefore, the cross sectional area of one of two adjacent exhaust gas passages of the filter 22 is decreased at its downstream end region by the corresponding downstream tapered wall portion 52, and the cross sectional area of the other exhaust gas passage is decreased at its upstream end region by the corresponding upstream tapered wall portion 53.

Figure 2A:
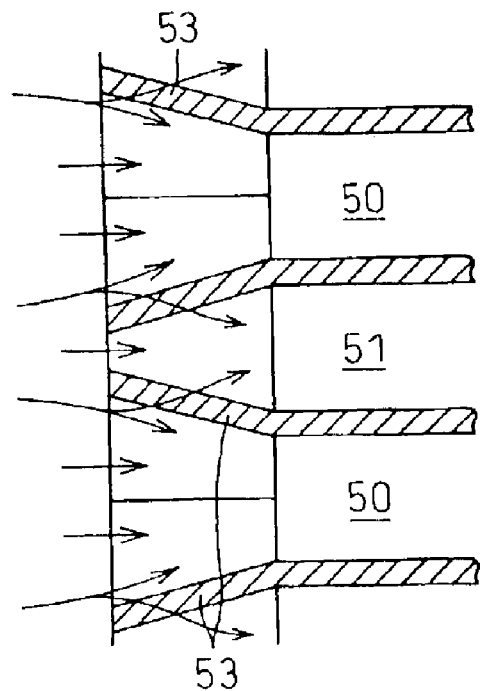
FIGS. 2A and 2B show a part of the filter of the invention.
Figure 2B:
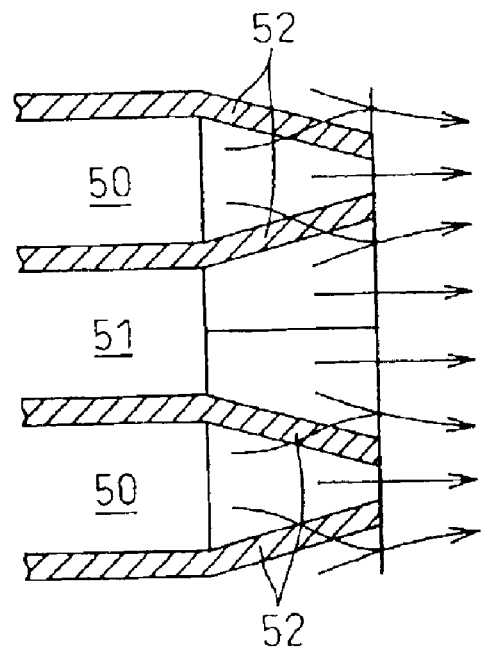

The filter 22 is formed of porous material such as cordierite. Cordierite has fine pores each having a predetermined average size. Therefore, as shown by an arrow in FIG. 1B, the exhaust gas flowing into the inflow passages 50 flows into the adjacent outflow passages 51 through the fine pores of the surrounding partitions 54. As the tapered wall portions 52, 53 are also formed of the same material as the partitions 54, the exhaust gas flows into the outflow passages 51 through the fine pores of the upstream tapered wall portions 53 as shown in FIG. 2A and flows out of the inflow passages 50 through the fine pores of the downstream tapered wall portions 52 as shown in FIG. 2B.

Further, the exhaust gas flows into the outflow passages 51 through the upstream small holes 56, and flows out of the inflow passages 50 through the downstream small holes 55.

Each hole 55,56 has a size larger than the average sizes of the fine pores of the tapered wall portions 52,53. Further, the downstream small holes 55 have generally the same sizes as each other, and the upstream small holes 56 have generally the same sizes as each other. Furthermore, the downstream small holes 55 may have generally the same as or, different sizes from those of the upstream small holes 56.

If the small holes 55,56 have large sizes, the filter 22 has a small pressure loss and a low particulate collection ratio. Contrary to this, if the small holes 55,56 have small sizes, the filter 22 has a large pressure loss and a high particulate collection ratio. According to the present invention, the size of the hole 55,56 is determined such that the pressure loss and the particulate collection ratio of the filter 22 are suitably balanced. Further, according to the present invention, the size of the hole 55,56 is determined such that the amount of the particulates flowing out of the filter 22 is kept smaller than an allowed amount. The amount of the particulates flowing out of the filter 22 can be calculated on the basis of the amount of the particulates flowing into the filter 22 per unit time and the particulate collection ratio of the filter 22.

In the present invention, the particulate collection ratio and the pressure loss of the filter 22 can be easily changed by changing the size of the holes 55,56 in accordance with the target particulate collection ratio of the filter 22.

Each upstream tapered wall portion 53 conically converges toward its upstream end such that the cross sectional area of the corresponding outflow passage 51 decreases continuously. Therefore, the upstream end of each inflow passage 50 defined by the corresponding upstream tapered wall portion 53 conically diverges toward its upstream end such that the cross sectional area of the corresponding inflow passage 50 increases continuously. According to this structure, the exhaust gas smoothly flows into the filter 22 contrary to the case that the entrances of the inflow passages are constituted as shown in FIG. 3A.

Figure 3A:
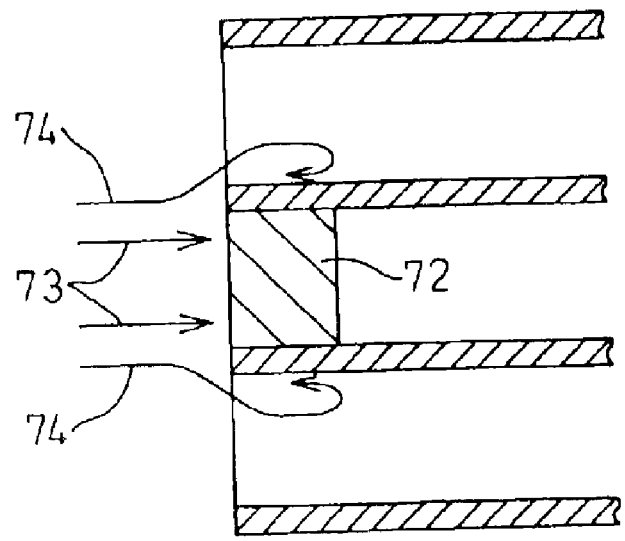
FIGS. 3A and 3B show a part of the filter of the prior art.

In the filter as shown in FIG. 3A, each inflow passage is closed at its upstream end by a plug 72. In this case, as shown by the reference number 73, the exhaust gas hits against the plugs 72, and the filter has a large pressure loss. In addition, as shown by the reference number 74, when the exhaust gas flows near the plugs 72, the exhaust gas flows with turbulence around the entrances of the inflow passages, and thus the exhaust gas does not smoothly flow into the inflow passages. Thus, the filter has a large pressure loss.

On the other hand, in the filter 22 of the invention, as shown in FIG. 2A, the exhaust gas flows into the inflow passages 50 without turbulence. Therefore, according to the present invention, the exhaust gas smoothly flows into the filter 22, and thus the filter 22 has a small pressure loss.

Figure 3B:
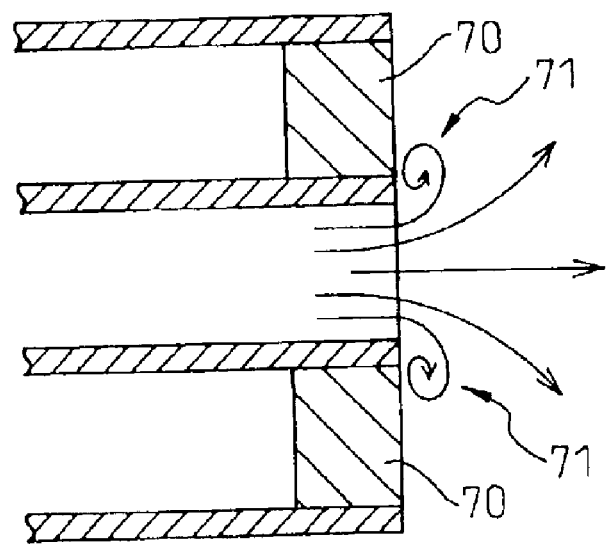

In the filter shown in FIGS. 3A and 3B, as the exhaust gas hits against the plugs 72 and flows with turbulence around the plugs 72, the particulates easily deposit on the upstream end surfaces of the plugs 72 and the wall surfaces of the partitions adjacent thereto. However, in the filter 22 of the present invention, as each upstream tapered wall portions 53 has a conical shape, the tapered wall portion 53 has no upstream end surface which the exhaust gas hit against, and the exhaust gas does not flow with turbulence around the upstream end surface of the tapered wall portion 53. Therefore, according to the present invention, many particulates hardly deposit in the filter 22 at its upstream region, and the pressure loss of the filter 22 hardly increases.

On the other hand, each downstream tapered wall portion 52 conically converges toward its downstream end such that the cross sectional area of the corresponding inflow passage 50 decreases continuously. Therefore, the downstream end of each outflow passage 51 defined by the corresponding downstream tapered wall portion 52 conically diverges toward its downstream end such that the cross sectional area of the corresponding outflow passage 51 increases continuously. According to this structure, the exhaust gas smoothly flows out of the filter 22 contrary to the case that the exits of the outflow passages are constituted as shown in FIG. 3A.

In the filter shown in FIG. 3B, each outflow passage is closed at its downstream end by a plug 70, and extends straight to its exit. Therefore, turbulence 71 occurs around the exits of the outflow passages. In this case, the exhaust gas does not smoothly flow out of the outflow passages.

On the other hand, in the filter 22 of the invention, as shown in FIG. 2B, the exhaust gas flows out of the exit of the outflow passages 51 without turbulence. Therefore, according to the present invention, the exhaust gas smoothly flows out of the filter 22, and thus the filter 22 has a small pressure loss.

As long as each tapered wall portion continuously converges toward the outside of the filter 22, the tapered wall portion may be in the form other than the conical form, such as a quadrangular pyramid or a six sided pyramid.

It is preferred that the filter has potentially a small pressure loss. Further, an engine operation control is designed in consideration of the potential pressure loss of the filter. Therefore, if the pressure loss of the filter increases from the potential pressure loss during the engine operation, the performance of the engine decreases. Regarding the filter, it is important that the filter has a small potential pressure loss and the pressure loss of the filter is kept around the potential pressure loss even if the pressure loss of the filter increases in use of the filter.

According to the present invention, as the partitions 54 defining the upstream end region of the exhaust gas passages 50,51 of the filter 22 are tapered, the exhaust gas hardly flows with turbulence when the exhaust gas flows into the exhaust gas passages 50,51, and thus the pressure loss of the filter 22 is potentially small.

Further, according to the present invention, since the partitions 54 defining the upstream end regions of the exhaust gas passages 50,51 of the filter 22 are tapered, the particulates hardly deposit on the surfaces of the tapered wall portions 52,53. In other words, in use of the filter 22, the particulates hardly deposit on the surfaces of the tapered wall portions 52,53, and thus the exhaust gas flowing into the exhaust gas passages hardly flows with turbulence by the deposited particulates. Therefore, even if the pressure loss of the filter increases in use thereof, the pressure loss of the filter hardly increases to a value considerably larger than the potential pressure loss.

Other than the particulates, the exhaust gas contains incombustible inorganic residuals (ash) produced by the burning of the fuel. Therefore, the ash flows into the filter 22, and deposits therein.

When the amount of the ash depositing in the inflow passages 50 increases, the pressure loss of the filter 22 increases. As explained above, in use of the filter 22, it is important that the pressure loss of the filter 22 is kept around the potential pressure loss even if the pressure loss of the filter 22 increases. To this end, the amount of the depositing ash must be small. Further, it is preferred that the ash depositing in the inflow passages 50 is removed.

According to the present invention, the small holes 55 are formed in the downstream tapered wall portions 52, and thus the ash flowing into the inflow passages 50 can flow out through the downstream small holes 55. Therefore, the ash hardly deposits in the inflow passages 50, and thus the pressure loss of the filter 22 hardly increases to a value considerably larger than the potential pressure loss even if the pressure loss of the filter 22 increases.

Further, when the amount of the ash depositing in the inflow passages 50 increases, the quantity of the exhaust gas passing through the small holes 55,56 increases. Therefore, the amount of the ash newly depositing in the inflow passages 50 decreases, and thus the pressure loss of the filter 22 hardly increases to a value considerably larger than the potential pressure loss even if the pressure loss of the filter 22 increases.

Further, when the amounts of the ash and the particulates depositing in each inflow passage 50 increase, and then the pressure in the inflow passage 50 increases, the increased pressure moves the ash depositing in the inflow passage 50 toward its downstream region, and finally discharges the ash through the corresponding downstream small hole 55. Therefore, the pressure loss of the filter 22 hardly increases to a value considerably larger than the potential pressure loss even if the pressure loss of the filter 22 increases. In addition, as the ash depositing in the inflow passages 50 is discharged from the filter 22 by the pressure in the inflow passages 50, the number of the operations to discharge the ash from the filter 22 is reduced.

Further, when the amounts of the ash and the particulates depositing in the inflow passages 50 increase, the exhaust gas does not easily pass through the partitions 54, and thus the pressures in the inflow passages 50 increase. At this time, the quantity of the exhaust gas passing through the small holes 55,56 increases. Therefore, the pressure loss of the filter 22 hardly increases to a value considerably larger than the potential pressure loss even if the pressure loss of the filter 22 increases.

Further, when many particulates deposit in the filter 22, and burn at once, the filter 22 may be melted by the heat derived from the burning of the particulates. However, according to the present invention, many particulates hardly deposit in the filter 22. Therefore, the filter is hardly melted by the heat derived from the burning of the particulates.

The invention may be applied to an exhaust gas purification filter arranged in the exhaust passage of the engine for collecting specific components contained in the exhaust gas, or to an exhaust gas purification catalyst arranged in the exhaust passage of the engine for purifying specific components contained in the exhaust gas.

Figure 4A:
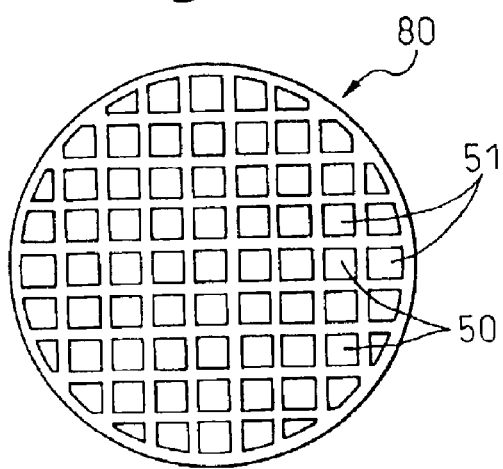
FIGS. 4A and 4B show a honeycomb structure.
Figure 4B:
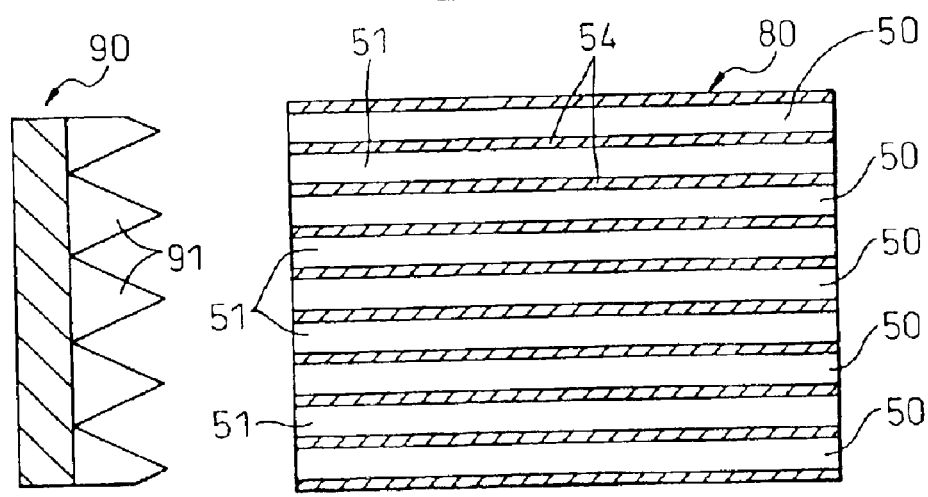

A first method for producing a filter of the present invention will be explained. First, a cylindrical honeycomb structure 80 shown in FIG. 4 is extruded from porous material such as cordierite. Next, a die 90 shown in FIG. 5 is pressed onto one of the end faces of the structure 80.

Figure 5A:
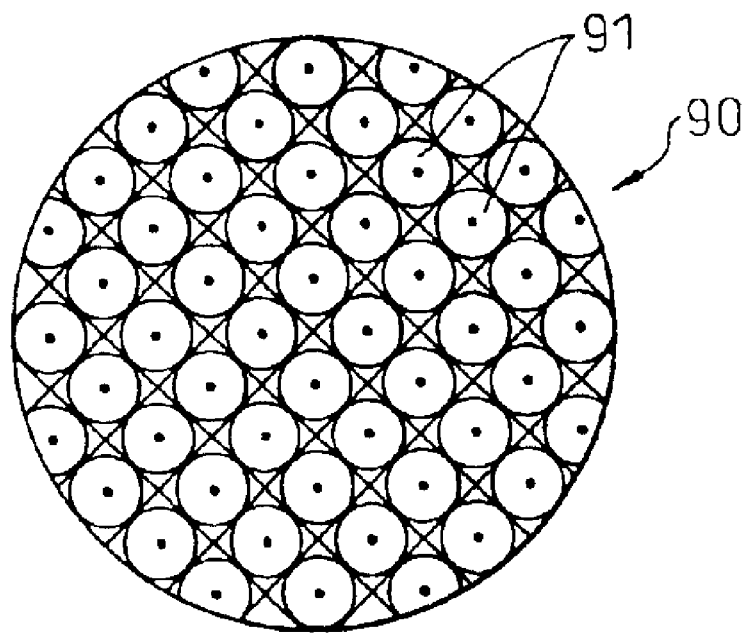
FIGS. 5A and 5B show a die.
Figure 5B:
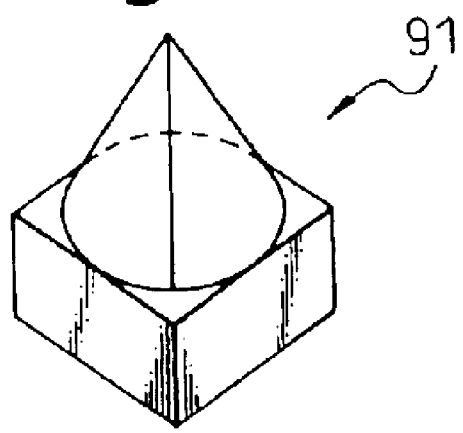

As shown in FIG. 5A, the die 90 has a plurality of conical projections 91. FIG. 5B shows one of the projections 91. The die 90 is pressed onto one end face of the structure 80 such that each projection 91 is inserted into a corresponding exhaust gas passage 50. As a result, four end portions of four adjacent partitions defining each exhaust gas passage 51 are gathered toward each other, and then are partially connected to each other to form a tapered wall portion 53 and a small hole 56.

Regarding the other end face of the structure 80, the similar processes are performed.

Next, the structure 80 is dried. Next, the structure 80 is baked. As a result, the filter 22 of the present invention is obtained. In this way, according to the present invention, the ends of the passages 50,51 are narrowed by a very simple method comprising the step of pressing the die 90 onto the end faces of the structure 80.

The step of pressing the die 90 onto the end faces of the structure 80 may be performed after the structure 80 is dried. Otherwise, after the baked structure 80 is softened at its end regions, the die 90 may be pressed onto the softened end portions of the structure 80. In this case, thereafter, the end portions of the structure 80 are baked again.

In the present invention, in use of the filter 22, the particulates do not easily deposit on the upstream tapered wall portions 53. However, in some cases, the particulates may deposit on the wall portions 53. In this case, in use of the filter 22, the pressure loss of the filter 22 increases. As explained above, in use of the filter 22, it is important to prevent the pressure loss of the filter from increasing to a value considerably larger than the potential pressure loss. To this end, it is necessary to remove the particulates from the filter 22.

According to the present invention, an oxidation material for removing the particulates by oxidation is applied on the upstream tapered wall portions 53. According to this, the particulates collected by the tapered wall portions 53 are continuously removed by oxidation and many particulates hardly deposit on the upstream tapered wall portions 53. Therefore, in use of the filter 22, the pressure loss of the filter 22 hardly increases to a value considerably larger than the potential pressure loss even if the pressure loss of the filter 22 increases in use of the filter 22.

In this way, according to the present invention, a problem is solved, which specially derives from the structure of the porous tapered wall portions of the upstream ends of the outflow passages 51, that is, in which the pressure loss of the filter increases to a value considerably larger than the potential pressure loss during use of the filter.

In the present invention, the oxidation material is applied to the entire of the filter 22, that is, the partitions 54 and the downstream tapered wall portions 52 other than the upstream tapered wall portions 53. Further, in the present invention, the oxidation material is applied to the interior wall surfaces defining the fine pores of the upstream and downstream tapered wall portions 53,52 and the partitions 54 other than the exterior wall surfaces thereof. Furthermore, in the present invention, the amount of the oxidation material applied to the upstream tapered wall portions 53 per unit volume is larger than those applied to the partition 54 or the downstream tapered wall portions 52.

The exhaust gas more easily passes through the tapered wall portions 52,53 than the partitions 54. That is, the quantity of the exhaust gas passing through the tapered wall portions 52,53 per unit surface area is larger than that passing through the partitions 54 per unit surface area. Therefore, commonly, the amount of the particulates depositing on the tapered wall portions 52,53 is larger than that depositing on the partitions 54, and thus the tapered wall portions 52,53 are more easily closed by the particulates than the partitions 54.

Opposed to this, according to the present invention, the amount of the oxidation material applied to the tapered wall portion 52,53 per unit volume is larger than that applied to the partition 54 per unit volume. According to this, the amount of the particulates removed by oxidation on each tapered wall portion 52,53 per unit time is larger than that on each partition 54 per unit time. Therefore, many particulates hardly deposit on the tapered wall portions 52,53.

The exhaust gas is difficult to pass through the tapered wall portions 52,53 if much oxidation material is applied to the tapered wall portions 52,53. Therefore, the exhaust gas generally uniformly passes through the tapered wall portions 52,53 and the partitions 54. Thus, many particulates hardly deposit on the tapered wall portions 52,53. Further, the tapered wall portions 52, 53 and the partitions 54 are efficiently used for collecting the particulates.

The amount of the particulates depositing on each tapered wall portion 52,53 at its upstream wall surface is larger than that at its downstream wall surface. That is, the tapered wall portions 52,53 are more easily closed at their upstream wall surfaces by the particulates than at their downstream wall surfaces. According to the present invention, the amount of the oxidation material applied to the upstream wall surface of each tapered wall portion 52,53 per unit volume is larger than that applied to the downstream wall surface thereof. According to this, the fine pores of the tapered wall portions 52,53 are hardly closed by the particulates.

The oxidation material applied to the filter will be explained in detail. In the present invention, a carrier layer is formed of the material such as alumina on the surrounding wall surfaces of the exhaust gas passages 50,51, i.e., the entire of the both sides of the partitions 54 and the tapered wall portions 52,53. Precious metal catalyst and active oxygen production agent are carried on the carrier layer. The agent takes and carries the oxygen when the excess of the oxygen exists around the agent, and discharges the carried oxygen therefrom in the form of an active oxygen when the concentration of the oxygen around the agent decreases. In the first embodiment, the oxidation material is constituted by the active oxygen production agent.

In the first embodiment, a platinum (Pt) is used as the precious metal catalyst, and at least one of the material selected from an alkali metal such as potassium (K), sodium (Na), lithium (Li), cesium (Cs) or rubidium (Rb), an alkali earth metal such as barium (Ba), calcium (Ca) or strontium (Sr), or a rare earth such as lanthanum (La), yttrium (Y) or Cerium (Ce), a transition metal such as iron (Fe), or a carbon family element such as Tin (Sn), is used as the active oxygen production agent.

It is preferred that an alkali metal or an alkali earth metal having an ionization tendency larger than calcium, that is, potassium, lithium, cesium, rubidium, barium or strontium is used as the active oxygen production agent.

The action of removal of the particulates by the filter will be explained in the case that platinum and potassium are carried on the carrier layer. Note that the action of removal of the particulates by the filter carrying other precious metal and other alkali metal, or alkali earth metal, or rare earth, or transition metal is generally the same as that explained below.

For example, in the case that the engine is a type of the compression ignition engine in which the fuel burns under an excess of the oxygen in the combustion chamber, the exhaust gas flowing into the filter 22 contains excessive oxygen. That is, in the case that the air fuel ratio of the mixture in the combustion chamber 5 is referred to as the air fuel ratio of the exhaust gas, in the compression ignition engine, the air fuel ratio of the exhaust gas is lean. Further, nitrogen monoxide (NO) is produced in the combustion chamber 5 of the compression ignition engine, and thus the exhaust gas contains NO. Furthermore, the fuel contains a sulfur constituent (S). The sulfur constituent reacts with the oxygen in the combustion chamber 5 and becomes sulfur dioxide ($SO_2$). Therefore, the exhaust gas contains $SO_2$. Thus, the exhaust gas containing the excessive oxygen, NO, and $SO_2$ flows into the inflow passages 50 of the filter 22.

As explained above, the exhaust gas contains the excessive oxygen and, thus, if the exhaust gas flows into the inflow passages 50 of the filter 22, as shown in FIG. 6A, the oxygen ($O_2$) adheres to the surface of the platinum in the form of $O_2^-$ or $O^{2-}$. On the other hand, the NO in the exhaust gas reacts with the $O_2^-$ or $O^{2-}$ on the surface of the platinum to become $NO_2$ ($2NO+O_2 \rightarrow 2NO_2$). Next, part of the produced $NO_2$ is oxidized on the platinum and is adsorbed to the active oxygen production agent 61, and thus is carried in the agent 61 in the form of nitrate ions $NO_3^-$. Otherwise, part of the produced $NO_2$ is oxidized on the platinum and is absorbed and diffuses in the agent 61, and thus is carried in the agent 61 in the form of nitrate ions ($NO_3^-$). As shown in FIG. 6A, the nitrate ions $NO_3^-$ bond with potassium to produce potassium nitrate ($KNO_3$).

On the other hand, as explained above, the exhaust gas also contains $SO_2$. This $SO_2$ is carried in the active oxygen production agent 61 by a mechanism similar to that of NO. That is, the oxygen ($O_2$) adheres to the surface of the platinum in the form of $O_2^-$ or $O^{2-}$. The $SO_2$ in the exhaust gas reacts with the $O_2^-$ or $O^{2-}$ on the surface of the platinum to become $SO_3$. Next, part of the produced $SO_3$ is oxidized on the platinum and is adsorbed to the agent 61, and thus is carried in the agent 61 in the form of sulfate ions ($SO_4^{2-}$). Otherwise, part of the produced $SO_3$ is oxidized on the platinum and is absorbed and diffuses in the agent 61, and thus is held in the agent 61 in the form of sulfate ions ($SO_4^{2-}$). The sulfate ions ($SO_4^{2-}$) bond with the potassium to produce potassium sulfate ($K_2SO_4$).

On the other hand, particulates comprised of mainly carbon (C), that is, soot, are produced in the combustion chamber 5. Therefore, the exhaust gas contains particulates. The particulates contact and adhere to the surface of the carrier layer, for example, the surface of the active oxygen production agent 61 as shown in FIG. 6B when the exhaust gas flows in the inflow passages 50 of the filter 22 or passes through the partitions 54.

If the particulates 62 adhere to the surface of the active oxygen production agent 61 in this way, the concentration of oxygen at the contact surface between the particulate 62 and the agent 61 falls. If the concentration of oxygen falls, a difference in concentration occurs with the inside of the high oxygen concentration active oxygen production agent 61, and therefore the oxygen in the agent 61 moves toward the contact surface between the particulate 62 and the agent 61. As a result, the potassium nitrate ($KNO_3$) formed in the agent 61 is broken down into potassium, oxygen, and NO. The oxygen moves toward the contact surface between the particulate 62 and the agent 61, while the NO is released from the surface or the inside of the agent 61 to the outside. The NO released to the outside is oxidized on the downstream side platinum and is again carried by adsorption or absorption in the agent 61.

On the other hand, at this time, the potassium sulfate ($K_2SO_4$) formed in the active oxygen production agent 61 is also broken down into potassium, oxygen, and $SO_2$. The oxygen moves toward the contact surface between the particulate 62 and the agent 61, while the $SO_2$ is released from the surface or the inside of the agent 61 to the outside. The $SO_2$ released to the outside is oxidized on the downstream side platinum and again carried by adsorption or absorption in the agent 61. Note that, since the potassium sulfate is stable and does not easily dissolve, the potassium sulfate does not easily release the active oxygen compared with the potassium nitrate.

As explained above, the active oxygen production agent 61 produces and releases the active oxygen by the reaction with the oxygen when the agent 61 absorbs the NOx therein in the form of the nitrate ions ($NO_3^-$). Similarly, as explained above, the agent 61 produces and releases the active oxygen by the reaction with the oxygen when the agent 61 absorbs the $SO_2$ therein in the form of the sulfate ions ($SO_4^{2-}$).

The oxygen moving toward the contact surface between the particulate 62 and the active oxygen production agent 61 is the oxygen broken down from compounds such as potassium nitrate ($KNO_3$) or potassium sulfate ($K_2SO_4$). The oxygen broken down from these compounds has an unpaired electron and thus is the active oxygen having an extremely high reactivity. Therefore, the oxygen moving toward the contact surface between the particulate 62 and the agent 61 becomes the active oxygen. Similarly, the oxygen produced by the reaction of the NOx and the oxygen in the agent 61 or the reaction of the $SO_2$ and the oxygen in the agent 61 becomes the active oxygen. If the active oxygen contacts the particulate 62, the particulate 62 is oxidized without emitting a luminous flame in a short period (from several seconds to several minutes) and the particulate 62 is completely removed. Therefore, the particulates hardly deposit on the filter 22.

In the prior art, when the particulates depositing in layers on the filter burn, the filter becomes red hot and burns along with a flame. This burning along with a flame does not continue unless the temperature is high. Therefore, to continue the burning along with a flame, the temperature of the filter must be maintained high.

As opposed to this, in the present invention, the particulate 62 is oxidized without emitting a luminous flame as explained above. At this time, the surface of the filter 22 does not become red hot. That is, in the present invention, the particulate 62 is removed by oxidation at a low temperature compared to the prior art. Therefore, the action of removal of the particulate 62 by oxidation without emitting a luminous flame according to the present invention is completely different from the action of removal of particulate by burning along with a flame.

The higher the temperature of the filter 22, the more active the platinum and the active oxygen production agent 61 become. Therefore, the higher the temperature of the filter 22, the amount of the particulates removable by oxidation without emitting a luminous flame on the filter 22 per unit time increases.

The solid line in FIG. 8 shows the amount G of the particulates removable by oxidation without emitting a luminous flame per unit time. The abscissa of FIG. 8 shows the temperature TF of the filter 22. If the amount of particulates flowing into the filter per unit time is called the inflowing particulate amount M, in the state that the inflowing particulate amount M is smaller than the amount G of particulates removable by oxidation, that is, in the region I of FIG. 8, when the particulates contact the filter 22, all of the particulates flowing into the filter 22 are removed by oxidation successively in a short time (from several seconds to several minutes) without emitting a luminous flame on the filter 22.

Figure 7A:
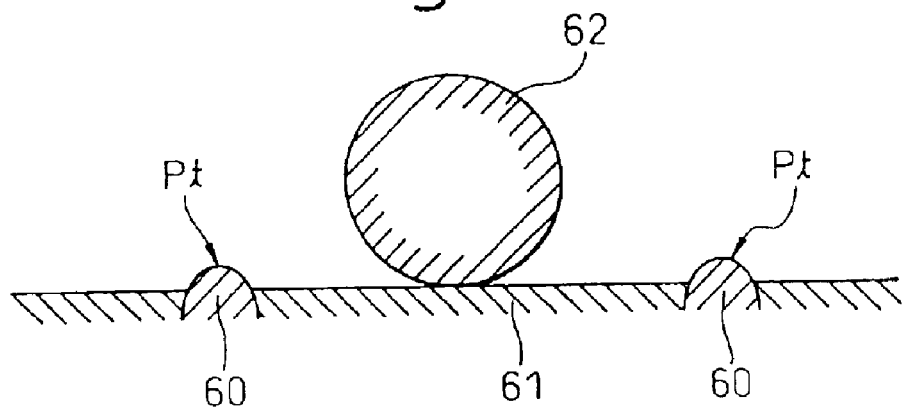
FIGS. 7A, 7B and 7C show an action of deposition of the particulates.
Figure 7B:
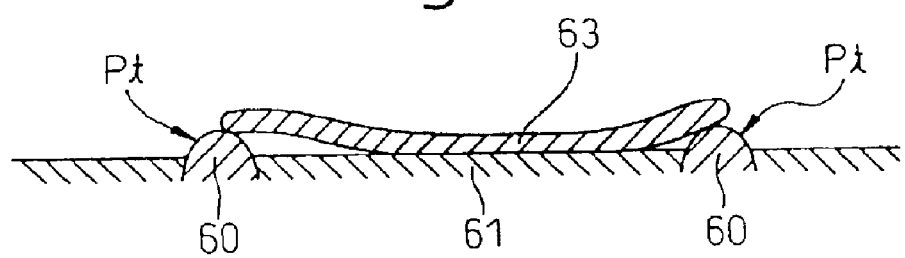
Figure 7C:
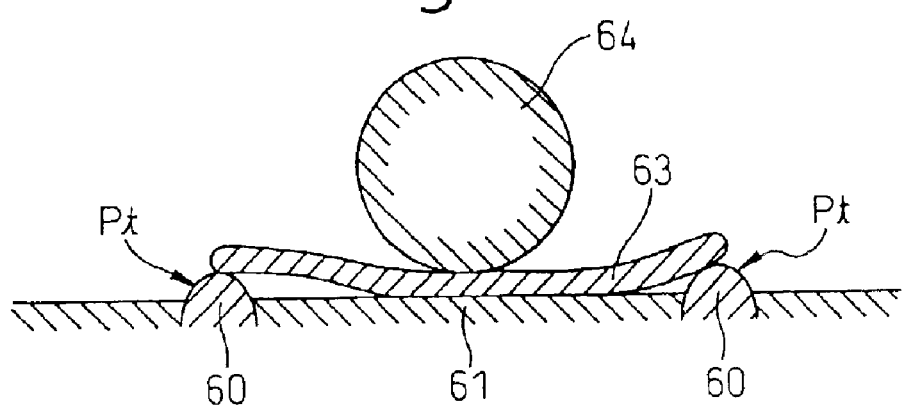
Figure 21:
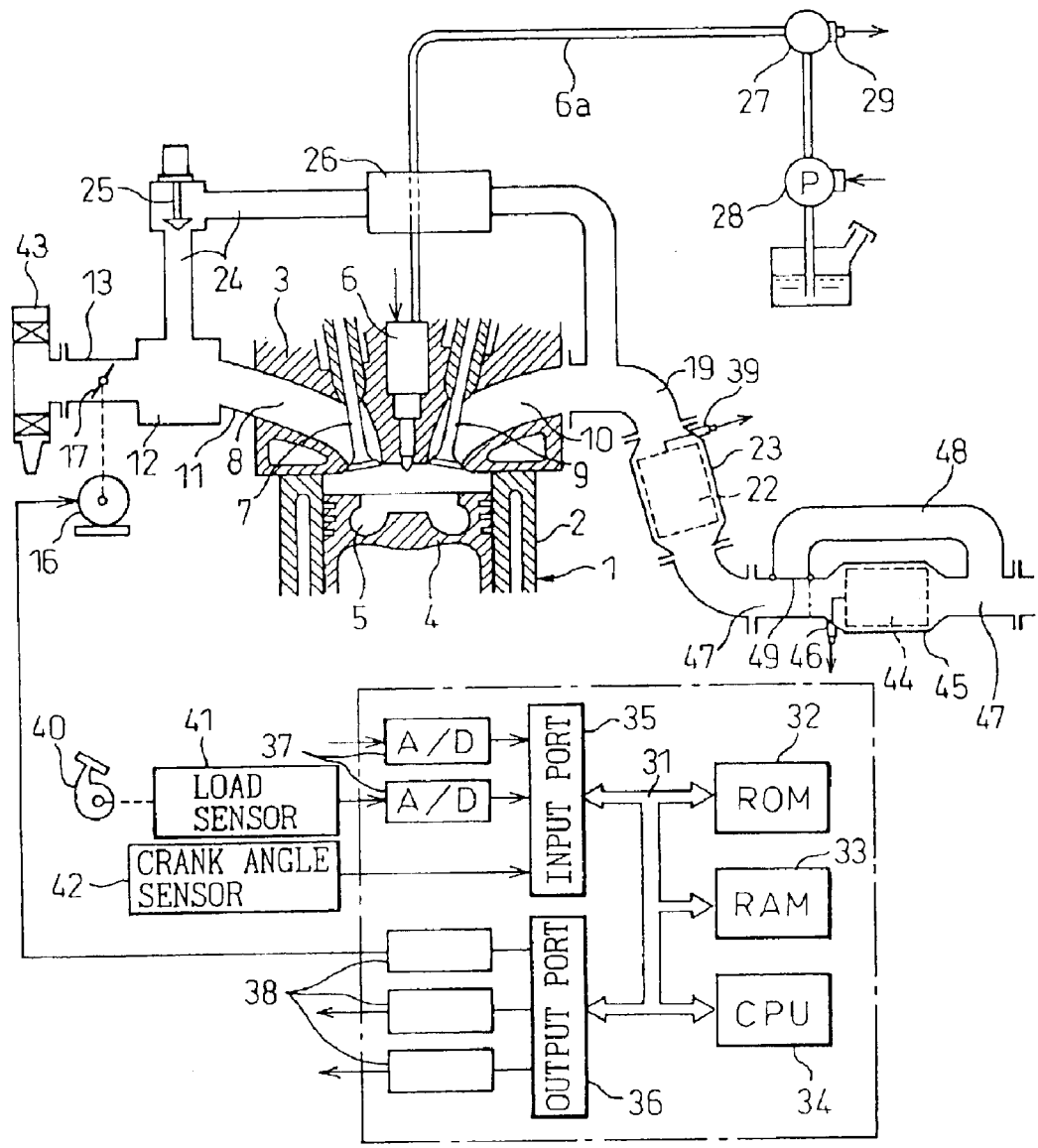
FIG. 21 shows the engine provided with the exhaust gas purification device of the eighth embodiment.

As opposed to this, in the state that the inflowing particulate amount M is larger than the amount G of particulates removable by oxidation, that is, in the region II of FIG. 21, the amount of the active oxygen is not sufficient for successive oxidation of all of the particulates. FIGS. 7A to 7C show the state of oxidation of particulates in this case.

That is, in the state that the amount of active oxygen is not sufficient for successive oxidation of all of the particulates, if the particulate 62 adheres to the active oxygen production agent 61 as shown in FIG. 7A, only part of the particulate 62 is oxidized. The portion of the particulate not sufficiently oxidized remains on the carrier layer of the active oxygen particulate agent 61. Next, if the state of an insufficient amount of active oxygen continues, the portions of the particulates not oxidized successively remain on the carrier layer. As a result, as shown in FIG. 7B, the surface of the carrier layer is covered by the residual particulate portion 63.

When the surface of the carrier layer is covered by the residual particulate portion 63, the platinum does not easily oxidize the NO and $SO_2$, and the active oxygen production agent 61 does not easily release the active oxygen, and thus the residual particulate portion 63 is not oxidized and easily remains as it is. As a result, as shown in FIG. 7C, other particulates 64 successively deposit on the residual particulate portion 63. That is, the particulates deposit in layers.

If the particulates deposit in layers in this way, the particulates will not be oxidized by the active oxygen. Therefore, other particulates successively deposit on the particulate 64. That is, if the inflowing particulate amount M continues to be larger than the amount G of particulates removable by oxidation, the particulates deposit in layers on the filter 22 and therefore unless the temperature of the exhaust gas is made higher or the temperature of the filter 22 is made higher, it is no longer possible to cause the deposited particulates to ignite and burn.

As explained above, in the region I of FIG. 8, the particulates are oxidized in a short time without emitting a luminous flame on the filter 22. In the region II of FIG. 8, the particulates deposit in layers in the filter 22. Therefore, to prevent the particulates from depositing in layers in the filter 22, the inflowing particulate amount M must be maintained smaller than the amount G of the particulates removable by oxidation at all times.

As can be understood from FIG. 8, in the filter 22 of the present invention, the particulates can be oxidized even if the temperature TF of the filter 22 is considerably low. Therefore, it is possible to maintain the inflowing particulate amount M and the filter temperature TF such that the inflowing particulate amount M is normally maintained smaller than the amount G of the particulates removable by oxidation. If the inflowing particulate amount M is maintained smaller than the amount G of the particulates removable by oxidation at all time, the particulates hardly deposit in the filter 22 and the pressure loss of the filter 22 hardly increases.

On the other hand, as explained above, in the state that the particulates deposit in layers on the filter 22, the active oxygen does not easily oxidize the particulates even when the inflowing particulate amount M becomes smaller than the amount G of the particulate removable by oxidation. However, when the portions of the particulates not oxidized begin to remain, that is, the amount of the depositing particulates is smaller than an allowed limit, if the inflowing particulate amount M becomes smaller than the amount G of the particulates removable by oxidation, the remaining portions of the particulates are oxidized and removed by the active oxygen without emitting a luminous flame.

Figure 9A:
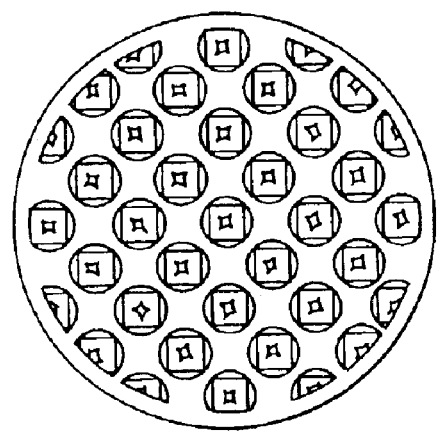
FIGS. 9A and 9B show the filter of the second embodiment.
Figure 9B:
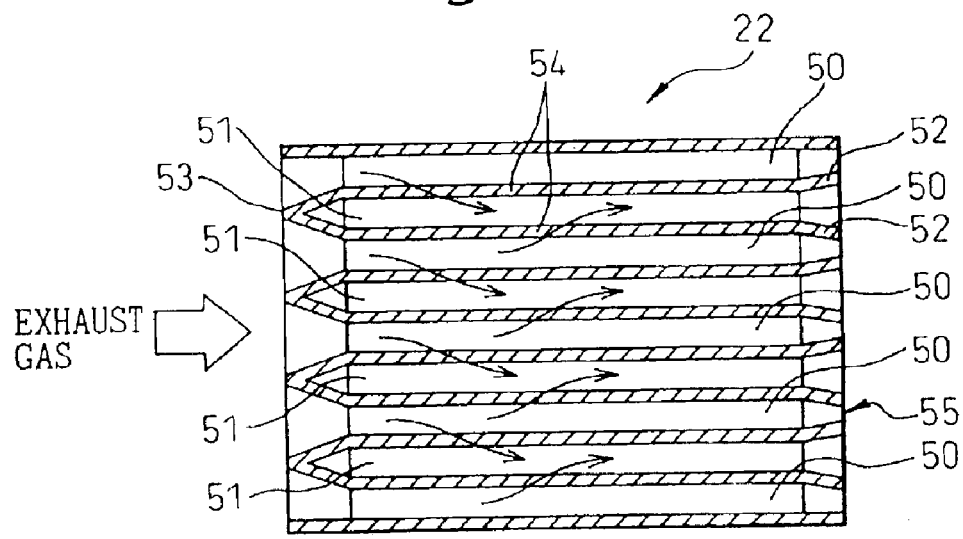

The filter of the second embodiment will be explained. FIGS. 9A and 9B show the filter of the second embodiment. FIGS. 9A and 9B show an end view and a longitudinal cross sectional view of the filter, respectively. The structure of the filter of the second embodiment is basically the same as that of the first embodiment.

In the second embodiment, similar to the first embodiment, a small hole 55 is formed in the tip of each downstream tapered wall portion 52. However, no small hole is formed in the tips of the upstream tapered wall portions 53. That is, the inflow passages 53 are completely closed by the upstream tapered wall portions 53. Therefore, the particulate collection ratio of the filter of the second embodiment is larger than that of the first embodiment.

In the second embodiment, even if the ash and the particulates deposit in the inflow passages 50, and then the exhaust gas does not easily pass through the partitions 54, the exhaust gas newly flowing into the inflow passages 50 can flow out of the filter 22 through the downstream small holes 55. Therefore, according to the second embodiment, the pressure loss of the filter 22 hardly increases to a value considerably larger than the potential pressure loss thereof.

Further, in the second embodiment, in the state that the amount of the ash and the particulates depositing in the inflow passages 50 increases, and then the pressure in the inflow passages 50 increases, the ash is discharged from the filter 22 through the downstream small holes 55 by the pressure in the inflow passages 50. Therefore, according to the second embodiment, the amount of the ash depositing on the filter 22 is maintained small at all times and, thus, it is not necessary to perform any special process for removing the ash from the filter 22 many times.

Furthermore, in the second embodiment, in the state that many particulates deposits in the inflow passages 50, and thus the exhaust gas does not easily pass through the partitions 54, the particulates newly flowing into the inflow passages 50 flow out of the filter 22 through the downstream small holes 55. Therefore, the amount of the particulates depositing in the filter 22 is maintained smaller than a constant amount. Thus, many particulates hardly burn in the filter 22 at once and, thus, the filter 22 is hardly melted by the heat derived from the burning of the particulates.

Further, the filter 22 of the second embodiment carries the oxidation material therein, and thus the depositing particulates are successively oxidized away. Therefore, in the state that many particulates deposit in the filter 22, and then some of the particulates are not collected by the filter 22 and flow out of the filter 22, that is, the particulate collection ratio of the filter 22 is small, the depositing particulates are successively oxidized away by the oxidation material, and thus some of the particulates newly flowing into the filter 22 are collected by the filter 22. Therefore, the amount of the particulates not collected by the filter 22 and flowing out thereof hardly considerably increases.

Immediately before the ash depositing in the inflow passages 50 is discharged from the filter 22 by the pressure in the inflow passages 50, the pressure in the inflow passages 50 may temporarily considerably increases. In the first embodiment, the exhaust gas newly flowing into the filter 22 flows into the outflow passages 51 through the upstream small holes 56, and then flows out of the filter 22. Therefore, the pressure in the inflow passages 50 hardly further increases.

However, in the second embodiment, until the ash is discharged from the filter 22, the pressure in the inflow passages 50, that is, the pressure loss of the filter 22 may continue to increase. Therefore, it is preferred to employ the filter of the second embodiment in the case that it is allowed that the pressure loss of the filter temporarily increases to the relatively high level, or in the case that the high particulate collection ratio is required of the filter.

In the second embodiment, the outflow passages 51 may be completely closed by the upstream tapered wall portion 53 by pressing the die 90 onto the upstream end face of the honeycomb structure 80 to an extent larger than that of the first method for producing the filter.

Figure 10A:
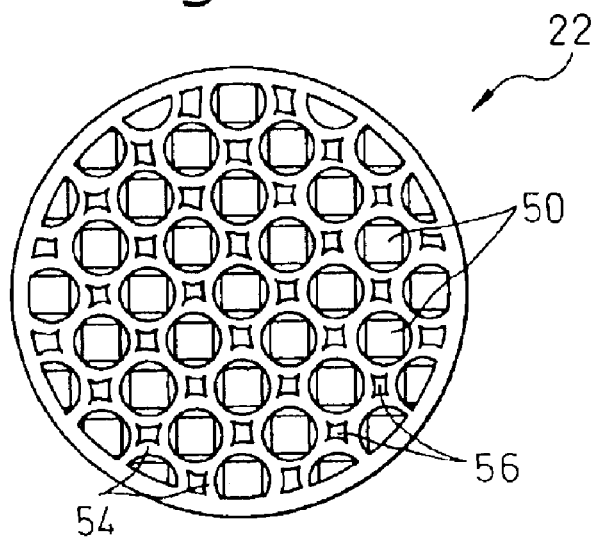
FIGS. 10A and 10B show the filter of the third embodiment.
Figure 10B:
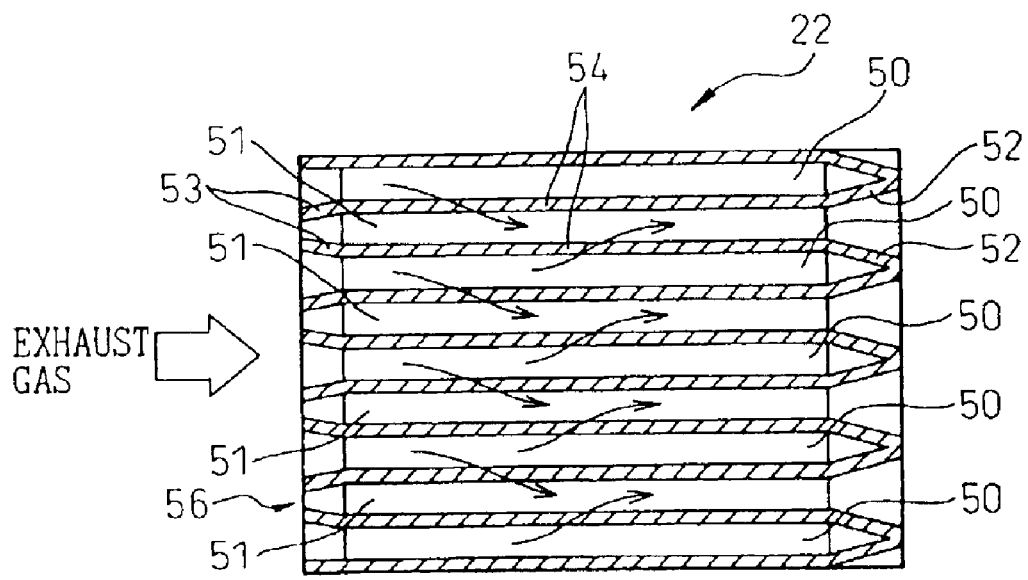

The filter of the third embodiment will be explained. FIGS. 10A and 10B show the filter of the third embodiment. FIGS. 10A and 10B show an end view and a longitudinal cross sectional view of the filter. The structure of the filter of the third embodiment is basically the same as that of the first embodiment.

In the first embodiment, similar to the first embodiment, a small hole 56 is formed in the tip of each upstream tapered wall portion 53. However, no small hole is formed in the tip of each downstream tapered wall portion 52. That is, the inflow passages 50 are completely closed by the downstream tapered wall portions 52. Thus, the particulate collection ratio of the filter of the third embodiment is larger than that of the first embodiment.

In the third embodiment, in the state that the ash and the particulates deposit in the inflow passages 50, and thus the exhaust gas does not easily pass through the partitions 54, the exhaust gas newly flowing into the filer 22 may flow out of the filter 22 through the upstream small holes 56. Therefore, according to the third embodiment, even if the pressure loss of the filter increases, the pressure loss of the filter hardly increases to a value considerably larger than the potential pressure loss thereof.

Further, in the third embodiment, as explained above, in the case that the ash and the particulates deposit in the inflow passages 50, and thus the exhaust gas does not pass through the partitions 54, much exhaust gas flows out of the filter 22 through the upstream small holes 56 and the outflow passages 51. That is, part of the ash newly flowing into the filter is discharged from the filter 22 through the upstream small holes 56 and the outflow passages 51. Therefore, it takes long time until the amount of the ash depositing in the inflow passages 50 becomes larger than the allowed amount. Thus, it is not necessary to perform a special process for removing the ash depositing in the filter 22 many times.

Further, in the third embodiment, as explained above, in the case that the ash and the particulates deposit in the inflow passages 50 and thus the exhaust gas does not easily pass through the partitions 54, much exhaust gas flows into the outflow passages 51 through the upstream small holes 56 and flows out of the outflow passages 51. That is, part of the particulates newly reaching the filter 22 flows into the outflow passages 51 through the upstream small holes 56 and flows out of the outflow passages 51. Therefore, it takes long time until the amount of the particulates depositing in the inflow passages 50 becomes larger than an allowed amount. Thus, the filter 22 is hardly melted by the heat derived from the burning of the particulates.

The filter 22 of the third embodiment carries the oxidation material therein. Therefore, by the time that the amount of the particulates depositing in the inflow passages 50 becomes larger than the allowed amount, the depositing particulates are oxidized and removed by the oxidation material. Thus, the amount of the depositing particulates hardly becomes larger than the allowed amount.

It is preferred to employ the filter of the third embodiment in the case that the exhaust gas contains a small amount of the ash and the large pressure loss of the filter is allowed, or in the case that the high particulate collection ratio is required of the filter. Further, in the third embodiment, the inflow passages 50 are completely closed by pressing the die 90 onto the downstream end face of the honeycomb structure 80 to the extent larger than that in the first method for producing the filter.

Figure 11:
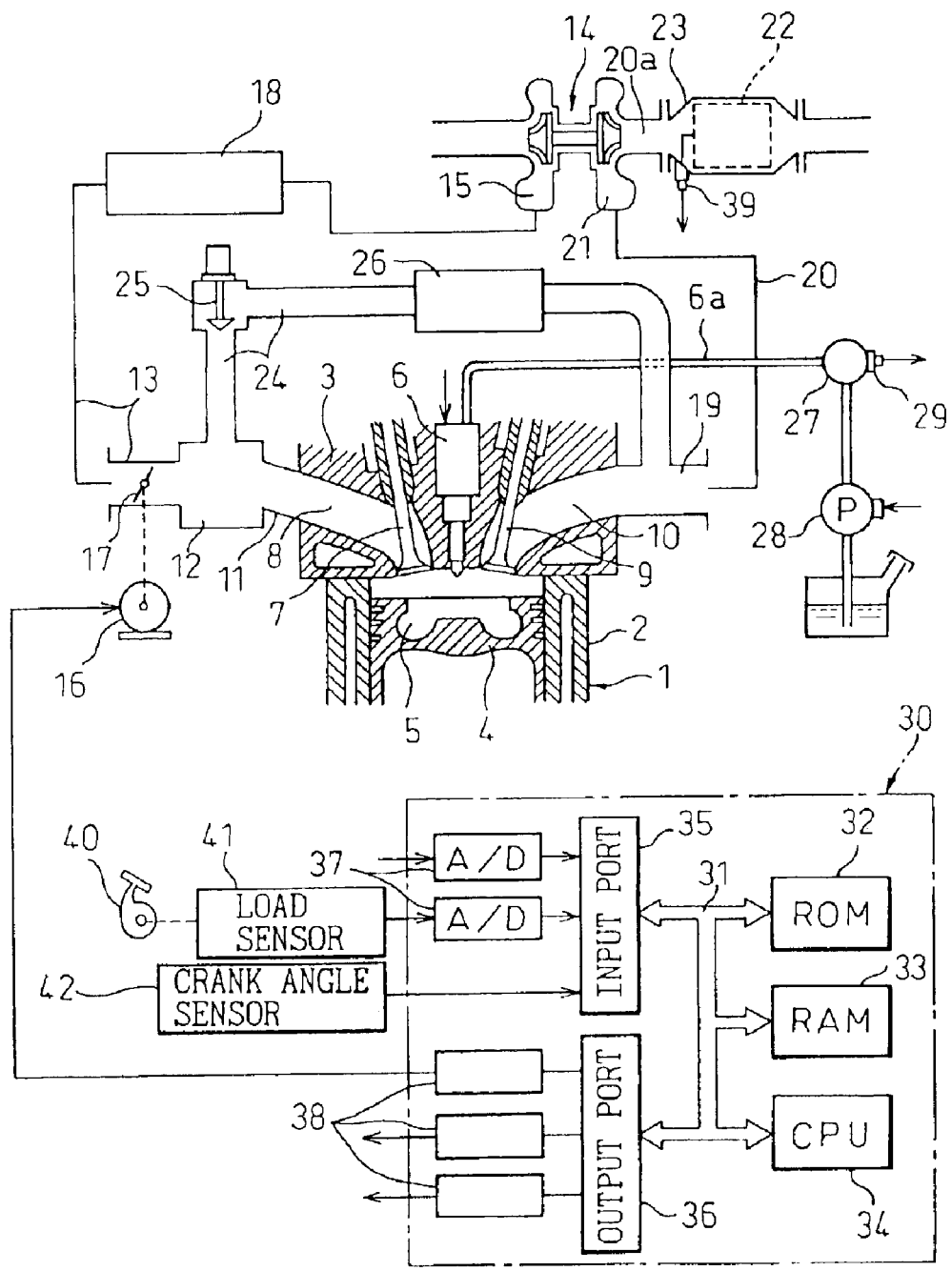
FIG. 11 shows an engine provided with the filter of the invention.

A control of the engine provided with the filter of the present invention will be explained. FIG. 11 shows a compression ignition type engine provided with the filter of the present invention. Note that the filter of the present invention may be applied to a plug ignition type engine.

Referring to FIG. 11, 1 shows an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake branch pipe 11 to a surge tank 12. The surge tank 12 is connected through an intake duct 13 to a compressor 15 of an exhaust turbocharger 14.

A throttle valve 17 driven by a stepping motor 16 is arranged in the intake duct 13. An intercooler 18 for cooling the intake air passing the intake duct 13 is arranged around the intake duct 13. In the engine shown in FIG. 11, an engine cooling water is supplied to the intercooler 18, and cools the intake air.

The exhaust port 10 is connected to an exhaust turbine 21 of the exhaust turbocharger 14 through an exhaust manifold 19 and an exhaust pipe 20. The outlet of the exhaust turbine 21 is connected to a casing 23 housing a particulate filter 22 through an exhaust pipe 20a.

The exhaust manifold 19 is connected to the surge tank 12 through an EGR passage 24. An electrically controlled EGR control valve 25 is arranged in the EGR passage 24. Further, an EGR cooler 26 for cooling the EGR gas passing through the EGR passage 24 is arranged around the EGR passage 24. In the engine shown in FIG. 11, the engine cooling water is supplied to the EGR cooler 26 and cools the EGR gas.

On the other hand, each fuel injector 6 is connected to the fuel reservoir, that is, a common rail 27 through a fuel supply tube 6a. Fuel is supplied to the common rail 27 from an electrically controlled variable discharge fuel pump 28. Fuel supplied to the common rail 27 is supplied to the fuel injectors 6 through the fuel supply tubes 6a. A fuel pressure sensor 29 for detecting the fuel pressure in the common rail 27 is attached to the common rail 27. The amount of discharge of fuel from the fuel pump 28 is controlled such that the fuel pressure in the common rail 27 is maintained at a target fuel pressure on the basis of the output signal of the fuel pressure sensor 29.

An electronic control unit 30 is comprised of a digital computer and is provided with a read only memory (ROM) 32, a random access memory (RAM) 33, a microprocessor (CPU) 34, an input port 35, and an output port 36. The output signal of the fuel pressure sensor 29 is input to the input port 35 through the corresponding AD converters 37. A temperature sensor 39 for detecting the exhaust gas temperature is attached to the filter 22. The output signal of the temperature sensor 39 is input to the input port 35 through the corresponding AD converter 37.

A load sensor 41 is connected to an accelerator pedal 40. The sensor 41 generates an output voltage proportional to the amount of depression L of the accelerator pedal 40. The output voltage of the sensor 41 is input to the input port 35 through a corresponding AD converter 37. Further, a crank angle sensor 42 for generating an output pulse each time a crankshaft rotates by, for example, 30° is connected to the input port 35. On the other hand, the output port 36 is connected to the fuel injectors 6, the stepping motor 16, the EGR control valve 25 and the fuel pump 28 through corresponding drive circuits 38.

As explained above, in the state that the particulates deposit in layers in the filter 22, even if the amount M of the inflowing particulates becomes smaller than the amount G of the particulates removable by oxidation, the active oxygen does not easily oxidize the particulates. In particular, immediately after the engine starts up, the filter temperature TF is low. At this time, the amount M of the inflowing particulates is larger than the amount G of the particulate removable by oxidation. In the state that the portions of the particulates not oxidized start to remain, in other words, in the state that the amount of the depositing particulates is smaller than an allowed upper limit, if the amount M of the inflowing particulates becomes smaller than the amount G of the particulates removable by oxidation, the remaining portions of the particulates are oxidized and removed by the active oxygen without emitting a luminous flame.

Therefore, in the present invention, the amount M of the inflowing particulates and the filter temperature TF are maintained such that the amount M of the inflowing particulates is smaller than the amount G of the particulates removable by oxidation. In addition, in the present invention, the amount M of the inflowing particulates and the filter temperature TF are maintained such that the remaining portions 63 of the particulates hardly cover the surface of the carrier layer as shown in FIG. 7B even if the amount M of the inflowing particulates temporarily becomes larger than the amount G of the particulates removable by oxidation, in other words, such that the amount of the particulates depositing in layers is maintained smaller than an allowed limit, and the particulates may be oxidized and removed when the amount M of the inflowing particulates becomes smaller than the amount G of the particulates removable by oxidation.

However, even if the amount M of the inflowing particulates and the filter temperature TF are controlled as explained above, the particulates may deposit in layers in the filter 22. In this case, the particulates depositing in the filter 22 may be oxidized and removed without emitting a luminous flame by temporarily making the air fuel ratio of part or entire of the exhaust gas rich.

That is, when the air fuel ratio of the exhaust gas is maintained lean for a while, much oxygen adheres to the platinum. Therefore, the catalytic action of the platinum decreases. However, if the air fuel ratio of the exhaust gas is made rich to decrease the concentration of oxygen in the exhaust gas, the oxygen is removed from the platinum, and thus the catalytic action of the platinum increases. Therefore, when the air fuel ratio of the exhaust gas is made rich, much active oxygen is easily discharged from the active oxygen production agent 61 to the outside at once. Thus, the depositing particulates are reformed by the active oxygen at once to the easily oxidizable state, and then the particulates burn away. Therefore, when the air fuel ratio of the exhaust gas is made rich, the amount G of the particulates removable by oxidation increases.

In this case, the air fuel ratio of the exhaust gas may be made rich when the particulates deposit in layers in the filter 22. Otherwise, the air fuel ratio of the exhaust gas may be periodically made rich independent of whether the particulates deposit in layers.

For example, the air fuel ratio of the exhaust gas is made rich by controlling the quantity of the fuel injected from the injector 6 such that the average air fuel ratio of the mixture in the combustion chamber 5, while the valve lifts of the throttle valve 17 and the EGR control valve 25 are controlled such that the EGR rate (the quantity of the EGR gas/(the quantity of the intake air+the quantity of the EGR gas)) is maintained larger than 65 percent when the engine load is small.

As explained above, in the case that the particulates are oxidized away by making the air fuel ratio of the exhaust gas rich when the particulates deposit in the filter 22 and are not easily oxidized away, the filter 22 of the present invention has an advantage that hydrocarbon (HC) hardly adheres to the upstream area of the filter 22.

That is, if the air fuel ratio of the exhaust gas is made rich, the hydrocarbon flows into the filter 22. At this time, the hydrocarbon easily adheres to the upstream area of the filter 22. As the temperature at the upstream area of the filter 22 is lower than that at its downstream area, the hydrocarbon adheres to the filter 22 at its upstream area and is not easily consumed. Thus, the hydrocarbon deposits on the upstream area of the filter 22. However, in the present invention, since the filter 22 carries much oxidation material at its upstream area, the hydrocarbon is consumed and is hardly deposits thereon. Therefore, the hydrocarbon hardly closes the upstream area of the filter 22.

Figure 12:
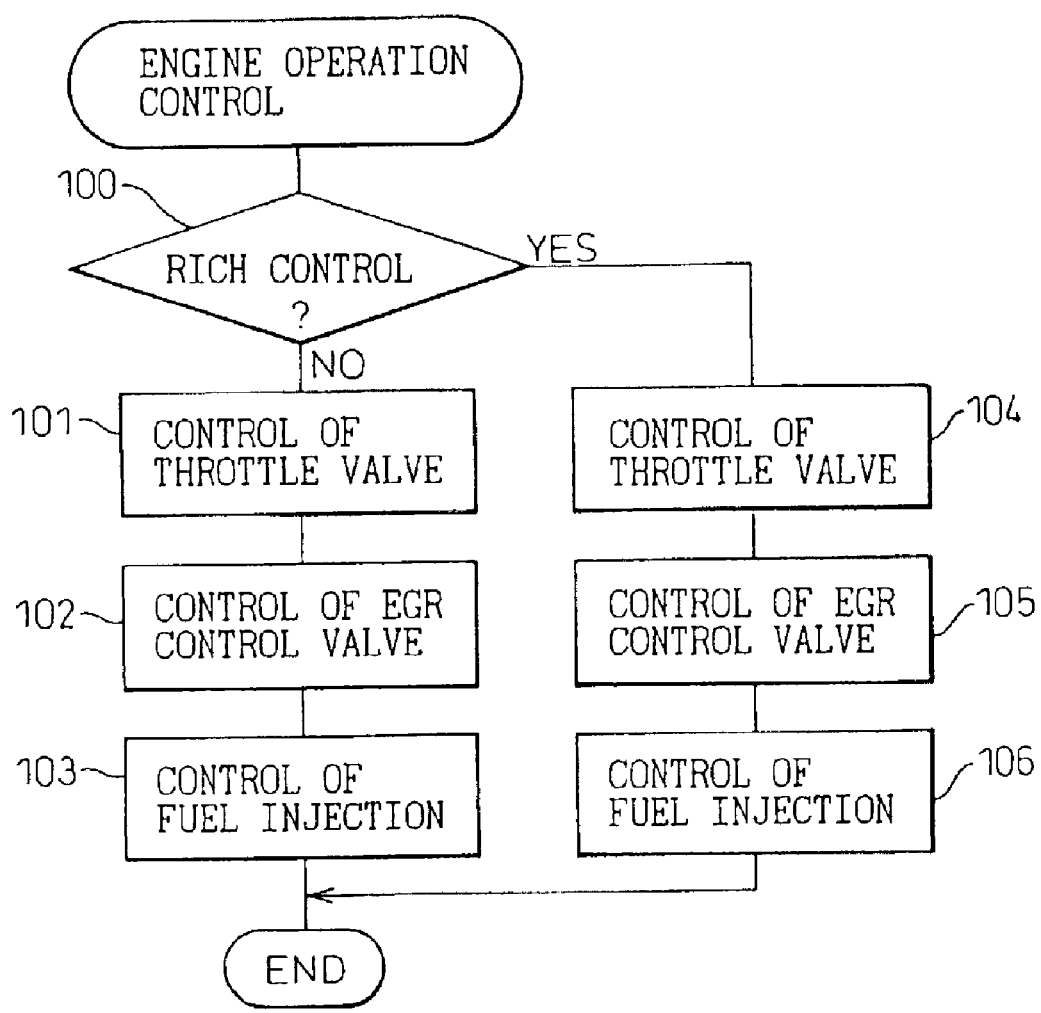
FIG. 12 shows a flowchart for controlling the engine operation.

FIG. 12 shows an example of the routine of the engine operation control explained above. Referring to FIG. 12, first, at step 100, it is judged if the average air fuel ratio of the mixture in the combustion chamber 5 should be made rich. When it is not necessary to make the average air fuel ratio of the mixture in the combustion chamber 5 rich, the valve lift of the throttle valve 17 is controlled at step 101, the valve lift of the EGR control valve 25 is controlled at step 102, and the quantity of the fuel injected from the injector 6 is controlled at step 103 such that the amount M of the inflowing particulates becomes smaller than the amount G of the particulates removable by oxidation.

On the other hand, when it is judged that the average air fuel ratio of the mixture in the combustion chamber 5 should be made rich at step 100, the valve lift of the throttle valve 17 is controlled at step 104 and the valve lift of the EGR control valve 25 at step 105 such that the EGR rate becomes larger than 65 percent, and the quantity of the fuel injected from the injector 6 is controlled at step 106 such that the average air fuel ratio of the mixture in the combustion chamber 5 becomes rich.

Fuel or lubrication oil contains calcium (Ca). Therefore, the exhaust gas contains calcium. Calcium produces calcium sulfate ($CaSO_4$) in the presence of SO3. The calcium sulfate is a solid and will not break down by heat even at a high temperature. Therefore, if calcium sulfate is produced, the calcium sulfate closes the fine pores of the filter 22. In this case, the exhaust gas does not easily pass through the filter 22.

In this case, if an alkali metal or an alkali earth metal having an ionization tendency higher than that of calcium, for example potassium (K), is used as the active oxygen production agent 61, the SO3 diffusing in the agent 61 bonds with the potassium to become potassium sulfate ($K_2SO_4$). On the other hand, the calcium does not bond with the SO3, and then passes through the partitions 54 of the filter 22 and flows into the outflow passages 50. Therefore, there is no longer any clogging of the fine pores of the partitions 54. Thus, as explained above, it is preferable to use an alkali metal or an alkali earth metal having an ionization tendency higher than calcium, that is, potassium, lithium, cesium, rubidium, barium, and strontium, as the active oxygen production agent 61.

The present invention may be applied to a filter comprising only precious metal such as platinum carried on the carrier layer formed therein. In this case, the solid line denoting the amount G of the particulates removable by oxidation slightly moves to the right side in FIG. 8. Further, in this case, $NO_2$ or $SO_3$ carried on the surface of the platinum produces the active oxygen. Furthermore, as the active oxygen production agent, a catalyst may be used, which adsorbs and carries $NO_2$ or $SO_3$, and produces the active oxygen from the carried $NO_2$ or $SO_3$.

Figure 13:
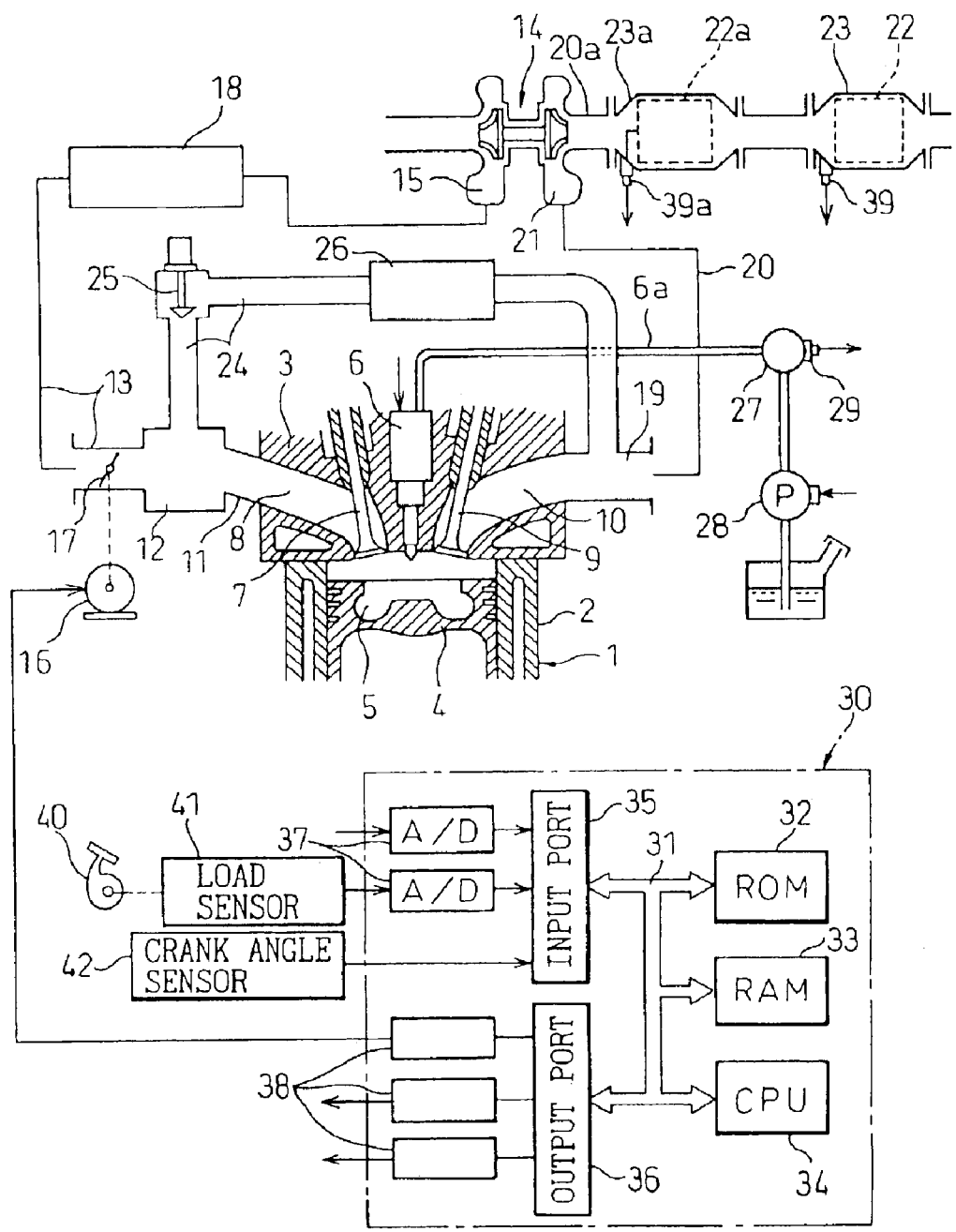
FIG. 13 shows the engine provided with the exhaust gas purification device of the fourth embodiment.

The fourth embodiment will be explained. As shown in FIG. 13, in the fourth embodiment, an oxidation catalyst 22a is arranged in the exhaust passage downstream of the outlet portion of the exhaust turbine 21 and upstream of the filter 22. The catalyst 22a is housed in a casing 23a. A temperature sensor 39a for detecting the temperature of the catalyst 22a is attached to the catalyst 22a. The output signal of the sensor 39a is input into the input port 37 through the corresponding AD converter 39a.

The oxidation catalyst 22a is, for example, formed by coating thin layers of alumina on the carrier formed of ceramics such as cordierite, or heat resistant steel, and then applying the precious metal catalyst to the alumina layer. The precious metal catalyst has an oxidation ability, and thus the catalyst 22a may strongly oxidize specific constituents, in particular, hydrocarbon and carbon monoxide ($2CO+O \rightarrow CO_2$, $HC+O_2 \rightarrow CO_2+H_2O$) away.

The oxidation catalyst 22a carries has an amount of the precious metal catalyst per unit surface area larger than that carried by the filter 22. In the catalyst 22a of the fourth embodiment, one or more of platinum, palladium and rhodium is used as the precious metal catalyst. Further, in the fourth embodiment, in addition to the precious metal catalyst, an oxygen storage agent such as cerium or nickel for absorbing and releasing the oxygen may be carried on the alumina carrier. Furthermore, in the fourth embodiment, in addition to the precious metal catalyst, a stabilization agent such as barium, lanthanum, or zirconium for preventing the change of the alumina and the precious metal catalyst by heat.

Figure 14A:
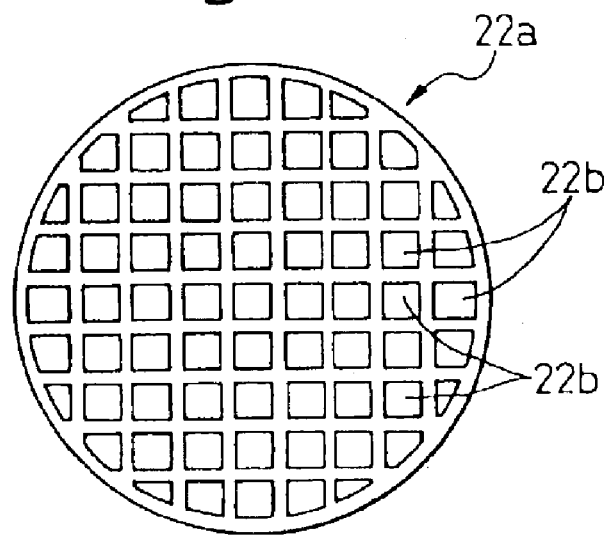
FIGS. 14A and 14B show an oxidization catalyst of the fourth embodiment.
Figure 14B:
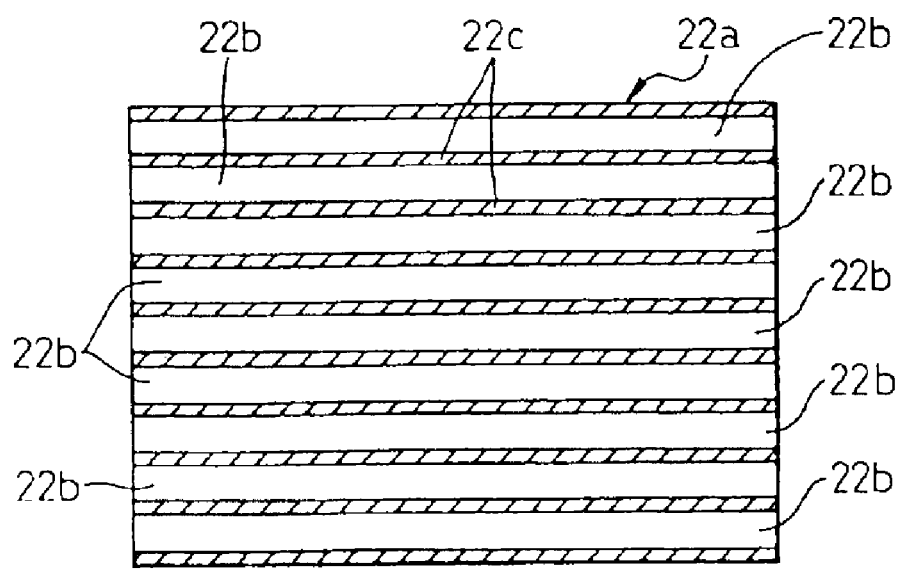

As shown in FIG. 14, the oxidation catalyst 22a comprises a honeycomb carrier. Therefore, the catalyst 22a has a plurality of exhaust gas passages 22b therein, which are defined by partitions 22c and extend parallel to each other. Further, the inlet and outlet openings of the exhaust gas passages 22b of the catalyst 22a are completely open. That is, the catalyst 22a is a monolith type catalyst. In the catalyst 22a, the exhaust gas is not forced to pass through the partitions 22c, and thus the catalyst 22a has a small pressure loss. Therefore, the catalyst 22a arranged upstream of the filter 22 increases the pressure loss of the exhaust gas purification device to only a small extent.

The exhaust gas contains particulates such as soot and Soluble Organic Fraction (SOF) therein. The fuel is smothered in the state that the oxygen is not sufficient in the combustion chamber. The soot is produced from the smothered fuel and mainly consists of carbon (C). On the other hand, the fuel and the hydrocarbon contained in the engine oil are evaporated by the high temperature in the combustion chamber and then deposit to become particulate matters by the decreasing of the temperature in the combustion chamber. The SOF is the depositing particulate matter and mainly consists of hydrocarbon.

If the atmosphere surrounding the precious metal catalyst carried in the filter 22 is oxidative, the catalyst strongly oxidizes the material contained in the exhaust gas. Therefore, if the engine is a compression ignition type engine, the lean exhaust gas is discharged therefrom, and thus the precious metal catalyst demonstrates a strong oxidizablity. Therefore, the SOF contained in the exhaust gas is oxidized away by the oxidizability of the catalyst ($C_mH_n+$ $O_2 \rightarrow CO_2+H_2O$). Of course, the SOF contained in the exhaust gas is oxidized away by the active oxygen released from the active oxygen production agent 61 ($C_mH_n+O^* \rightarrow CO_2+H_2O$).

However, depending on the engine operation state, the concentration of the SOF in the exhaust gas discharged from the combustion chamber 5 may temporarily increase. In this case, the concentration of the SOF in the exhaust gas reaching the filter 22 increases, and thus much SOF adheres to the upstream tapered wall portions 53 per unit time. The amount of the SOF removable by oxidation per unit time at the upstream tapered wall portions 53 is limited. Therefore, if the concentration of the SOF in the exhaust gas reaching the filter 22 increases, the SOF adhering to the upstream tapered wall portions 53 is not completely oxidized away, and then the SOF deposits thereon. Therefore, the SOF closes the upstream small holes 56.

In the filter 22, the upstream small holes 56 have sizes larger than those of the fine pores of the upstream tapered wall portion 53 or the partition 54, and the partitions 54 extend generally parallel to the flow direction of the exhaust gas. However, the upstream small holes 56 open to a direction perpendicular to the flow direction of the exhaust gas. Therefore, the quantity of the exhaust gas passing through the upstream holes 56 per unit surface area is larger than that passing through the upstream tapered wall portions 53 or the partitions 54 per unit surface area. In addition, since the upstream small holes 56 are located at the most upstream area of the filter 22, the particulates contained in the exhaust gas passing through the upstream small holes 56 have not been oxidized away. Therefore, the amount of the SOF passing through the upstream small holes 56 is larger than that passing through the upstream tapered wall portions 53 or the partitions 54. Thus, the SOF easily closes the upstream small holes 56.

Further, the soot has no viscosity, and thus normally does not close the upstream small holes 56, and then passes through the holes 56. On the other hand, the SOF has viscosity. Therefore, if the SOF adheres to the upstream tapered wall portions 53, the soot adheres to the SOF, and then closes the upstream small holes 56.

Furthermore, the SOF in the exhaust gas is oxidized away by the filter 22 before the SOF reaches the downstream small holes 55. Therefore, the SOF hardly closes the holes 55. However, if the particulates deposit in the filter 22, or the concentration of the SOF in the exhaust gas discharged from the engine increases, or the filter temperature does not rise at the engine start up to an extent that the filter demonstrates its oxidizability, the rate of oxidation of particulates by the filter 22 decreases. In this case, the filter 22 does not completely oxidize the particulates away. Therefore, much SOF reaches the downstream small holes 55. In this case, for the same reasons as those in connection with the upstream small holes 56, the SOF closes the downstream small holes 55.

Opposed to this, in the fourth embodiment, the oxidation catalyst 22a is arranged upstream of the filter 22. The catalyst 22a strongly oxidizes and removes the SOF contained in the exhaust gas ($C_mH_n+O_2 \rightarrow C_2O+H_2O$). Therefore, the amount of the SOF contained in the exhaust gas is decreased before the exhaust gas flows into the filter 22. If the exhaust gas flowing into the filter 22 contains almost no SOF, the SOF hardly deposits around the small holes 55,56, and hardly closes them.

Note that, in the case that the engine is designed to inject the fuel into the exhaust gas on the basis of the total amount of the NOx carried by the active oxygen production agent 61 of the filter 22 in order to reduce the NOx carried by the agent 61, the concentration of the SOF in the exhaust gas increases as explained above when fuel is injected into the exhaust gas.

Further, note that, in the case that the engine is designed that the fuel combustion temperature in the combustion chamber becomes lower than the soot generation temperature by circulating the exhaust gas through the EGR passage by a quantity larger than that wherein the generation amount of the soot is peak, the concentration of the SOF in the exhaust gas increases as explained above when the exhaust gas is circulated into the intake passage by a quantity larger than that wherein the generation amount of the soot is peak. In this case, the quantity of the intake air, i.e., the oxygen decreases, and thus the fuel does not easily burn in the combustion chamber 5. Therefore, the concentration of the SOF in the exhaust gas increases.

The fifth embodiment will be explained. In the above explained fourth embodiment, the sizes of the holes 55,56 are generally the same as each other. Opposed to this, in the fifth embodiment, as shown in FIGS. 15A and 15B, the sizes of the holes 55,56 are different from each other. In detail, in the fifth embodiment, the sizes of the upstream holes 56 successively increase from a central region of the filter 22 to a peripheral region thereof. The central region is the region around the axis of the filter 22 corresponding to the axis of the housing of the turbine, i.e., of the exhaust pipe. On the other hand, the peripheral region is the region around the central region of the filter 22 and adjacent to the periphery of the filter 22. Further, the sizes of the downstream holes 55 successively increase from the central region of the filter 22 to the peripheral region thereof.

In the fifth embodiment, in order to maintain the pressure loss of the filter 22 small, the casing 23 hosing the filter 22 has a diameter larger than that of the exhaust pipe connected thereto. Further, the casing 23 is connected to the exhaust pipe such that the central axis of the casing 23 aligns with that of the exhaust pipe. Furthermore, the casing 23 is smoothly connected to the exhaust pipe by the conical portion of the casing 23. In this structure, the exhaust gas flowing into the casing 23 from the exhaust pipe easily flows into the central region of the filter 22, and does not easily flow into the peripheral region thereof. Therefore, the quantity of the exhaust gas flowing in the central region of the filter 22 is larger than that flowing in the peripheral region thereof. Thus, the distribution of the exhaust gas flowing in the filter 22 is not uniform.

Opposed to this, in the fifth embodiment, the small holes 55,56 at the central region of the filter 22 have sizes larger than those at the peripheral region thereof. If the small holes have large sizes, the exhaust gas easily passes through the small holes. Therefore, in the fifth embodiment, the difference in quantity of the exhaust gas flowing in the central region of the filter 22 and the peripheral region thereof decreases. That is, as explained above, the exhaust gas reaching the filter 22 easily flows into the central region of the filter 22. However, in the fifth embodiment, the small holes 55,56 at the peripheral region of the filter 22 are enlarged. Therefore, the exhaust back pressure in the peripheral region of the filter 22 is small, and thus the exhaust gas easily flows thereinto. Therefore, the distribution of the exhaust gas is more uniform. Accordingly, the exhaust gas uniformly passes through the filter 22, and thus the filter 22 is efficiently used.

The filter 22 is heated mainly by heat derived from the exhaust gas, and from the chemical reaction, in the filter 22, between the specific components contained in the exhaust gas. The quantity of the heat for heating the filter 22 is proportional to the quantity of the exhaust gas flowing into the filter 22. Therefore, the temperature of each portion of the filter 22 depends on the quantity of the exhaust gas flowing thereinto.

In the case that the sizes of the small holes 55,56 of the filter 22 are the same as each other and the cross sectional areas of the exhaust gas passages 50,51 of the filter 22 are the same as each other, the exhaust gas more easily flows into the central region of the filter 22 than into the peripheral region thereof. Therefore, the filter 22 has a temperature at its peripheral region lower than that at its central region. Further, the peripheral wall surface of the filter 22 is exposed to the atmosphere having a low temperature. Therefore, the heat is discharged from the peripheral region of the filter 22 to the atmosphere. Thus, the filter 22 has a temperature at its peripheral region lower than that at its central region. Since an ability to oxidize the particulates at each region of the filter 22 is proportional to the temperature thereof, the particulate oxidation ability is large around the small holes 55,56 at the central region of the filter 22, and thus the particulates do not easily close the small holes 55,56 at this region. On the other hand, at the peripheral region of the filter 22, the particulate oxidation ability is small around the small holes 55,56, and thus the particulates easily close the holes 55,56 in this region.

Opposed to this, in the fifth embodiment, the sizes of the small holes 55,56 successively increase from the central region of the filter 22 to the peripheral region thereof. Therefore, the exhaust gas uniformly flows in the filter 22, and thus the distribution of the temperature of the filter 22 is uniform. Accordingly, at the central region of the filter 22, the small holes 55,56 have small sizes but the tapered wall portions 52,53 around the small holes 55,56 have high temperatures. Therefore, the particulate oxidation ability at the central region of the filter 22 is large, and thus the particulates do not easily close the small holes 55,56 at this region. On the other hand, at the peripheral region of the filter 22, the tapered wall portions 52,53 around the small holes 55,56 have low temperatures but the small holes 55,56 have large sizes. Therefore, the particulates do not easily close the small holes 55,56 at the peripheral region of the filter 22.

As explained above, when the amount of the particulates depositing in the filter 22 becomes large, it is necessary to perform a control for raising the temperature of the filter 22 to a certain temperature to oxidize the depositing particulates away from the filter 22. Further, when the amount of the $SO_2$ carried by the filter 22 is large, it is necessary to perform control for raising the temperature of the filter 22 to a certain temperature to discharge the carried $SO_2$ from the filter 22. However, on performing the above control, if the filter 22 has a difference in temperature, the temperature of the portion originally having a low temperature may not reach a target temperature, or the temperature of the portion originally having a high temperature may excessively increase beyond the target temperature. In particular, in the case that the temperature of the portion originally having a high temperature excessively increases beyond the target temperature, an energy is wasted, and in some cases, the filter 22 is melted by the high temperature.

Opposed to this, in the fifth embodiment, the difference in temperature in the filter 22 is small. Therefore, when the temperature of the filter 22 is raised to the target temperature, the temperatures of portions of the filter 22 are hardly excessively raised to high temperatures. Therefore, the waste of the energy and the melting of the filter 22 are avoided.

Note that, in the fifth embodiment, the sizes of the holes 55,56 may increase step by step, for example, in two or three steps from the central region of the filter 22 to its peripheral region.

Note that, since the inlet and outlet openings of the exhaust gas passages of the catalyst 22 have sizes larger than those of the small holes 55,56 of the filter 22, the SOF contained in the exhaust gas hardly closes the openings of the exhaust gas passages of the catalyst 22.

Further, a catalyst which is not a monolith type catalyst may be used as the oxidation catalyst. Further, in place of the oxidation catalyst, there may be used a catalyst for absorbing and carrying the NOx contained in the exhaust gas when the lean exhaust gas flows thereinto, and for releasing and reducing the carried NOx therefrom when the rich exhaust gas flows thereinto even if the catalyst can remove the SOF.

Figure 16A:
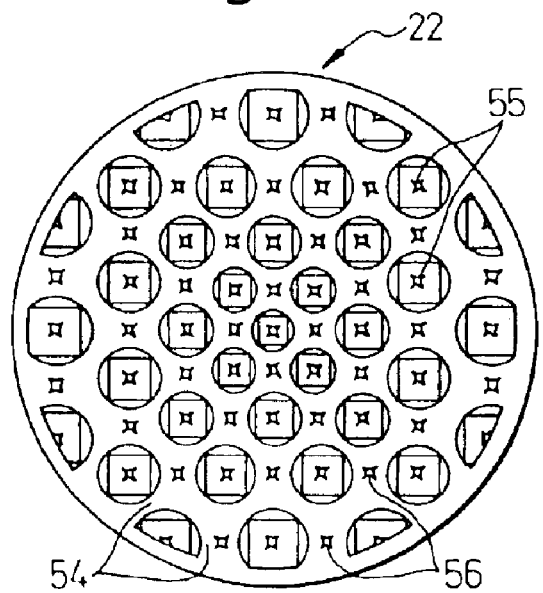
FIGS. 16A and 16B show the filter of the sixth embodiment.
Figure 16B:
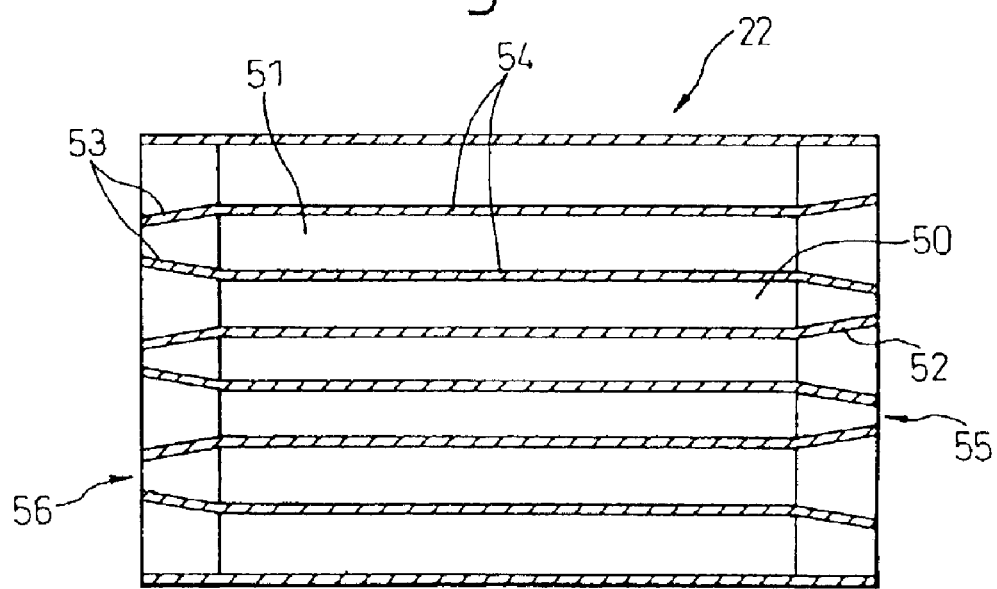

The sixth embodiment will be explained. FIGS. 16A and 16B show an end view and a longitudinal cross sectional view of the filter of the sixth embodiment, respectively. In sixth embodiment, the sizes of the holes 55,56 of the filter 22 are generally the same as each other. However, as shown in FIGS. 16A and 16B, the cross sectional areas of the exhaust gas passages 50,51 successively increase from the central region of the filter 22 to the peripheral region thereof. Accordingly, a difference between the quantities of the exhaust gas passing through the central and peripheral regions of the filter 22 is small, and thus the exhaust gas uniformly flows in the filter 22.

Therefore, for the same reasons as those explained regarding the fifth embodiment, the filter 22 has a small difference in temperature, and thus the particulates do not easily close the small holes 55,56 at the peripheral region of the filter 22. Further, since the filter 22 has a small difference in temperature, the waste of the energy and the melting of the filter are avoided when the temperature of the filter 22 is raised to the target temperature.

Note that the fifth and sixth embodiments may be combined. That is, the sizes of the small holes 55,56 of the filter 22 and the cross sectional areas of the exhaust gas passages 50,51 may successively increase from the central region of the filter 22 to the peripheral region thereof.

Figure 17:
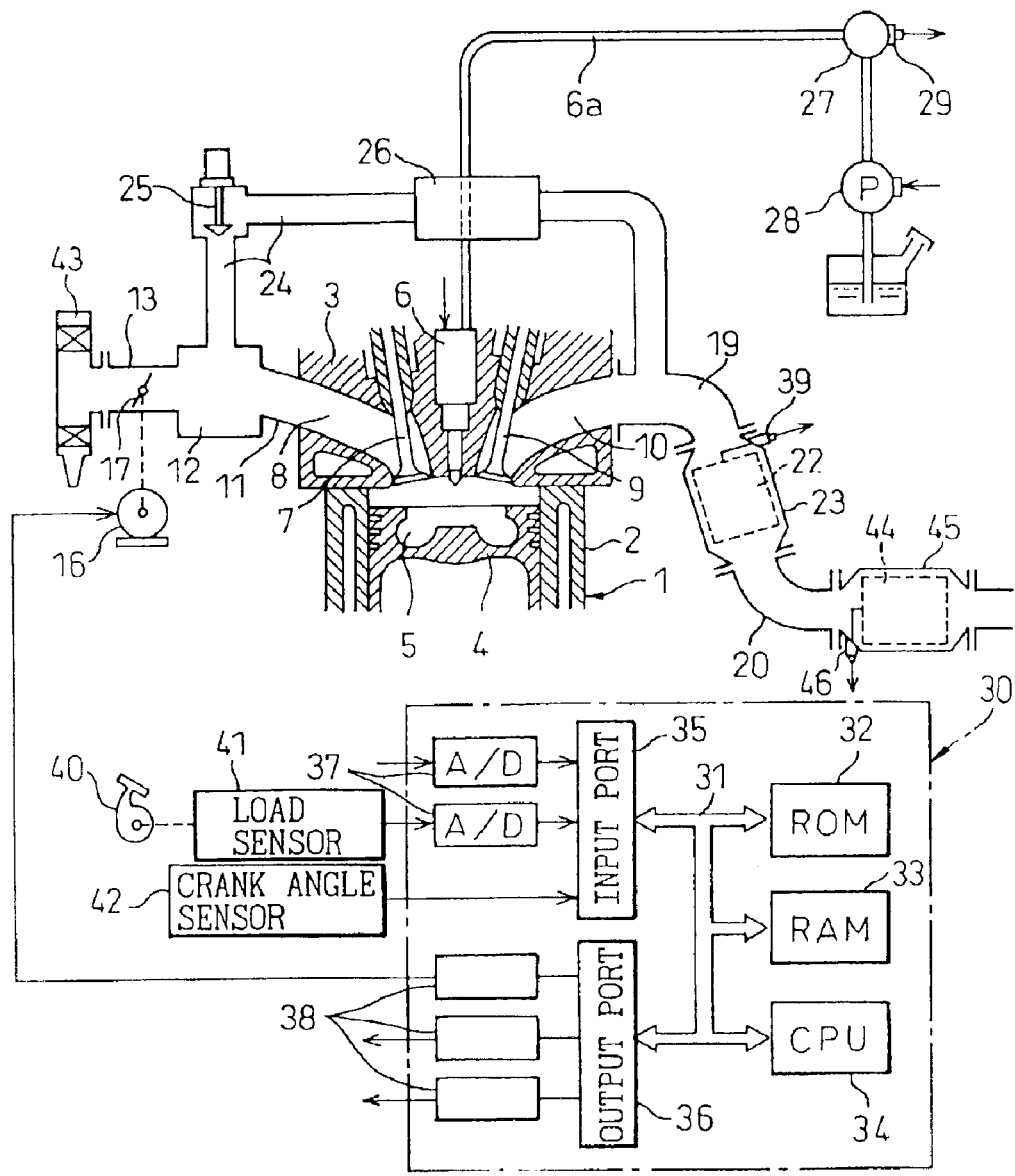
FIG. 17 shows the engine provided with the exhaust gas purification device of the seventh embodiment.

The seventh embodiment will be explained. As shown in FIG. 17, in the seventh embodiment, the intake passage 13 is connected to an air cleaner 43 upstream of the throttle valve 17. Further, in the seventh embodiment, a particulate filter (hereinafter, referred to as main filter) 44 is arranged in the exhaust passage downstream of the filter 22. The main filter 44 is housed in a casing 45. A temperature sensor 46 for detecting the temperature of the main filter 44 is attached to the upstream end of the main filter 44. The output signal of the temperature sensor 46 is input into the input port 35 through the corresponding AD converter 37. In the seventh embodiment, the structure of the filter 22 is the same as the filter of the first embodiment. Hereinafter, the filter 22 is referred to as the sub-filter 22.

Figure 18A:
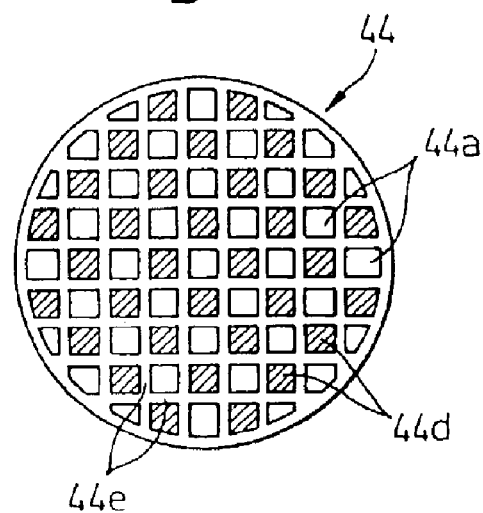
FIGS. 18A and 18B show a main particulate filter of the seventh embodiment.
Figure 18B:
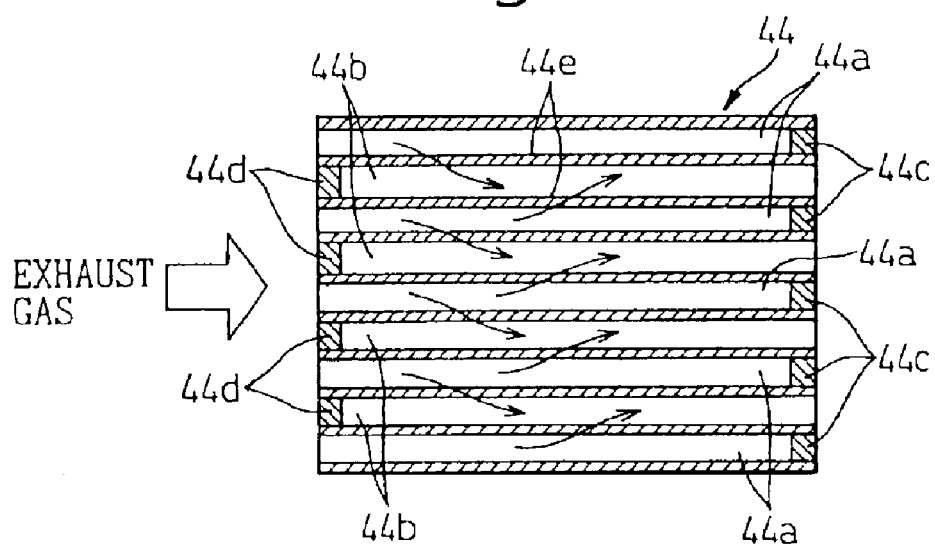

Referring to FIGS. 18A and 18B, the main filter 44 will be explained. FIGS. 18A and 18B show an end view and a longitudinal cross sectional view of the main filter, respectively. As shown in FIGS. 18A and 18B, the filter 44 has a honeycomb structure, and comprises a plurality of exhaust gas passages 44a,44b extending parallel to each other. These passages are constituted by exhaust gas inflow and outflow passages 44a and 44b. The inflow passages 44a are closed at their downstream ends by plugs 44c. On the other hand, the outflow passages 44b are closed at their upstream ends by plugs 44d.

The inflow and outflow passages 44a,44b are alternatively positioned. Thin partitions 44e intervene between the inflow and outflow passages 44a,44b. Four inflow passages 44a are positioned around each outflow passage 44b.

In other words, one 44a of the adjacent passages 44a,44b is closed at its downstream end by the plug 44c, and the other passage 44b is closed at its upstream end by the plug 44d.

The main filter 44 is formed of a porous material such as ceramics such as cordierite containing fine pores, each having a predetermined average size. Therefore, as shown in FIG. 18B, the exhaust gas flows into the inflow passages 44a, and then into the adjacent outflow passages 44b through the fine pores of the surrounding partitions 44e. When the exhaust gas flows in the passages 44a,44b, the particulates contained in the exhaust gas are collected by the wall surfaces of the partitions 44e defining the passages 44a,44b. Further, when the exhaust gas passes through the fine pores of the partitions 44e, the particulates contained in the exhaust gas are collected by the wall surfaces defining the fine pores.

Note that, similar to the sub-filter 22, the main filter 44 also carries precious metal catalyst and active oxygen production agent therein. Further, similar to the sub-filter 22, the end openings of the exhaust gas passages 44a,44b of the main filter 44 may be partially closed by tapered wall portions and have small holes at the tips of the tapered wall portions. Furthermore, the end openings of the exhaust gas passages 44a,44b of the main filter 44 may be completely closed by tapered wall portions and have no small hole at the tips of the tapered wall portions. Further, the main filter 44 may be of a monolith type such that the end openings of the exhaust gas passages 44a44b are not closed, and thus are completely open.

As explained in connection with the first embodiment, the sub-filter 22 has a pressure loss smaller than that of the main filter 44. Therefore, although the sub-filter 22 is arranged upstream of the main filter 44, the total pressure loss of the exhaust gas purification device does not largely increase. Of course, the total particulate collection ratio of the exhaust gas purification device does not largely decrease.

As explained above, the active oxygen production agent of the main filter 44 carries the oxygen in the form of the nitrate ions when the atmosphere surrounding the agent is oxidative. That is, the agent of the main filter 44 serves as a NOx carrier agent for carrying the NOx therein when the atmosphere surrounding the agent is oxidative. The amount of the NOx which the agent can carry therein has an upper limit. If the amount of the NOx reaches the upper limit, the agent of the main filter 44 does not newly carry the NOx, and then the NOx flows out of the main filter 44. Therefore, it is necessary to purify the NOx carried in the agent by reducing the same before the amount of the carried NOx reaches the upper limit.

Figure 19A:
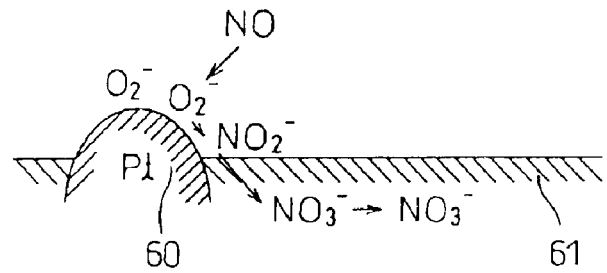
FIGS. 19A–19C show an action of the oxidation of the particulates by the main filter.
Figure 19B:
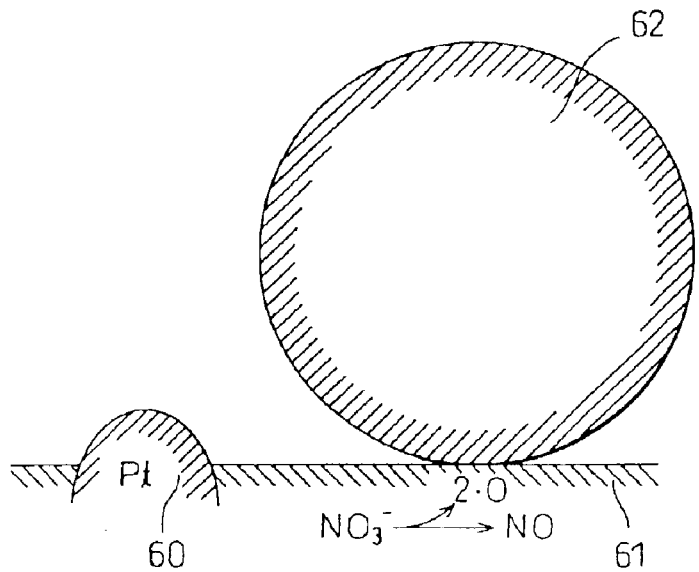
Figure 19C:
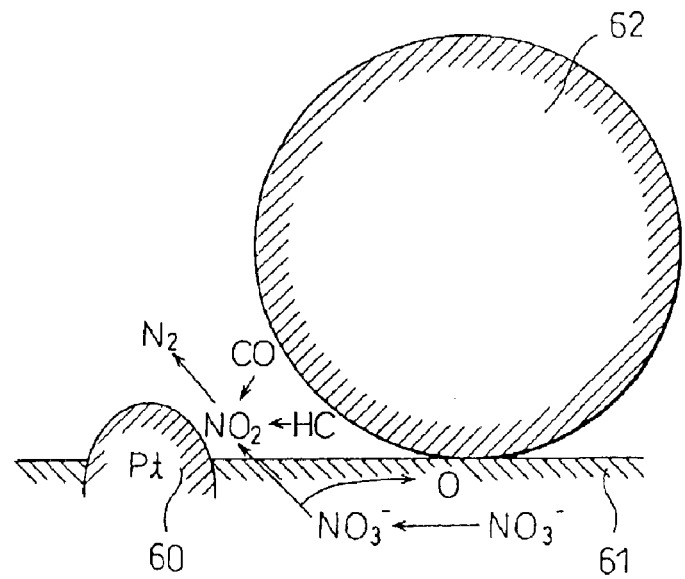

The active oxygen production agent releases the oxygen carried in the form of the nitrate ions when the atmosphere surrounding the agent becomes reductive. In other words, the agent releases the NOx carried in the form of the nitrate ions when the atmosphere surrounding the agent becomes reductive. At this time, as shown in FIG. 19C, the NOx released from the agent is reduced by the hydrocarbon and the carbon monoxide contained in the exhaust gas.

In the seventh embodiment, before the amount of the carried NOx reaches an allowed upper limit, the NOx carried in the agent of the main filter 44 is reduced and purified by supplying the rich or generally stoichiometric exhaust gas to the filter 44. Note that, in consideration of this function of the filter 44, the filter 44 has a NOx catalyst comprising the NOx carrier agent and the precious metal catalyst.

Note that if the rich exhaust gas having a low concentration of the oxygen is supplied to the main filter 44, the ratio of the hydrocarbon and the carbon monoxide oxidized away by the main filter 44 is small. On the other hand, if the lean or generally stoichiometric exhaust gas is supplied to the main filter 44, the ratio of the hydrocarbon and the carbon monoxide oxidized away by the filter 44 is large. Further, FIGS. 19A and 19B correspond to FIGS. 6A and 6B, respectively.

As explained above, the filters 22,44 purify four kinds of components such as the particulates, the NOx, the carbon monoxide, and the hydrocarbon, depending on the characteristics of the exhaust gas flowing thereinto. The platinum and the active oxygen production agent carried by the filters 22,44 are more active when the temperatures thereof are high. Therefore, the purification ratios of the above four kinds of the components by the filters 22,44 depend on the temperature of the exhaust gas flowing thereinto, and become large when an exhaust gas having a high temperature flows thereinto.

In the seventh embodiment, the sub-filter 22 is arranged directly downstream of the exhaust manifold 17. Therefore, the hot exhaust gas immediately after being discharged from the combustion chamber 5 flows into the sub-filter 22, and thus the temperature of the sub-filter 22 is maintained high. Of course, at the engine start up, the exhaust gas discharged from the combustion chamber 5 has a low temperature but, according to the seventh embodiment, the temperature of the sub-filter 22 is rapidly raised by the exhaust gas and is maintained high. Accordingly, in the seventh embodiment, the purification ratios of the above four kinds of components are high.

Figure 20:
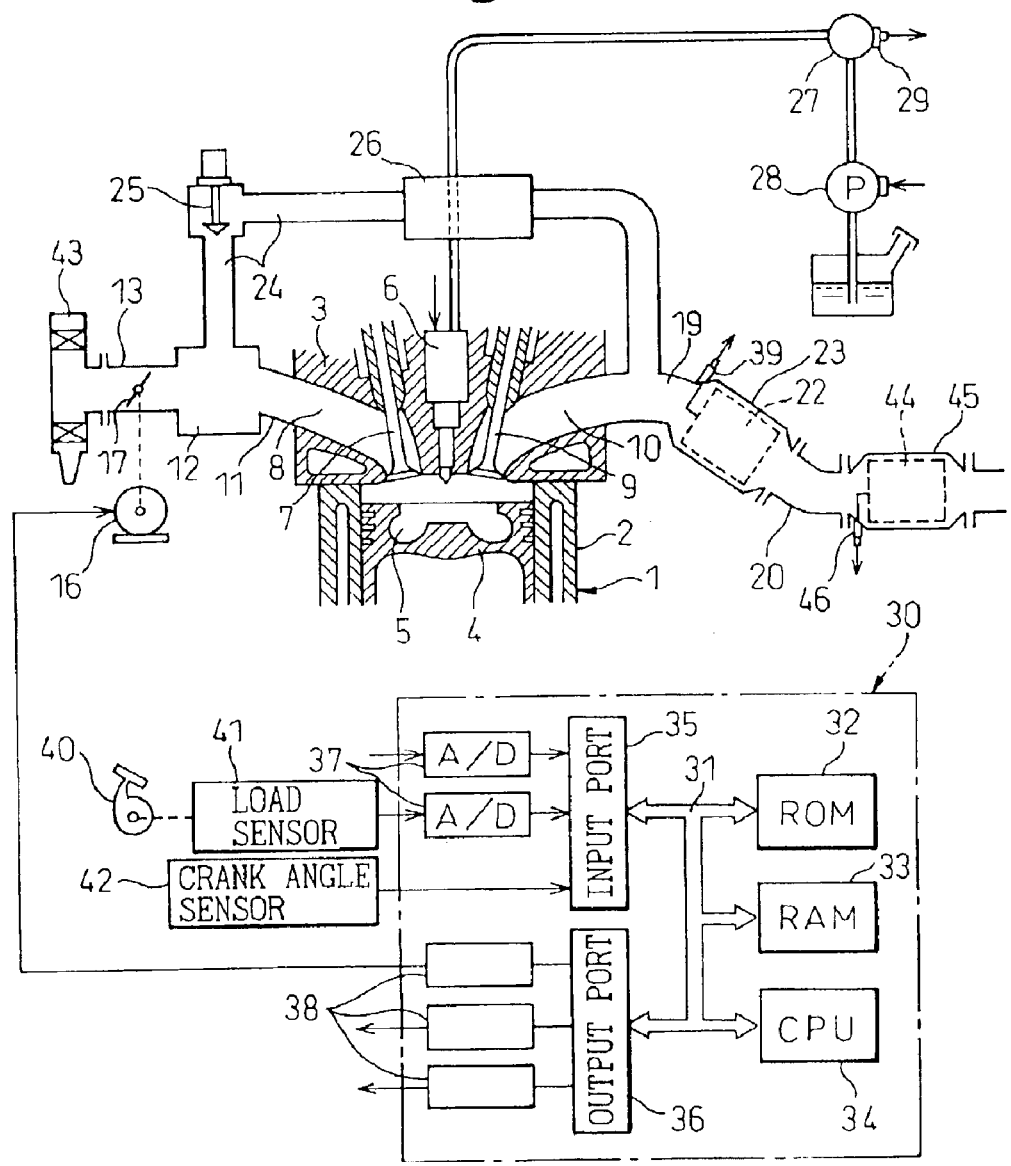
FIG. 20 shows the engine provided with the exhaust gas purification device of the modified seventh embodiment.

The sub-filter 22 also has an ability to oxidize the particulates, and thus the decreased amount of the particulates flows into the main filter 44. Therefore, almost all of the particulates contained in the exhaust gas may be oxidized away by the main filter 44. Otherwise, as the main filter 44 is required to oxidize small amount of the particulates, it is permitted to downscale the filter 44. Note that, in order to maintain the temperature of the sub-filter 22 higher than a certain temperature, the sub-filter 22 should be arranged near the exhaust port 10. Therefore, as shown in FIG. 20, the sub-filter 22 may be arranged in the branch pipe of the manifold 17.

The eighth embodiment will be explained. In the eighth embodiment, as shown in FIG. 21, a bypass passage 48 which bypasses the main filter 44 extends from the exhaust pipe 47 between the sub- and main filters 22,44. The passage 48 at its upstream end is connected to the exhaust pipe 47 upstream of the main filter 44, and at its downstream end is connected to the exhaust pipe 47 downstream of the main filter 44. The bypass passage 48 and the main filter 44 are in parallel with each other. In the eighth embodiment, a switch valve 49 is arranged at the connection of the bypass passage 48 and the exhaust pipe 47 upstream of the main filter 44. The valve 49 serves to switch the flow of the exhaust gas to the main filter 44 and the bypass passage 48.

The active oxygen production agent carries the SOx contained in the exhaust gas when the lean exhaust gas flows thereinto. If the amount of the SOx carried by the agent increases, the amount of the NOx which the agent can carry decreases. Therefore, before the amount of the NOx which the agent can carry decreases under an allowed lower limit, it is necessary to release the SOx from the agent.

In the eighth embodiment, the sub-filter 22 is arranged upstream of the main filter 44. The active oxygen production agent of the sub-filter 22 carries the SOx contained in the exhaust gas when the lean exhaust gas flows thereinto, and thus the exhaust gas flowing into the maim filter 44 contains a very small amount of the SOx. Therefore, in the eighth embodiment, it is hardly necessary to release the SOx from the active oxygen production agent of the main filter 44.

The active oxygen production agent of the sub-filter 22 has an allowed upper limit to carry the SOx. Therefore, before the amount of the SOx carried by the agent of the sub-filter 22 reaches the allowed upper limit, it is necessary to release the SOx from the agent of the sub-filter 22. Next, referring to FIGS. 22A and 22B, the release of the SOx from the agent of the sub-filter 22 will be explained.

Figure 22A:
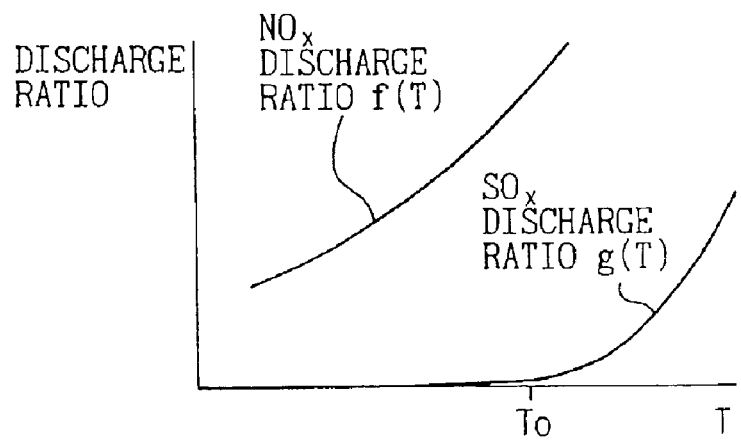
FIG. 22A shows ratios of the discharged NOx and SOx.
Figure 22B:
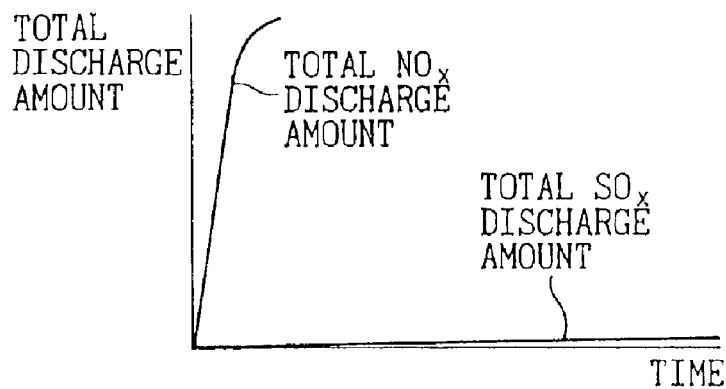
FIG. 22B shows total amounts of the discharged NOx and SOx.

FIG. 22A shows a relationship between the temperature T of the active oxygen production agent when the atmosphere surrounding the agent is rich or generally stoichiometric, and the NOx releasing ratio f(T) and the SOx releasing ratio g(T) from the agent. FIG. 22B shows the period that the atmosphere surrounding the agent is maintained rich or generally stoichiometric, and the total NOx releasing amount and the total SOx releasing amount from the agent when the agent has a temperature lower the temperature To shown in FIG. 22A.

As can be understood from the FIG. 22A, when the agent temperature T is lower than the temperature To and the atmosphere surrounding the agent is rich or generally stoichiometric, the agent releases the NOx but hardly releases the SOx therefrom. Therefore, in state that the agent temperature T is lower than the temperature To, the agent releases a very small amount of the SOx even if the atmosphere surrounding the agent is maintained rich or stoichiometric for a long time.

In the case that the engine is a compression ignition type engine, the main filter 44 often has a temperature lower than the temperature To. Therefore, even if the rich or generally stoichiometric exhaust gas flows into the main filter 44, the active oxygen production agent of the main filter 44 hardly releases the SOx therefrom.

In the eighth embodiment, when it is necessary to release the SOx from the active oxygen production agent of the sub-filter 22, the temperature of the sub-filter 22 is raised above the temperature To and the rich exhaust gas is supplied to the sub-filter 22, or the temperature of the exhaust gas flowing into the sub-filter 22 is raised above a temperature whereat the active oxygen production agent of the sub-filter 22 releases the SOx therefrom and the rich exhaust gas is supplied.

According to this, the sub-filter 22 releases the SOx therefrom. In consideration of this function of the sub-filter 22, the sub-filter 22 serves as a SOx carrying agent for carrying the SOx contained in the exhaust gas when the lean exhaust gas flows into the sub-filter 22. Further, since the sub-filter 22 is arranged near the engine body, the temperature of the sub-filter 22 is easily raised.

In the eighth embodiment, when the sub-filter 22 releases the SOx therefrom, the switch valve 47 is positioned as shown by the chain line of the FIG. 21 such that the exhaust gas flows into the bypass passages 48. According to this, the SOx released from the sub-filter 22 hardly flows into the main filter 44. On the other hand, when the sub-filter 22 does not release the SOx therefrom, the switch valve 47 is positioned as shown by the solid line of the FIG. 21.

Note that the sub-filter 22 carries the NOx contained in the exhaust gas when the lean exhaust gas flows thereinto, and releases the carried NOx therefrom when the rich or generally stoichiometric exhaust gas flows thereinto, and reduces and removes the released NOx by hydrocarbon and carbon monoxide contained in the exhaust gas. Therefore, when the rich or generally stoichiometric exhaust gas is supplied to the sub-filter 22 to release the SOx from the sub-filter 22, the sub-filter 22 releases the NOx therefrom, and the released NOx is reduced and removed by the hydrocarbon and the monoxide contained in the exhaust gas. Therefore, even if the exhaust gas bypasses the main filter 44, the NOx, the hydrocarbon and the carbon monoxide hardly flow out of the exhaust gas purification device.

Note that, in order to stop releasing the SOx from the sub-filter 22, the air fuel ratio of the exhaust gas is changed from a rich or generally stoichiometric air fuel ratio to a lean air fuel ratio, and the position of the switch valve 47 is changed to a position shown in the solid line of the FIG. 21.

The active oxygen production agent easily releases the SOx therefrom if the agent carries the SOx in the form of the sulfate ions or the unstable sulfate. In the eighth embodiment, as the agent of the sub-filter 22, an active oxygen production agent carrying at least one of transition metal such as copper, iron, manganese and nickel, sodium, titanium and lithium on an alumina carrier is used. Therefore, in the eighth embodiment, the agent of the sub-filter 22 easily releases the SOx therefrom.

In the eighth embodiment, in order to release the NOx from the main filter 44, the air fuel ratio of the exhaust gas is changed from the lean air fuel ratio to the rich or generally stoichiometric air fuel ratio. However, the period for maintaining the air fuel ratio of the exhaust gas lean or generally stoichiometric is short. Therefore, the temperature of the sub-filter 22 hardly rises above the temperature To. Thus, the sub-filter 22 does not release the SOx therefrom, and no SOx flows into the main filter 44. Of course, in the state that the main filter 44 has a temperature lower than the temperature To, if the exhaust gas flowing into the main filter 44 has a rich air fuel ratio, the main filter 44 releases the NOx therefrom, and the NOx is reduced and removed.

Figure 23:
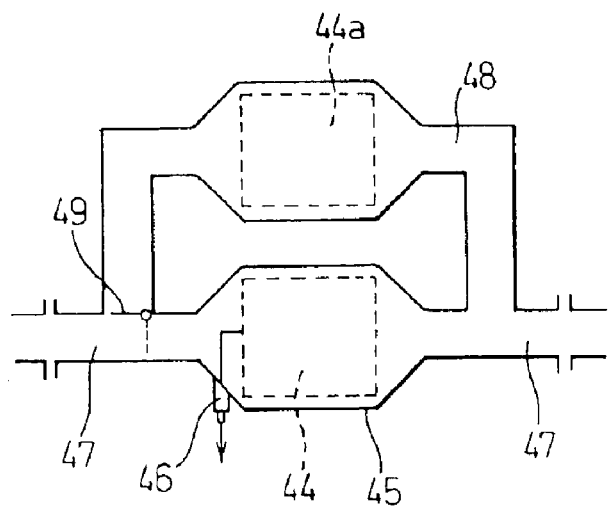
FIG. 23 shows the exhaust gas purification device of the ninth embodiment.

The ninth embodiment will be explained. When the air fuel ratio of the exhaust gas is made rich or generally stoichiometric to release the SOx from the sub-filter 22, some hydrocarbon or carbon monoxide flows out of the sub-filter 22. The hydrocarbon and carbon monoxide should be purified. According to the ninth embodiment, as shown in FIG. 23, in the exhaust gas purification device of the eighth embodiment, a three way catalyst 44a is arranged in the bypass passage 48. The three way catalyst 44a oxidizes the hydrocarbon and the carbon monoxide when the rich or generally stoichiometric exhaust gas flows thereinto.

According to the ninth embodiment, when the sub-filter 22 releases the SOx therefrom, the switch valve 47 is positioned at a position shown by the chain line of the FIG. 23, and thus the hydrocarbon and the carbon monoxide flow from the sub-filter 22 into the bypass passage 48. Therefore, the hydrocarbon and the carbon monoxide are oxidized and purified by the three way catalyst. Note that it is sufficient that the catalyst arranged in the bypass passage 48 has an ability to oxidize the components such as hydrocarbon and carbon monoxide away. Therefore, an oxidation catalyst may be used in place of the three way catalyst.

The tenth embodiment will be explained. In the tenth embodiment, in place of the filter of the first embodiment, a exhaust gas purification catalyst 22 carrying a hydrocarbon collection agent is arranged in the exhaust passage of the engine. The catalyst 22 comprises the same structure as that of the filter of the first embodiment. Unburned hydrocarbon contained in the exhaust gas adheres to the hydrocarbon collection agent of the catalyst 22. In other words, the hydrocarbon collection agent collects unburned hydrocarbon contained in the exhaust gas. In the tenth embodiment, as the hydrocarbon collection agent, layers formed of, for example, alumina are entirely formed on both side wall surfaces of the partitions 54, the wall surfaces defining the fine pores of the partitions 54, and both side wall surfaces of the tapered wall portions 52,53.

The hydrocarbon collection agent collects the unburned hydrocarbon contained in the exhaust gas by the adhering of the hydrocarbon thereto when the agent has a temperature lower than the temperature at which the hydrocarbon leaves the agent. On the other hand, the hydrocarbon collection agent releases the collected hydrocarbon therefrom when the agent has a temperature higher than the temperature at which the hydrocarbon leaves the agent. The temperature at which the hydrocarbon leaves the hydrocarbon collection agent is set such that the agent does not release the hydrocarbon when a later explained hydrocarbon purification catalyst has a temperature lower than the temperature at which the catalyst does not oxidize and purify the unburned hydrocarbon.

The exhaust gas purification catalyst 22 has a hydrocarbon purification catalyst for oxidizing and purifying the unburned hydrocarbon. In the tenth embodiment, as the hydrocarbon purification catalyst, precious metal catalyst such as platinum is carried on the alumina carrying layer of the catalyst 22. The hydrocarbon purification catalyst oxidizes and purifies the unburned hydrocarbon when its temperature is higher than a hydrocarbon purification temperature.

In the tenth embodiment, the pressure loss of the exhaust gas purification catalyst 22 and the unburned hydrocarbon and particulate collection ratios of the catalyst 22 can be adjusted by adjusting the sizes of the small holes 55,56 of the catalyst 22.

The action of the exhaust gas purification catalyst of the tenth embodiment will be explained. Even in the state that the hydrocarbon collection agent has a low temperature, if the quantity of the exhaust gas flowing into the catalyst 22 per unit time rapidly increases, the hydrocarbon collected by the agent may be released from the wall surfaces or fine pores of the partitions 54 by the exhaust gas. At this time, the hydrocarbon purification catalyst also has a low temperature, and thus does not purify the hydrocarbon. In this case, if the exhaust gas passages of the catalyst 22 completely open at the outlets thereof, the hydrocarbon flows out of the catalyst 22.

When the catalyst 22 has a low temperature, for example, at engine start up, the hydrocarbon purification catalyst also has a temperature lower than the hydrocarbon purification temperature, and thus the unburned hydrocarbon contained in the exhaust gas is not oxidized and purified by the hydrocarbon purification catalyst. However, at this time, the hydrocarbon collection agent has a temperature lower than the hydrocarbon release temperature, and thus the unburned hydrocarbon contained in the exhaust gas is collected by the hydrocarbon collection agent. Therefore, the unburned hydrocarbon hardly flows out of the catalyst 22.

On the other hand, when the temperature of the exhaust gas discharged from the engine successively rises and the temperature of the hydrocarbon collection agent exceeds the hydrocarbon release temperature, the unburned hydrocarbon leaves the hydrocarbon collection agent. At this time, the hydrocarbon purification catalyst has a temperature higher than the hydrocarbon purification temperature. Therefore, the unburned hydrocarbon leaving the hydrocarbon collection agent is oxidized and purified by the hydrocarbon purification catalyst. Thus, the unburned hydrocarbon hardly flows out of the catalyst 22.

In the state that the hydrocarbon collection agent has a temperature lower than the hydrocarbon release temperature, if the quantity of the exhaust gas passing through the fine pores of the partitions 54 of the catalyst 22 rapidly increases, the unburned hydrocarbon may leave the fine pores of the partitions 54. At this time, the hydrocarbon purification catalyst has a temperature lower than the hydrocarbon purification temperature, and thus the leaving hydrocarbon is hardly purified by the hydrocarbon purification catalyst.

In the tenth embodiment, the upstream openings of the outflow passages 51 of the catalyst 22 are partially closed by the upstream tapered wall portions 53, and thus almost all exhaust gas flows into the inflow passages 50 of the catalyst 22. Further, the downstream openings of the inflow passages 50 of the catalyst 22 are partially closed by the downstream tapered wall portions 52, and thus almost all exhaust gas passes through the fine pores of the partitions 54. Therefore, the particulates are collected in the fine pores of the partitions 54. Of course, the particulates are collected on the wall surfaces of the partitions 54 defining the inflow passages 50.

In the state that the particulates are collected and deposit in the fine pores and on the wall surfaces of the partitions 54, the exhaust gas does not easily pass through the fine pores of the partitions 54. As a result, even if the quantity of the exhaust gas flowing into the catalyst 22 per unit time rapidly increases, the quantity of the exhaust gas passing through the fine pores of the partitions 54 per unit time does not largely increase. Therefore, the unburned hydrocarbon hardly leaves the fine pores of the partitions 54. Thus, the unburned hydrocarbon hardly flows out of the catalyst 22.

Note that, similar to the filter of the first embodiment, the catalyst 22 of the tenth embodiment has an active oxygen production agent, and thus successively oxidizes the particulates away for a short time. Therefore, the amount of the particulates collected in the fine pores of the partitions 54 and on the wall surfaces of the partitions 54 defining the inflow passages 50 is maintained small.

As explained above, the concentration of the oxygen around the active oxygen production agent decreases when the particulates adhere to the agent even in the state that the atmosphere surrounding the agent 61 is lean. Further, other than this case, the concentration of the oxygen around the active oxygen production agent decreases when the rich exhaust gas flows into the exhaust gas purification catalyst 22, and thus the atmosphere surrounding the agent becomes rich.

As explained above, in the state that the atmosphere surrounding the active oxygen production agent is lean, when the particulates adhere to the agent to decrease the concentration of the oxygen therearound, the NOx leaves the agent. In this case, the leaving NOx is carried again by the active oxygen production agent. On the other hand, as explained above, when the rich exhaust gas flows into the catalyst 22 to make the atmosphere surrounding the active oxygen production agent rich, the NOx leaves the agent. In this case, the leaving NOx is reduced and purified by the unburned hydrocarbon contained in the exhaust gas together with the action of the platinum. That is, if the engine operation is controlled to discharge the rich exhaust gas therefrom, the NOx carried by the active oxygen production agent is reduced and purified. Therefore, the catalyst 22 of the tenth embodiment has a NOx catalyst comprising the active oxygen production agent and the platinum.

Note that, as explained above, in the case that the catalyst 22 has an active oxygen production agent, the catalyst 22 oxidizes the particulates collected therein away even if the catalyst 22 has a low temperature. However, if the catalyst 22 has a lower temperature, the particulates successively deposit in the catalyst 22. As explained above, the inlets of the inflow passages 50 and the outlets of the outflow passages 51 of the catalyst 22 are defined by the wall surfaces of the tapered wall portions 52,53, and thus the exhaust gas does not flow with turbulence at the inlets of the inflow passages 50 and the outlets of the outflow passages 51. Therefore, the catalyst 22 potentially has a low pressure loss. Thus, even if the particulates deposit in the catalyst 22, the pressure loss of the catalyst 22 is maintained low.

Of course, if the amount of the unburned hydrocarbon collected by the hydrocarbon collection agent or the amount of the particulates depositing in the catalyst 22 increases, the ability of the collection of the unburned hydrocarbon by the hydrocarbon collection agent decreases. However, for example, after the engine starts up, the temperature of the catalyst 22 rises, and thus the unburned hydrocarbon and the particulates collected in the catalyst 22 are oxidized. Therefore, at the next engine start up, the very small amount of the unburned hydrocarbon and the particulates deposit in the catalyst 22. Thus, the unburned hydrocarbon leaving the catalyst 22 immediately after the engine start up is assuredly collected by the hydrocarbon collection agent of the catalyst 22.

In the tenth embodiment, almost all exhaust gas flows into the inflow passages 50 of the catalyst 22, passes through the fine pores of the partitions 54, and flows into the outflow passages 51. When the exhaust gas passes through the fine pores of the partitions 54, some particulates are collected in the fine pores of the partitions 54. If the particulates are collected in the fine pores of the partitions 54, the exhaust gas does not easily pass through the partitions 54. Therefore, even if the quantity of the exhaust gas flowing into the catalyst 22 rapidly increases, the quantity of the exhaust gas passing through the fine pores of the partitions 54 does not largely increase. Thus, the unburned hydrocarbon hardly leaves the fine pores of the partitions 54.

Therefore, in the state that the hydrocarbon collection agent has a temperature lower than the hydrocarbon release temperature and the hydrocarbon purification catalyst has a temperature lower than the hydrocarbon purification temperature, the unburned hydrocarbon hardly leaves the fine pores of the partitions 54 even if the quantity of the exhaust gas flowing into the catalyst 22 rapidly increases. That is, in the tenth embodiment, in the state that the hydrocarbon purification catalyst does not purify the unburned hydrocarbon, even if the quantity of the exhaust gas flowing into the catalyst 22 per unit time rapidly increases, almost all unburned hydrocarbon remains on the hydrocarbon collection agent.

The second method for producing a particulate filter of the invention will be explained. The method explained below is a method for producing a particulate filter 22 shown in FIGS. 24A and 24B. The filter 22 shown in FIGS. 24A and 24B is the same as that shown in FIGS. 1A and 1B except that each tapered wall portion of the filter shown in FIGS. 24A and 24B have a quadrangular pyramid shape while each tapered wall portion of the filter shown in FIGS. 1A and 1B have a conical shape.

Figure 25A:
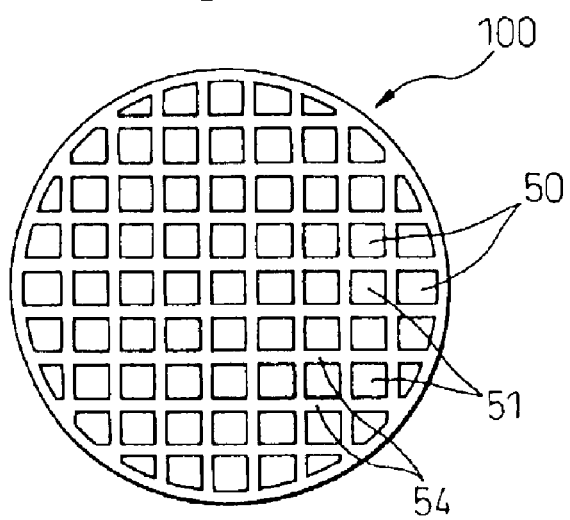
FIGS. 25A and 25B show a closure device used in the second filter production method.
Figure 25B:
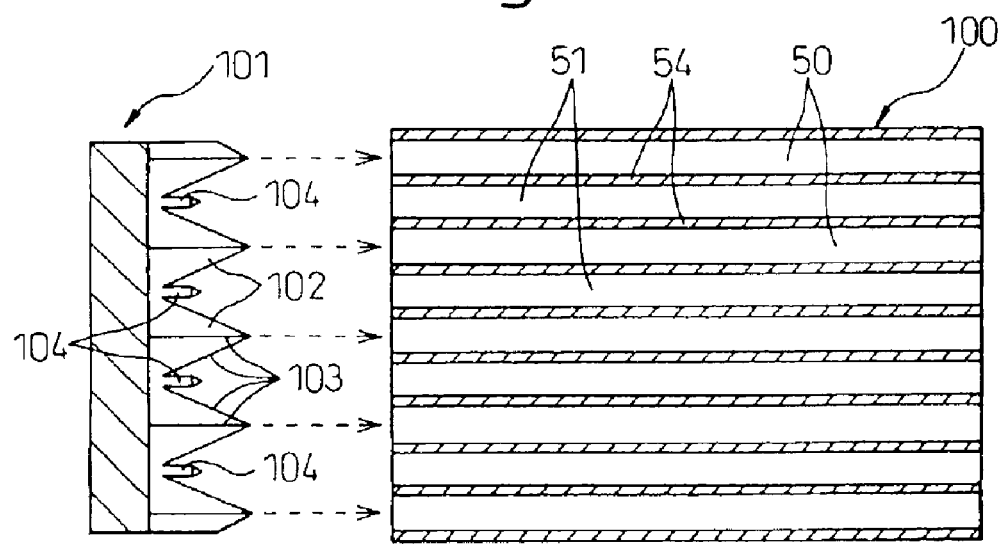

According to the second method, first, as shown in FIGS. 25A and 25B, a substrate 100 formed of porous material such as cordierite and having a honeycomb structure is prepared. The substrate 100 has exhaust gas passages 50,51 defined by partitions 54. The partitions 54 form a gridiron pattern.

Figure 26A:
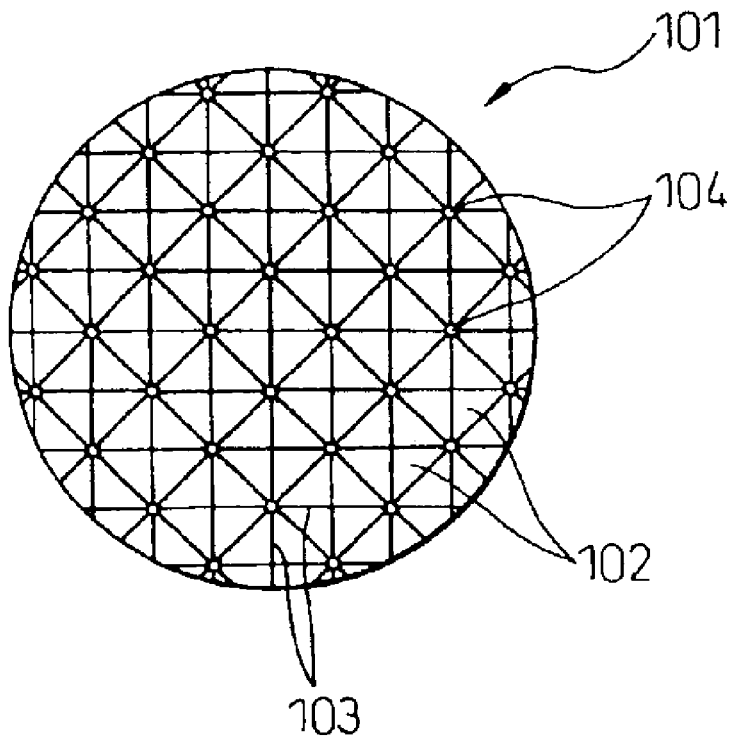
FIGS. 26A and 26B show the second filter production method.
Figure 26B:
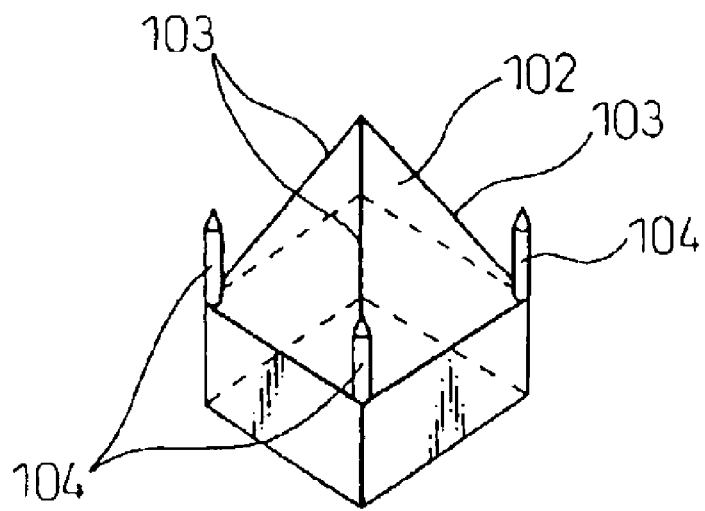

Next, as shown in FIG. 25B, a closure device 101 for partially closing end openings of the exhaust gas passages 50,51 is pressed onto one of the end faces of the substrate 100. FIGS. 26A and 26B show the closure device 101 in detail. Referring to FIG. 26A showing a plan view of the closure device 101, the device 101 has predetermined numbers of projections 102. As can be understood from FIG. 26B showing one of the projections 102, each projection 102 has substantially a regular quadrangular pyramid shape. The projections 102 are arranged in a pattern that four adjacent ridges 103 of four adjacent projections 102 converge. Further, a pin 104 is arranged at each area where four adjacent ridges 103 of four adjacent projections 102 converge.

The closure device 101 is pressed onto one of the end faces of the substrate 100 such that each projection 102 is inserted into the corresponding exhaust gas passage 50. When the device 101 is pressed onto one end face of the substrate 100, four end portions of four adjacent partitions 54 defining each exhaust gas passage 51 are gathered toward each other by corresponding four adjacent projections 102. Each pin 104 of the closure device 101 exists in each area enclosed by four gathered end portions of four adjacent partitions 54. As a result, four end portions of four adjacent partitions 54 defining each exhaust gas passage 51 are partially connected to each other while a small hole 56 is formed therein by the pin 104. Thus, upstream tapered wall portions 53 having the small holes 56 are formed.

Next, the closure device 101 is pressed onto the other end face of the substrate 100 such that each projection 102 is inserted into each exhaust gas passage 51. Thus, downstream tapered wall portions 52 having small holes 55 are formed.

As explained above, according to the second method, the closure of the end openings of the exhaust gas passages, i.e., the formation of the tapered wall portions for closing the end openings of the exhaust gas passages, and the formation of the small holes in the tapered wall portions are performed at a time.

The third method for producing a filter will be explained. The closure device 101 used in the third method comprises an opening closure device 105 shown in FIG. 27A and a hole formation device 106 shown in FIG. 28A.

Figure 27A:
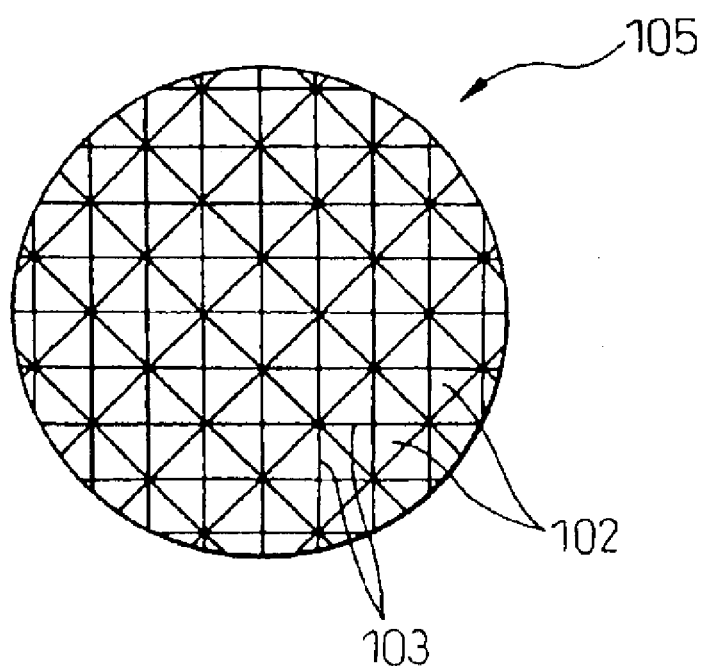
FIGS. 27A and 27B show the closure device used in the third filter production method.
Figure 27B:
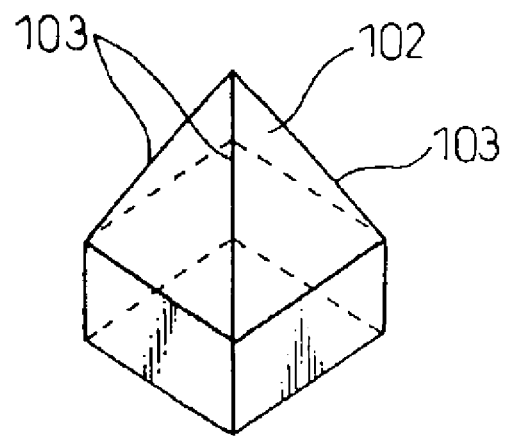

Referring to FIG. 27A showing a plan view of the opening closure device 105, the device 105 has predetermined numbers of projections 102. FIG. 27B shows one of the projections 102. As can be understood from FIG. 27B, each projection 102 has substantially a regular quadrangular pyramid shape. Each projection 102 is arranged in a pattern that four adjacent ridges 103 of four adjacent projections 102 converge.

Figure 28A:
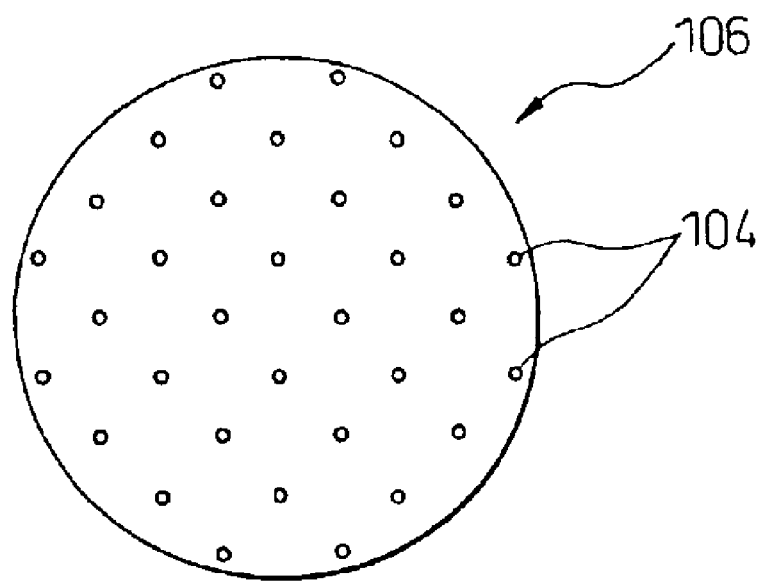
FIGS. 28A and 28B show the closure device used in the third filter production method.
Figure 28B:
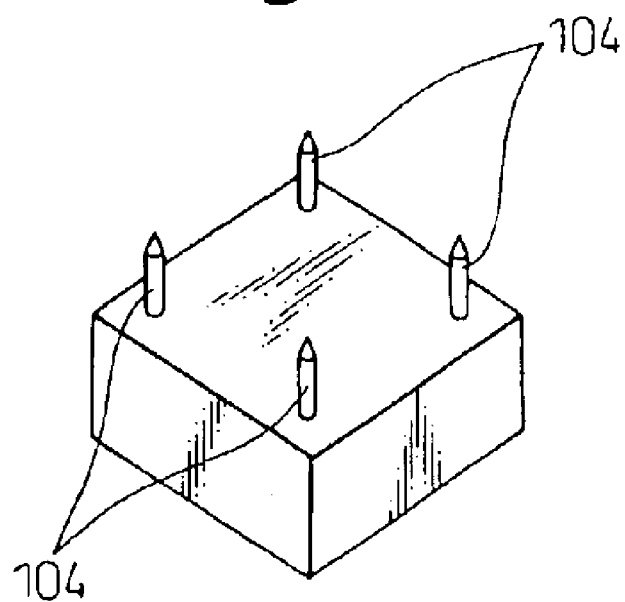

On the other hand, referring to FIG. 28A showing a plan view of the hole formation device 106, the device 106 has predetermined numbers of pins 104. FIG. 28B shows four pins 104. Each pin 104 is arranged at each area where four adjacent ridges 103 of four adjacent projections 102 converge.

Figure 29A:
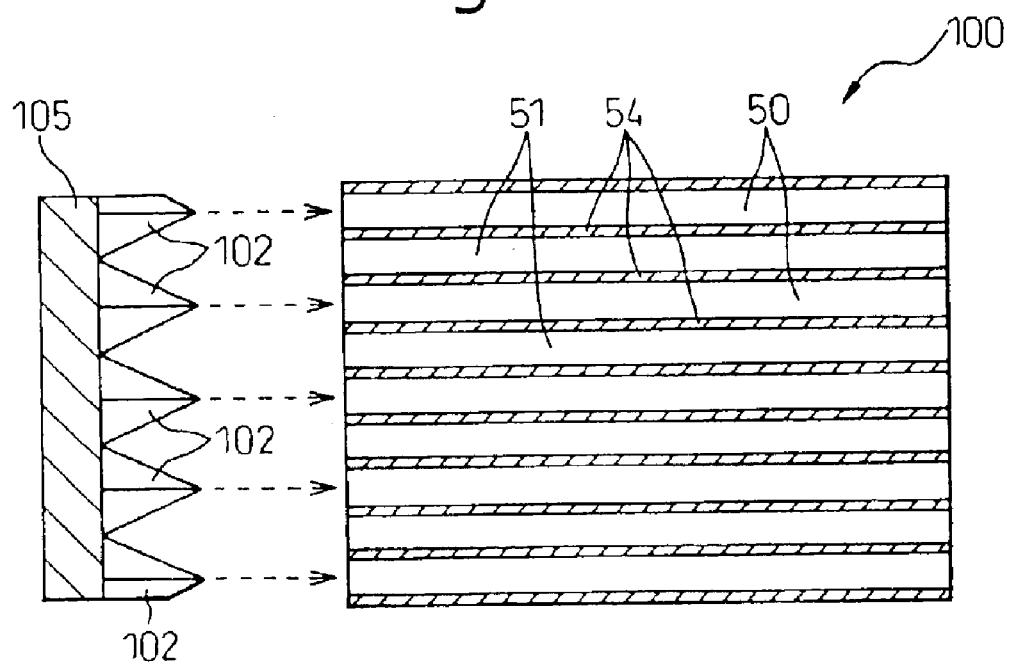
FIGS. 29A and 29B show the third filter production method.

According to the third method, as shown in FIG. 29A, first, the opening closure device 105 is pressed onto one of the end faces of the substrate 100 such that each projection 102 is inserted into each exhaust gas passage 50. When the device 105 is pressed onto one end face of the substrate 100, four end portions of four adjacent partitions 54 defining each exhaust gas passage 51 are gathered toward each other by corresponding four adjacent projections 102. Thus, four end portions of four adjacent partitions 54 defining each exhaust gas passage 51 are connected to each other to completely close the end opening of each exhaust gas passage 51 by a corresponding tapered wall portion.

Figure 29B:
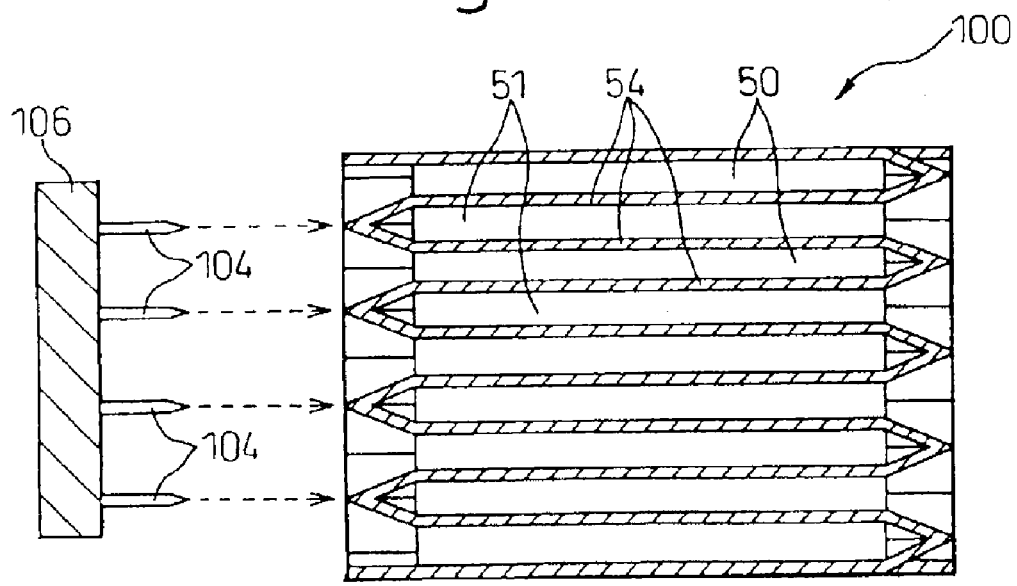

Next, as shown in FIG. 29B, the hole formation device 106 is pressed onto one end face of the substrate 100 such that each pin 104 pierces the tip of the corresponding tapered wall portion which completely closes the end opening of the corresponding exhaust gas passage 51. As a result, a small holes 56 is formed in the tip of each tapered wall portion.

Regarding the other end face of the substrate 100, the similar processes are performed. That is, the opening closure device 105 is pressed onto the other end face of the substrate 100 such that each projection 102 is inserted into the corresponding exhaust gas passage 51. As a result, the end opening of each exhaust gas passage 50 is completely closed by a corresponding tapered wall portion. Next, the hole formation device 106 is pressed onto the other end face of the substrate 100 such that each pin 104 pierces the tip of the corresponding tapered wall portion which completely closes the end opening of the corresponding exhaust gas passage 50. As a result, a small hole 55 is formed in the tip of each tapered wall portion.

According to the third method, first, the closure of the end openings of the exhaust gas passages, i.e., the formation of the tapered wall portions for closing the end openings of the exhaust gas passages is performed, and thereafter the formation of the small holes in the tapered wall portions is performed. Of course, in the third method, the following may be employed. That is, first, the end openings of the exhaust gas passages 50 are completely closed by the tapered wall portions, and then the end openings of the exhaust gas passages 51 are completely closed by the tapered wall portions, and then the small holes are formed in the tapered wall portions.

Figure 30:
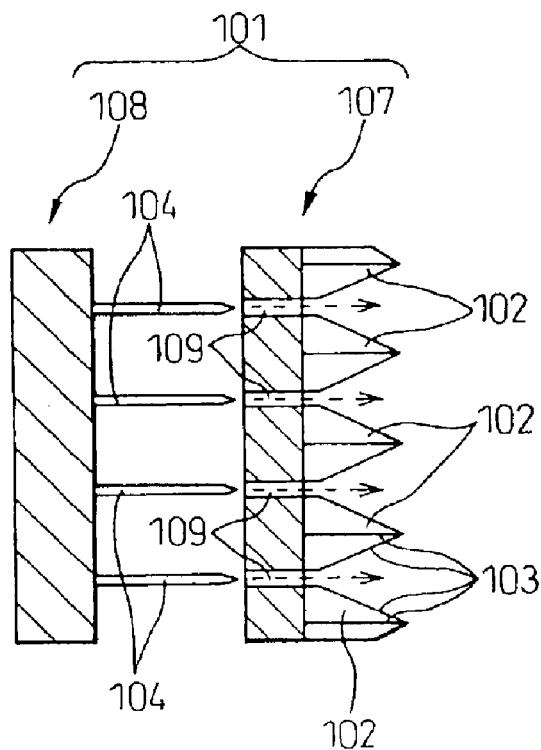
FIG. 30 shows the closure device used in the fourth filter production method.

The fourth method for producing a filter will be explained. As shown in FIG. 30, the closure device 101 used in the fourth method comprises an opening closure device 107 and a hole formation device 108.

Similar to the opening closure device 105 as shown in FIG. 29A, the opening closure device 107 has predetermined numbers of projections 102. Similar to the device 105, each projection 102 of the device 107 has substantially a regular quadrangular pyramid shape, and the projections 102 are arranged in a pattern that four adjacent ridges 103 of four adjacent projections 102 converge. Unlike the device 105, the device 107 has through holes 109. Each hole 109 is positioned at each area where four adjacent ridges 103 of four adjacent projections 102 converge.

On the other hand, similar to the hole formation device 106 shown in FIGS. 28A and 28B, the hole formation device 108 has predetermined numbers of pins 104. The pins 104 are arranged in a pattern that each pin 104 is inserted into the corresponding through hole 109.

According to the fourth method, similar to the third method, first, the opening closure device 107 is pressed onto one of the end faces of the substrate 100 such that each projection 102 is inserted into the corresponding exhaust gas passage 50. As a result, the end opening of each exhaust gas passage 51 is completely closed by a corresponding tapered wall portion.

Next, in the state that the device 107 is pressed onto one end face of the substrate 100, the hole formation device 108 is pressed onto the device 107 such that each pin 104 is inserted into the corresponding through hole 109. As a result, each pin 104 pierces the tip of the corresponding tapered wall portion which completely closes the end opening of the corresponding exhaust gas passage 51. As a result, a small hole 56 is formed in the tip of each tapered wall portion.

Regarding the other end face of the substrate 100, the similar processes are performed. That is, similar to the third method, the opening closure device 107 is pressed onto the other end face of the substrate 100 such that each projection 102 is inserted into the corresponding exhaust gas passage 51. As a result, the end opening of each exhaust gas passage 50 is completely closed by a corresponding tapered wall portion. Next, in the state that the device 107 is pressed onto the other end face of the substrate 100, the hole formation device 108 is pressed onto the device 107 such that each pin 104 is inserted into the corresponding through hole 109. As a result, each pin 104 pierces the tip of the corresponding tapered wall portion which completely closes the end opening of the corresponding exhaust gas passage 50. Thus, a small hole 55 is formed in the tip of each tapered wall portion.

According to the fourth method, similar to the third method, first, the closure of the end openings of the exhaust gas passages, i.e., the formation of the tapered wall portions for closing the end openings of the exhaust gas passages is performed, and then the formation of the small holes in the tapered wall portions is performed.

According to the fourth method, in the state that the tapered wall portions of the substrate 100 are pressed by the device 107, each small hole is formed in the corresponding tapered wall portion by the device 108. Therefore, when each pin 104 of the device 108 is pressed onto the corresponding tapered wall portion, the tapered wall portions are hardly subject to damage.

Further, in the above explained third method, after the tapered wall portions are formed, the small holes are formed by pressing the hole formation device 106 onto the end face of the substrate 100. Therefore, before the device 106 is pressed onto the end face of the substrate, it is necessary to exactly position the device 106 such that each pin 104 of the device 106 corresponds to the tip of the corresponding tapered wall portion. This is burdensome. Opposed to this, according to the fourth method, each small hole is formed in the corresponding tapered wall portion simply by inserting each pin 104 of the device 108 into the corresponding through hole 109 of the device 107. Therefore, it is not necessary to perform a process to position the device 108 such that each pin 104 of the device 108 corresponds to the tip of the corresponding tapered wall portion to form small holes therein by the device 108.

Figure 31:
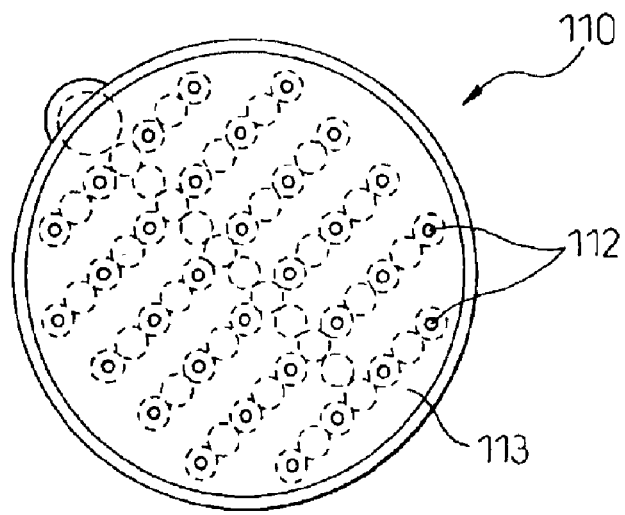
FIG. 31 shows the closure device used in the fifth filter production method.
Figure 32A:
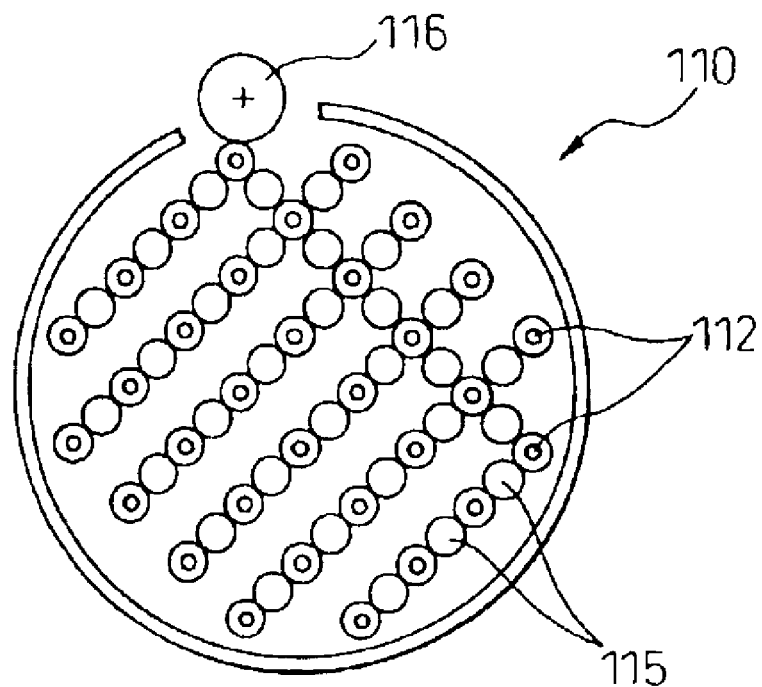
FIGS. 32A and 32B show the details of the closure device shown in FIG. 31.
Figure 32B:
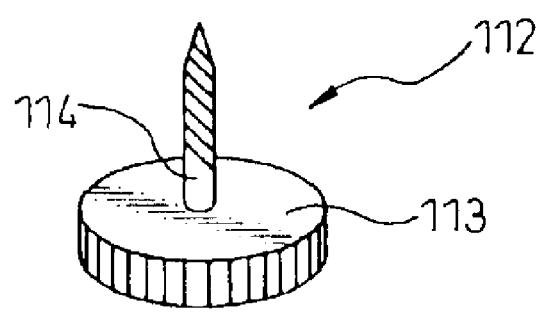

The fifth method for producing a filter will be explained. The closure device 101 used in the fifth method comprises the opening closure device 105 shown in FIGS. 27A and 27B and a hole formation device 110 shown in the plan view of FIG. 31. FIGS. 32A and 32B show the device 110 in detail.

FIG. 32A shows a plan view of the hole formation device 110 in which an end wall 113 is omitted. As can be understood from FIG. 32A, the device 110 has predetermined numbers of drill members 112. As can be understood from FIG. 32B showing one of the drill members 112, each member 112 has a gear 113 and a drill 114 which extends from the central portion of the gear 113 in a direction perpendicular to the end wall surface of the gear 113.

As shown in FIG. 32A, each drill member 112 engages with corresponding intermediate gears 115. Two adjacent drill members 112 are connected via one intermediate gear 115. A certain drill member 112 engages with a drive gear 116. The gear 116 is rotated by a suitable drive means such as an electric motor. When the drive gear 116 is rotated, the drill member 112 engaging with the drive gear 116 is rotated, and then the rotation of the member 112 is transmitted to all remaining drill members 112 via the intermediate gears 116. As a result, each drill member 112 is rotated about its longitudinal axis.

Note that the drills 114 of the drill members 112 are projected from the end wall 113 of the hole forming device 110. The drills 114 are arranged in the same pattern as that regarding the pins 104 of the device 106 shown in FIGS. 28A and 28B.

According to the fifth method, similar to the third method, the opening closure device 105 shown in FIG. 27A is pressed onto one of the end faces of the substrate 100 to completely close the end opening of each exhaust gas passages 50 by a tapered wall portion. Next, the drive gear 116 of the hole formation device 110 is rotated, and the device 110 is pressed onto one end face of the substrate 100 such that the drill 114 of each drill member 112 pierces the tip of the corresponding tapered wall portion which completely closes the end opening of the corresponding exhaust gas passage 51. As a result, a small hole 56 is formed in the tip of each tapered wall portion by the corresponding rotating drill 114.

Regarding the other end face of the substrate 100, the similar processes are performed. That is, similar to the third method, the opening closure device 105 is pressed onto the other end face of the substrate 100 to completely close the end opening of each exhaust gas passage 51 by the corresponding tapered wall portion. Next, the drive gear 116 of the hole formation device 110 is rotated, and the device 110 is pressed onto the other end face of the substrate 100 such that the drill 114 of each drill member 112 pierces the tip of the corresponding tapered wall portion which completely closes the end opening of the corresponding exhaust gas passage 50. As a result, a small hole 55 is formed in the tip of each tapered wall portion by the corresponding rotating drill 114.

According to the fifth method, the small holes are formed in the tips of the tapered wall portions by the rotating drills 114. Therefore, the tapered wall portions are hardly subject to damage when the small holes are formed, comparing with the case that the holes are formed in the tips of the tapered wall portions simply by pins.

Figure 33A:
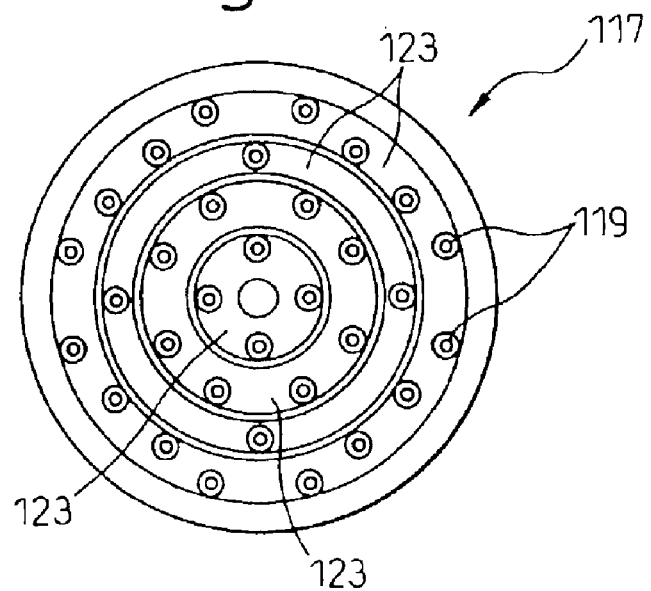
FIGS. 33A and 33B show the closure device used in the sixth filter production device.

The sixth method for producing a filter will be explained. The closure device 101 used in the sixth method comprises the opening closure device 105 shown in FIG. 27A and a hole formation device 117 shown in FIG. 33A. In FIG. 33A, the end wall 118 of the device 117 shown in FIG. 33B is omitted.

As shown in FIG. 33A, the device 117 has predetermined numbers of drill members 119. As shown in FIG. 33B, each drill member 119 has a ball 120 and a drill 121 which extends from the ball 120.

Figure 33B:
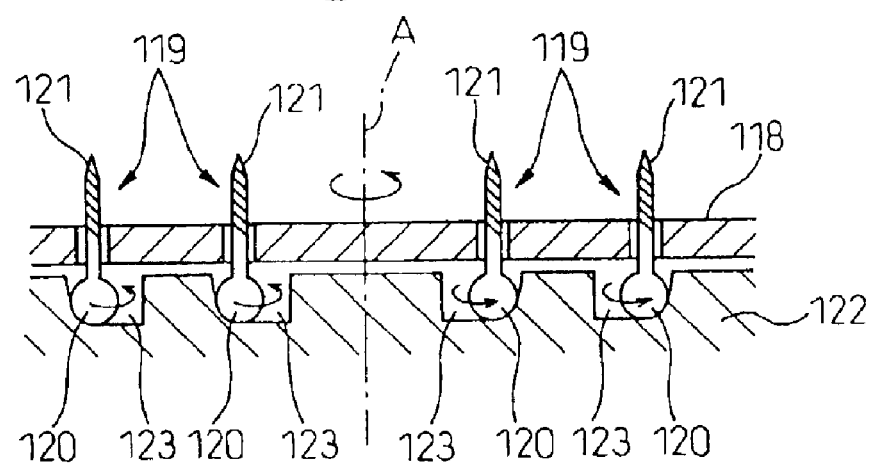

As shown in FIG. 33B, a plurality of annular grooves 123 are formed in a disc body 122 of the device 117. The center of each groove 123 corresponds to the center of the body 122. The body 122 is rotated by a suitable means such as an electric motor about an axis A shown in FIG. 33B.

The ball 120 of each drill member 119 is housed in the corresponding groove 123 such that the ball 120 is in contact with the side wall surface defining the groove 123. The drills 121 of the drill members 119 project from the end wall 118 of the device 117. The drills 121 are arranged in the same pattern as that of the pins 104 of the device 106 shown in FIG. 28A.

When the body 122 is rotated, the ball 120 of each drill member 119 is rotated by the side wall surface of the corresponding groove 123 of the body 122. As a result, the drill 121 of each drill member 119 is rotated about its longitudinal axis.

Note that each drill member 119 may have a bevel gear in place of the ball 120. In this case, a bevel gear is provided on the side wall surface of each groove 123. The bevel gear of each drill member 119 engages with the bevel gear of the side wall surface of the corresponding groove 123. When the body 122 is rotated, the bevel gear of each drill member 119 is rotated by the body 122.

According to the sixth method, similar to the third method, the opening closure device 105 shown in FIG. 27A is pressed onto one of the end faces of the substrate 100 to completely close the end openings of the exhaust gas passages 51 by the tapered wall portions. Next, the body 122 of the device 117 is rotated, and the device 117 is pressed onto one end face of the substrate 100 such that the drill 121 of each drill member 119 pierces the tip of the corresponding tapered wall portion which completely closes the end opening of the corresponding exhaust gas passage 51. As a result, a small hole 56 is formed in the tip of each tapered wall portion by the corresponding rotating drill 121.

Regarding the other end face of the substrate 100, the similar processes are performed. That is, similar to the third method, the opening closure device 105 is pressed onto the other end face of the substrate 100 to completely close the end openings of the exhaust gas passages 50 by the tapered wall portions. Next, the body 122 of the device 117 is rotated, and the device 117 is pressed onto the other end face of the substrate 100 such that the drill 121 of each drill member 119 pierces the tip of the corresponding tapered wall portion which completely closes the end opening of the corresponding exhaust gas passage 50. As a result, a small hole 55 is formed in the tip of each tapered wall portion by the corresponding rotating drill 121.

The seventh method for producing a filter will be explained. The closure device 101 used in the seventh method comprises the opening closure device 105 shown in FIG. 27A and a hole formation device 124 shown in FIG. 34B.

The device 124 is a disc shape having generally the same diameter as that of the device 105. Further, the device 124 has a body 125 and a shaving layer 126 attached to the body 125. The layer 126 is formed of abrasive for shaving the tips of the tapered wall portions of the substrate 100. Furthermore, the device 124 is rotated about an axis B by a suitable means such as an electric motor.

Figure 34A:
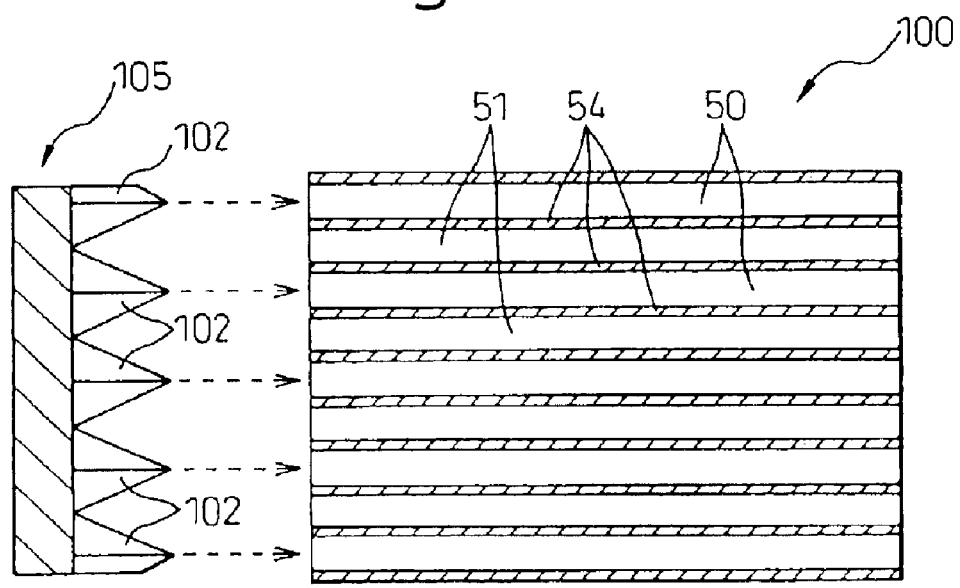
FIGS. 34A and 34B show the seventh filter production method.
Figure 34B:
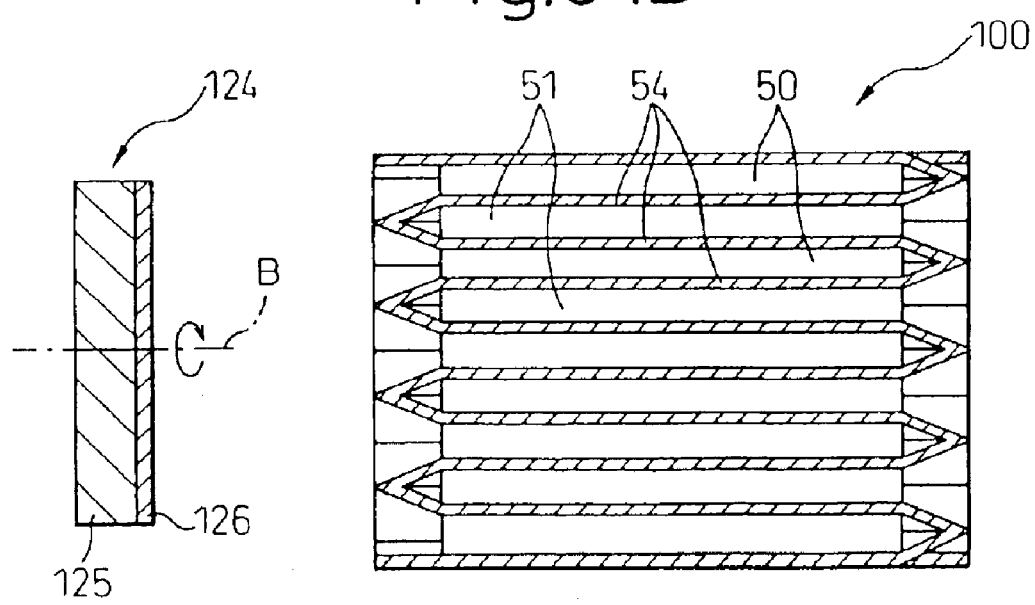

According to the seventh method, similar to the third method, as shown in FIG. 34A, the device 105 shown in FIG. 27A is pressed onto one of the end faces of the substrate 100 to completely close the end openings of the exhaust gas passages 51 by the tapered wall portions. Next, the device 124 is rotated about the axis B, and is pressed onto one end face of the substrate 100. As a result, the shaving layer 126 of the device 124 is pressed onto the tips of the tapered wall portions of the substrate 100. The tips of the tapered wall portions are shaved by the shaving layer 126. As a result, a small hole 56 is formed in the tip of each tapered wall portion.

Regarding the other end face of the substrate 100, the similar processes are performed. That is, similar to the third method, the device 105 is pressed onto the other end face of the substrate 100 to completely close the end openings of the exhaust gas passages 50 by the tapered wall portions. Next, the device 124 is rotated about the axis B, and pressed onto the other end face of the substrate 100. As a result, a small hole 55 is formed in the tip of each tapered wall portion.

The above explained methods have an advantage that small holes 55,56 each having a desired opening area, i.e., the generally same opening area can be obtained. The opening area of each small hole 55,56 influences the pressure loss and the particulate collection ratio of the filter 22. That is, the pressure loss and the particulate collection ratio of the filter 22 are changed by changing the opening area of the holes 55,56. According to the above explained methods, holes 55,56 each having a desired opening area can be obtained, and thus the filter 22 having the desired pressure loss and the desired particulate collection ratio is obtained.

While the invention has been described by reference to specific embodiments chosen for purposes of illustration, it should be apparent that numerous modifications could be made thereto by those skilled in the art without departing from the basic concept and scope of the invention.

What is claimed is:

1. An exhaust gas purification device comprising a substrate used for purifying components contained in an exhaust gas discharged from an engine, the substrate having partitions which define passages and are formed of porous material having fine pores each having a predetermined average size, the end portions of the adjacent partitions defining each of part of the passages of the substrate being partially connected to each other such that the end portions are tapered toward the outside of the substrate, the tapered end portions partially closing the end opening of alternating corresponding passages and forming a small hole in the alternating corresponding passages defined by the tips of the tapered end portions, and the size of each small hole being smaller than the cross sectional area of each of the alternating corresponding passages and larger than the sizes of the fine pores of the partitions.

2. An exhaust gas purification device as set forth in claim 1, wherein the end portions of the adjacent partitions defining each of part of the passages of the substrate are partially connected to each other at their upstream ends such that the end portions are tapered toward the outside of the substrate, and the end portions of the adjacent partitions defining each of remaining passages of the substrate are partially connected to each other at their downstream ends such that the end portions are tapered toward the outside of the substrate.

3. An exhaust gas purification device as set forth in claim 2, wherein the tapered end portions and the remaining partitions carry oxidation material for oxidizing the particulates, and the amount of the oxidation material carried by each upstream tapered end portion per unit volume is larger than that carried by each downstream tapered end portion per unit volume.

4. An exhaust gas purification device as set forth in claim 1, wherein the end portions of the adjacent partitions defining each of part of the passages of the substrate are partially connected to each other at their upstream ends such that the end portions are tapered toward the outside of the substrate, and the end portions of the adjacent partitions defining each of remaining passages of the substrate are connected to each other at their downstream ends such that the end portions are tapered toward the outside of the substrate and the downstream end opening of the passage is completely closed.

5. An exhaust gas purification device as set forth in claim 1, wherein the end portions of the adjacent partitions defining each of part of the passages of the substrate are partially connected to each other at their downstream ends such that the end portions are tapered toward the outside of the substrate, and the end portions of the adjacent partitions defining each of remaining passages of the substrate are connected to each other at their upstream ends such that the end portions are tapered toward the outside of the substrate and the upstream end opening of the passage is completely closed.

6. An exhaust gas purification device as set forth in claim 1, wherein the substrate is used as a particulate filter arranged in an exhaust gas passage of an engine for collecting particulates contained in an exhaust gas discharged from an engine.

7. An exhaust gas purification device as set forth in claim 6, wherein the tapered end portions carry oxidation material for oxidizing the particulates.

8. An exhaust gas purification device as set forth in claim 7, wherein the amount of the oxidation material carried by each tapered end portion at its upstream surface per unit are is larger than that at its downstream surface per unit area.

9. An exhaust gas purification device as set forth in claim 7, wherein a process for increasing the temperature of the filter is performed.

10. An exhaust gas purification device as set forth in claim 7, wherein the filter carries a NOx carrying agent to take in and carry the NOx therein when excessive oxygen exists therearound, and to discharge the carried NOx therefrom when the concentration of the oxygen decreases.

11. An exhaust gas purification device as set forth in claim 7, wherein the filter carries a precious metal catalyst.

12. An exhaust gas purification device as set forth in claim 11, wherein the oxidation material is an active oxygen production agent to take in and carry the oxygen when excessive oxygen exists therearound, and to discharge the carried oxygen therefrom in the form of active oxygen when the concentration of the oxygen decreases, and the active oxygen production agent discharges the active oxygen therefrom when the particulates adhere to the filter to oxidize the particulate adhering to the filter by the active oxygen.

13. An exhaust gas purification device as set forth in claim 12, wherein the active oxygen production agent comprises one of an alkali metal, an alkali earth metal, a rare earth and a transition metal.

14. An exhaust gas purification device as set forth in claim 12, wherein the active oxygen production agent comprises one of an alkali metal and an alkali earth metal having an ionization tendency higher than that of calcium.

15. An exhaust gas purification device as set forth in claim 12, wherein the air fuel ratio of at least part of the exhaust gas flowing into the filter is temporarily made rich to oxidize the particulates adhering to the filter.

16. An exhaust gas purification device as set forth in claim 6, wherein an oxidation means for oxidizing components contained in the exhaust gas is arranged in the exhaust gas passage of the engine upstream of the filter.

17. An exhaust gas purification device as set forth in claim 16, wherein the oxidation means is an oxidation catalyst.

18. An exhaust gas purification device as set forth in claim 16, wherein the oxidation means is a NOx catalyst to carry the NOx when the lean exhaust gas flows thereinto and to reduce the carried NOx when the rich exhaust gas flows thereinto.

19. An exhaust gas purification device as set forth in claim 6, wherein the size of each small hole of the filter at the low temperature region of the filter is larger than that at the high temperature region of the filter.

20. An exhaust gas purification device as set forth in claim 19, wherein the low temperature region is the peripheral region of the filter, and the high temperature region is the central region of the filter.

21. An exhaust gas purification device as set forth in claim 19, wherein the cross sectional area of each passage of the filter at the low temperature region of the filter is larger than that at the high temperature region of the filter.

22. An exhaust gas purification device as set forth in claim 6, wherein the cross sectional area of each passage of the filter at the low temperature region of the filter is larger than that at the high temperature region of the filter.

23. An exhaust gas purification device as set forth in claim 22, wherein the low temperature region is the peripheral region of the filter, and the high temperature region is the central region of the filter.

24. An exhaust gas purification device as set forth in claim 22, wherein the size of each small hole of the filter at the low temperature region of the filter is larger than that at the high temperature region of the filter.

25. An exhaust gas purification device as set forth in claim 6, wherein an exhaust gas purification means for purifying components contained in the exhaust gas is arranged in the exhaust gas passage of the engine downstream of the filter.

26. An exhaust gas purification device as set forth in claim 25, wherein the exhaust gas purification means is a NOx catalyst to carry the NOx when the lean exhaust gas flows thereinto, and to reduce the carried NOx when at least the generally stoichiometric exhaust gas flows thereinto.

27. An exhaust gas purification device as set forth in claim 25, wherein the exhaust gas purification means is an additional particulate filter which can oxidize the particulates contained in the exhaust gas.

28. An exhaust gas purification device as set forth in claim 25, wherein the filter is arranged at least near the exhaust manifold.

29. An exhaust gas purification device as set forth in claim 25, wherein the device further comprises a bypass passage which extends from the engine exhaust gas passage between the filter and the exhaust gas purification means to the exhaust gas passage of the engine downstream of the exhaust gas purification means to bypass the exhaust gas purification means, and a switch valve for switching the flow of the exhaust gas into the exhaust gas purification means and into the bypass passage, the filter carries a SOx carrying agent to carry the SOx when the lean exhaust gas flows thereinto, and to release the carried SOx when at least the generally stoichiometric exhaust gas flows thereinto and the temperature of the SOx carrying agent has a temperature higher than a SOx release temperature, the switch valve is positioned such that the exhaust gas flows into the exhaust gas purification means when the SOx is not released from the SOx carrying agent, and is positioned such that the exhaust gas flows into the bypass passage when the SOx is released from the SOx carrying agent.

30. An exhaust gas purification device as set forth in claim 29, wherein a catalyst for oxidizing the components contained in the exhaust gas is arranged in the bypass passage.

31. An exhaust gas purification device as set forth in claim 1, wherein the substrate is arranged in an exhaust gas passage of an engine, the substrate carrying a hydrocarbon collection agent for collecting unburned hydrocarbon contained in an exhaust gas discharged from an engine, and a hydrocarbon purification catalyst for purifying unburned hydrocarbon, the hydrocarbon collection agent collects unburned hydrocarbon when the agent has a temperature lower than a hydrocarbon release temperature, and releases the collected unburned hydrocarbon therefrom when the agent has a temperature higher than the hydrocarbon release temperature, the hydrocarbon purification catalyst purifies unburned hydrocarbon when the catalyst has a temperature higher than a hydrocarbon purification temperature, the hydrocarbon release temperature is set such that the unburned hydrocarbon is released from the hydrocarbon collection agent when the hydrocarbon purification catalyst has a temperature lower than the hydrocarbon purification temperature.

32. A method for producing a substrate used for purifying components contained in an exhaust gas discharged from an engine, the substrate having a plurality of exhaust gas passages defined by partitions formed of porous material, the end portions of the partitions defining each of part of the exhaust gas passages being partially connected to each other at one end of the exhaust gas passage such that the end portions are tapered toward the outside of the substrate and define a small hole by the tips thereof, the end portions of the partitions defining each of the remaining exhaust gas passages being partially connected to each other at the other end of the exhaust gas passage such that the end portions are tapered toward the outside of the substrate and define a small hole by the tips thereof, wherein the method comprises a step of gathering and connecting the end portions of the partitions defining each exhaust gas passage to be closed at its end opening, and a step of forming a small hole defined by the tips of the end portions defining each exhaust gas passage to be closed at its end opening, each small hole having a size smaller than the area of the end opening of the corresponding exhaust gas passage and larger than the average sizes of the fine pores of the partitions.

33. A method as set forth in claim 32, wherein the gathering and connecting step and the small hole forming step are simultaneously performed.

34. A method as set forth in claim 33, wherein the gathering and connecting step and the small hole forming step are simultaneously performed by pressing a device having a plurality of projections and pins arranged between the projections onto the end face of the substrate.

35. A method as set forth in claim 32, wherein first, the gathering and connecting step is performed, and then the small hole forming step is performed.

36. A method as set forth in claim 35, wherein in the small hole forming step, the tips of the end portions connected to each other are shaved to form the small hole.

* * * * *